United States Patent
Markley et al.

(10) Patent No.: US 10,871,242 B2
(45) Date of Patent: Dec. 22, 2020

(54) SOLENOID AND METHOD OF MANUFACTURE

(71) Applicant: Rain Bird Corporation, Azusa, CA (US)

(72) Inventors: Kevin James Markley, Tucson, AZ (US); Troy Lynn Roney, Marana, AZ (US); John James Wlassich, Pasadena, CA (US); Randy Ray Montgomery, Tucson, AZ (US); Chong Wang Kwak, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 338 days.

(21) Appl. No.: 15/631,191

(22) Filed: Jun. 23, 2017

(65) Prior Publication Data

US 2017/0370495 A1    Dec. 28, 2017

Related U.S. Application Data

(60) Provisional application No. 62/477,893, filed on Mar. 28, 2017, provisional application No. 62/353,811, filed on Jun. 23, 2016.

(51) Int. Cl.
*H01F 7/00* (2006.01)
*F16K 31/40* (2006.01)
(Continued)

(52) U.S. Cl.
CPC ............ *F16K 31/402* (2013.01); *A01G 25/16* (2013.01); *B67D 7/08* (2013.01); *F16K 7/17* (2013.01);
(Continued)

(58) Field of Classification Search
CPC ..................................................... F16K 31/402
(Continued)

(56) References Cited

U.S. PATENT DOCUMENTS

| 211,820 A | 1/1879 | White |
| 306,972 A | 10/1884 | Stiles |

(Continued)

FOREIGN PATENT DOCUMENTS

| CN | 85205374 U | 11/1986 |
| CN | 1345531 | 4/2002 |

(Continued)

OTHER PUBLICATIONS

European Patent Office, Extended European Search Report for European Application No. 17177629.7 dated Nov. 8, 2017, 8 pages.

(Continued)

*Primary Examiner* — Alexander Talpalatski
(74) *Attorney, Agent, or Firm* — Fitch, Even, Tabin & Flannery, LLP

(57) ABSTRACT

A solenoid is provided having an improved connection arrangement. The solenoid includes external wires that are coupled to internal solenoid components via terminals. Further, a sealed solenoid is provided having a housing overmolded onto a solenoid subassembly. External wires can be coupled to the solenoid after overmolding. The solenoid may also include a cavity for receiving at least one of electrical component. The solenoid may also include a powdered metal core.

16 Claims, 31 Drawing Sheets

(51) Int. Cl.

| | |
|---|---|
| *A01G 25/16* | (2006.01) |
| *B67D 7/08* | (2010.01) |
| *F16K 7/17* | (2006.01) |
| *F16K 11/07* | (2006.01) |
| *F16K 31/06* | (2006.01) |
| *H01F 7/16* | (2006.01) |
| *H01F 5/04* | (2006.01) |
| *H01F 7/127* | (2006.01) |
| *H01F 7/128* | (2006.01) |
| *H01F 7/06* | (2006.01) |

(52) U.S. Cl.
CPC .......... *F16K 11/07* (2013.01); *F16K 31/0675* (2013.01); *H01F 5/04* (2013.01); *H01F 7/127* (2013.01); *H01F 7/128* (2013.01); *H01F 7/1607* (2013.01); *G05B 2219/2625* (2013.01); *H01F 2007/062* (2013.01)

(58) Field of Classification Search
USPC ........................................................ 335/278
See application file for complete search history.

(56) References Cited

U.S. PATENT DOCUMENTS

| | | |
|---|---|---|
| 674,917 A | 5/1901 | Halbert |
| 766,420 A | 8/1904 | Calley |
| 1,001,593 A | 8/1911 | Hertzberg |
| 1,566,375 A | 12/1925 | Coatalen |
| 1,764,712 A | 6/1930 | Brackett |
| 2,259,990 A | 10/1941 | Baumann |
| 2,342,347 A | 2/1944 | Jacobsen |
| 2,477,587 A | 8/1949 | Doutt |
| 2,504,057 A | 4/1950 | Trefil |
| 2,638,109 A | 5/1953 | Wahlmark |
| 2,746,471 A | 5/1956 | Cobb |
| 2,860,015 A | 11/1958 | Matterson |
| 2,940,474 A | 6/1960 | Webster |
| 2,953,248 A | 9/1960 | Troland |
| 3,082,359 A | 3/1963 | Seybold |
| 3,203,447 A | 8/1965 | Bremner |
| 3,262,027 A | 7/1966 | Churchill |
| 3,279,749 A | 10/1966 | Fleckenstein |
| 3,339,583 A | 9/1967 | Fleckenstein |
| 3,379,214 A | 4/1968 | Weinberg |
| 3,411,745 A | 11/1968 | Austin, Jr. |
| 3,420,492 A | 1/1969 | Ray |
| 3,448,960 A | 6/1969 | Medley |
| 3,458,769 A | 7/1969 | Stampfli |
| 3,477,693 A | 11/1969 | Bezanis |
| 3,481,578 A | 12/1969 | Baldi |
| 3,504,315 A | 3/1970 | Stanwell |
| 3,511,472 A | 5/1970 | Zimmerman |
| 3,547,154 A | 12/1970 | Benham |
| 3,598,145 A | 8/1971 | Wolfson |
| 3,598,360 A | 8/1971 | Merriner |
| 3,633,869 A | 1/1972 | Lehmann |
| 3,729,710 A | 4/1973 | Sherwin |
| 3,743,898 A | 7/1973 | Sturman |
| 3,747,620 A | 7/1973 | Kah, Jr. |
| 3,757,263 A | 9/1973 | Merriner |
| 3,941,348 A | 3/1976 | Mott |
| 3,977,436 A | 8/1976 | Larner |
| 3,989,066 A | 11/1976 | Sturman |
| 4,004,258 A | 1/1977 | Arnold |
| 4,007,458 A | 2/1977 | Hollabaugh |
| 4,010,390 A | 3/1977 | Stampfli |
| 4,022,244 A | 5/1977 | Oman |
| 4,029,295 A | 6/1977 | Wassmer |
| 4,056,255 A | 11/1977 | Lace |
| 4,065,722 A | 12/1977 | Francis |
| 4,074,699 A | 2/1978 | Stampfli |
| 4,082,116 A | 4/1978 | Stampfli |
| 4,099,701 A | 7/1978 | Berger |
| 4,111,230 A | 9/1978 | Stampfli |
| 4,114,184 A | 9/1978 | Stampfli |
| 4,121,114 A | 10/1978 | Ruggles |
| 4,131,882 A | 12/1978 | Hollabaugh |
| 4,165,532 A | 8/1979 | Kendall |
| 4,176,395 A | 11/1979 | Evelyn-Veere |
| 4,241,375 A | 12/1980 | Ruggles |
| 4,251,053 A | 2/1981 | Wurzer |
| 4,257,573 A | 3/1981 | Stampfli |
| D266,863 S | 11/1982 | Mason |
| 4,383,234 A | 5/1983 | Yatsushiro |
| 4,419,643 A | 12/1983 | Ojima |
| 4,423,484 A | 12/1983 | Hamilton |
| 4,445,788 A | 5/1984 | Twersky |
| 4,470,030 A | 9/1984 | Myers |
| 4,506,701 A | 3/1985 | Masaki |
| 4,535,401 A | 8/1985 | Penn |
| 4,537,387 A | 8/1985 | Danby |
| 4,540,154 A | 9/1985 | Kolchinsky |
| 4,548,225 A | 10/1985 | Busalacchi |
| 4,556,864 A | 12/1985 | Roy |
| 4,562,506 A | 12/1985 | Moran |
| 4,590,962 A | 5/1986 | Tespa |
| 4,596,266 A | 6/1986 | Kinghorn |
| 4,637,548 A | 1/1987 | Ray |
| 4,643,393 A | 2/1987 | Kosugi |
| 4,645,882 A | 2/1987 | Nakayama |
| 4,662,399 A | 5/1987 | Buchner |
| 4,679,767 A | 7/1987 | Vollmer |
| 4,697,786 A | 10/1987 | Kennedy |
| 4,716,490 A | 12/1987 | Alexanian |
| 4,718,454 A | 1/1988 | Appleby |
| 4,720,078 A * | 1/1988 | Nakamura .......... F16K 31/0606 251/129.01 |
| 4,733,212 A | 3/1988 | Goodwin |
| 4,751,487 A | 6/1988 | Green, Jr. |
| 4,758,811 A | 7/1988 | Slavin |
| 4,777,556 A | 10/1988 | Imran |
| 4,781,213 A | 11/1988 | Kilayko |
| 4,790,351 A | 12/1988 | Kervagoret |
| 4,794,890 A | 1/1989 | Richeson, Jr. |
| 4,801,910 A | 1/1989 | Ayers |
| 4,811,221 A | 3/1989 | Sturman |
| 4,829,947 A | 5/1989 | Lequesne |
| 4,852,802 A | 8/1989 | Iggulden |
| 4,893,645 A | 1/1990 | Augustinas |
| 4,954,799 A | 9/1990 | Kumar |
| 4,967,996 A | 11/1990 | Sonoda |
| 4,994,776 A | 2/1991 | Juncu |
| 5,008,664 A | 4/1991 | More |
| 5,010,911 A | 4/1991 | Grant |
| 5,021,939 A | 6/1991 | Pulgiese |
| 5,023,787 A | 6/1991 | Evelyn-Veere |
| 5,048,755 A | 9/1991 | Dodds |
| 5,050,800 A | 9/1991 | Lamar |
| 5,064,166 A | 11/1991 | Schechter |
| 5,067,688 A | 11/1991 | Tanimoto |
| 5,071,267 A | 12/1991 | Aldefeld |
| 5,079,667 A | 1/1992 | Kasano |
| 5,085,402 A | 2/1992 | O'Dell |
| 5,097,861 A | 3/1992 | Hopkins |
| 5,100,056 A | 3/1992 | Theodorsen |
| 5,125,432 A * | 6/1992 | Fujii .................... B60T 8/3645 137/596.17 |
| 5,139,226 A | 8/1992 | Baldwin |
| 5,145,148 A | 9/1992 | Laurent |
| 5,153,550 A * | 10/1992 | Sugiura .................... H01F 5/04 336/107 |
| 5,186,433 A | 2/1993 | Pausch |
| 5,199,462 A | 4/1993 | Baker |
| 5,213,303 A | 5/1993 | Walker |
| 5,229,649 A | 7/1993 | Nielsen |
| 5,229,937 A | 7/1993 | Evelyn-Veere |
| 5,251,153 A | 10/1993 | Nielsen |
| 5,311,162 A | 5/1994 | Sjoquist |
| 5,333,785 A | 8/1994 | Dodds |
| 5,347,421 A | 9/1994 | Alexanian |
| 5,365,210 A | 11/1994 | Hines |
| 5,375,811 A | 12/1994 | Reinicke |

(56) References Cited

U.S. PATENT DOCUMENTS

| | | |
|---|---|---|
| 5,402,303 A | 3/1995 | Luck |
| 5,441,233 A | 8/1995 | Asou |
| 5,479,339 A | 12/1995 | Miller |
| 5,482,080 A | 1/1996 | Bergmann |
| 5,485,400 A | 1/1996 | Warrior |
| 5,497,135 A | 3/1996 | Wisskirchen |
| 5,546,063 A | 8/1996 | Hoffman |
| 5,566,921 A | 10/1996 | Yokota |
| 5,584,465 A | 12/1996 | Ochsenreiter |
| 5,621,669 A | 4/1997 | Bjornsson |
| 5,622,351 A | 4/1997 | Kim |
| 5,638,847 A | 6/1997 | Hoch |
| 5,645,264 A | 7/1997 | Kah |
| 5,649,818 A | 7/1997 | Day |
| 5,655,561 A | 8/1997 | Wendel |
| 5,655,747 A | 8/1997 | Pasut |
| 5,661,349 A | 8/1997 | Luck |
| 5,687,759 A | 11/1997 | Tan |
| 5,696,671 A | 12/1997 | Oliver |
| 5,730,423 A | 3/1998 | Wu |
| 5,740,031 A | 4/1998 | Gagnon |
| 5,760,706 A | 6/1998 | Kiss |
| 5,780,938 A | 7/1998 | Edwards |
| 5,785,298 A | 7/1998 | Kumar |
| 5,813,606 A | 9/1998 | Ziff |
| 5,825,664 A | 10/1998 | Warrior |
| 5,826,619 A | 10/1998 | Roman |
| 5,839,658 A | 11/1998 | Sarver |
| 5,848,609 A | 12/1998 | Marchesseault |
| 5,848,780 A | 12/1998 | Miller |
| 5,851,004 A | 12/1998 | Wu |
| 5,871,156 A | 2/1999 | Lawson |
| 5,895,026 A | 4/1999 | Linkner, Jr. |
| 5,914,847 A | 6/1999 | Alexanian |
| 5,915,665 A | 6/1999 | Paese |
| 5,927,607 A | 7/1999 | Scott |
| 5,938,172 A | 8/1999 | Ohtsuka |
| D413,650 S | 9/1999 | Sato |
| 5,961,045 A | 10/1999 | Doldren |
| 5,967,424 A | 10/1999 | Bonnah, II |
| 5,971,025 A | 10/1999 | Backlund |
| 5,979,482 A | 11/1999 | Scott |
| 5,996,608 A | 12/1999 | Hunter |
| 6,012,700 A | 1/2000 | Johnson |
| 6,021,038 A | 2/2000 | Hanchett |
| 6,040,752 A | 3/2000 | Fisher |
| 6,047,907 A | 4/2000 | Hornby |
| 6,047,947 A | 4/2000 | Kumar |
| 6,061,603 A | 5/2000 | Papadopoulos |
| 6,073,904 A | 6/2000 | Diller |
| 6,076,550 A | 6/2000 | Hiraishi |
| 6,076,801 A | 6/2000 | Duhack |
| 6,076,803 A | 6/2000 | Johnson |
| 6,079,433 A | 6/2000 | Saarem |
| 6,086,042 A | 7/2000 | Scott |
| D430,268 S | 8/2000 | Hiramatsu |
| 6,095,496 A | 8/2000 | Rydin |
| 6,098,898 A | 8/2000 | Storch |
| 6,124,775 A | 9/2000 | Linkner, Jr. |
| 6,126,141 A | 10/2000 | Geiger |
| 6,154,354 A | 11/2000 | Alexanian |
| 6,163,239 A | 12/2000 | Ozawa |
| 6,164,331 A | 12/2000 | Sugita |
| 6,179,268 B1 | 1/2001 | Seid |
| 6,186,413 B1 | 2/2001 | Lawson |
| 6,199,587 B1 | 3/2001 | Shlomi |
| 6,218,921 B1 | 4/2001 | Eberts |
| 6,219,903 B1 | 4/2001 | Osterhart |
| 6,220,275 B1 | 4/2001 | Nishinosono |
| 6,220,299 B1 | 4/2001 | Arvidsson |
| D443,030 S | 5/2001 | Kaneko |
| 6,224,033 B1 | 5/2001 | Kumar |
| 6,227,455 B1 | 5/2001 | Scott |
| 6,236,293 B1 | 5/2001 | Forster |
| 6,244,298 B1 | 6/2001 | Sugita |
| 6,263,901 B1 | 7/2001 | Lohde |
| 6,283,139 B1 | 9/2001 | Symonds |
| 6,293,516 B1 | 9/2001 | Parsons |
| 6,305,662 B1 | 10/2001 | Parsons |
| 6,314,340 B1 | 11/2001 | Mecham |
| 6,335,855 B1 | 1/2002 | Alexanian |
| 6,336,621 B1 | 1/2002 | Ii |
| 6,337,635 B1 | 1/2002 | Ericksen |
| 6,341,759 B1 | 1/2002 | Noller |
| 6,351,366 B1 | 2/2002 | Alexanian |
| 6,366,189 B1 | 4/2002 | Bergvall |
| 6,374,814 B1 | 4/2002 | Cook |
| 6,378,838 B1 | 4/2002 | Brundisini |
| 6,382,532 B1 | 5/2002 | French |
| 6,386,221 B1 | 5/2002 | Knoll |
| 6,386,505 B2 | 5/2002 | Schoeb |
| 6,394,126 B2 | 5/2002 | Lohde |
| 6,394,413 B2 | 5/2002 | Lohde |
| D459,441 S | 6/2002 | Hayashi |
| 6,402,057 B1 | 6/2002 | Kimmel |
| 6,405,752 B1 | 6/2002 | Fritsch |
| 6,409,144 B1 | 6/2002 | Inami |
| D460,148 S | 7/2002 | Hayashi |
| 6,422,488 B1 | 7/2002 | Fochtman |
| 6,424,243 B1 | 7/2002 | Forster |
| 6,446,885 B1 | 9/2002 | Sims, Jr. |
| 6,450,478 B2 | 9/2002 | Parsons |
| 6,452,499 B1 | 9/2002 | Runge |
| 6,460,563 B2 | 10/2002 | Olson |
| 6,480,497 B1 | 11/2002 | Flammer, III |
| 6,481,646 B1 | 11/2002 | Hornby |
| 6,491,235 B1 | 12/2002 | Scott |
| 6,492,751 B1 | 12/2002 | Ineson |
| 6,498,558 B1 | 12/2002 | Linkner, Jr. |
| 6,499,677 B2 | 12/2002 | Dallmeyer |
| 6,501,359 B2 | 12/2002 | Matsusaka |
| 6,502,770 B2 | 1/2003 | Dallmeyer |
| 6,508,272 B1 | 1/2003 | Parsons |
| 6,529,589 B1 | 3/2003 | Nelson |
| 6,536,681 B2 | 3/2003 | Dallmeyer |
| 6,542,059 B2 | 4/2003 | Sato |
| 6,543,744 B2 | 4/2003 | Carrillo |
| 6,546,945 B2 | 4/2003 | Ishigaki |
| 6,550,690 B2 | 4/2003 | Dallmeyer |
| 6,553,336 B1 | 4/2003 | Johnson |
| 6,557,580 B2 | 5/2003 | Lohde |
| 6,568,080 B2 | 5/2003 | Kimmel |
| 6,568,609 B2 | 5/2003 | Dallmeyer |
| 6,598,852 B2 * | 7/2003 | Tomoda ............... F16K 31/0631 251/129.14 |
| 6,600,971 B1 | 7/2003 | Smith |
| 6,601,300 B2 | 8/2003 | Hasegawa |
| 6,604,726 B2 | 8/2003 | Kumar |
| 6,609,698 B1 | 8/2003 | Parsons |
| 6,616,120 B2 | 9/2003 | Barzuza |
| 6,616,249 B2 | 9/2003 | Han |
| 6,619,320 B2 | 9/2003 | Parsons |
| 6,619,614 B2 | 9/2003 | Parsons |
| 6,627,077 B2 | 9/2003 | Fritsch |
| 6,651,628 B2 | 11/2003 | Nally |
| 6,652,188 B1 | 11/2003 | Albright |
| 6,655,609 B2 | 12/2003 | Dallmeyer |
| 6,671,586 B2 | 12/2003 | Davis |
| 6,676,044 B2 | 1/2004 | Dallmeyer |
| 6,685,112 B1 | 2/2004 | Hornby |
| 6,685,158 B2 | 2/2004 | Parsons |
| 6,687,997 B2 | 2/2004 | Dallmeyer |
| 6,691,740 B2 | 2/2004 | Yoshida |
| 6,691,979 B2 | 2/2004 | Parsons |
| 6,694,223 B1 | 2/2004 | Goldberg |
| 6,695,281 B2 | 2/2004 | Williams |
| 6,707,174 B2 | 3/2004 | Lin |
| 6,708,084 B2 | 3/2004 | Battistutto |
| 6,715,732 B2 | 4/2004 | Kumar |
| 6,720,853 B1 | 4/2004 | Callis |
| 6,721,630 B1 | 4/2004 | Woytowitz |
| 6,722,628 B1 | 4/2004 | Seil |
| 6,745,457 B2 | 6/2004 | Noller |
| 6,747,557 B1 | 6/2004 | Petite |

(56) References Cited

U.S. PATENT DOCUMENTS

| | | |
|---|---|---|
| 6,748,976 B2 * | 6/2004 | Sato .................. F16K 24/04 137/625.65 |
| 6,749,136 B1 | 6/2004 | Wilson |
| 6,749,175 B2 | 6/2004 | Sato |
| 6,752,371 B2 | 6/2004 | Herbert |
| 6,756,871 B1 | 6/2004 | Suzuki |
| 6,763,287 B2 | 7/2004 | Brundisini |
| 6,766,221 B1 | 7/2004 | Christiansen |
| 6,766,825 B2 | 7/2004 | Antunez |
| 6,769,176 B2 | 8/2004 | Hornby |
| 6,778,099 B1 | 8/2004 | Meyer |
| 6,782,310 B2 | 8/2004 | Bailey |
| 6,782,311 B2 | 8/2004 | Barlow |
| 6,783,287 B2 | 8/2004 | Kudo |
| 6,791,442 B1 | 9/2004 | Schmidt |
| 6,792,323 B2 | 9/2004 | Krzyzanowski |
| 6,793,162 B2 | 9/2004 | Dallmeyer |
| 6,812,826 B2 | 11/2004 | Buhler |
| 6,823,239 B2 | 11/2004 | Sieminski |
| 6,830,232 B2 | 12/2004 | Burrola |
| 6,840,460 B2 | 1/2005 | Clark |
| 6,842,667 B2 | 1/2005 | Beutler |
| 6,848,632 B2 | 2/2005 | Clark |
| 6,851,622 B2 | 2/2005 | Demere |
| 6,851,631 B2 | 2/2005 | Dallmeyer |
| 6,853,883 B2 | 2/2005 | Kreikemeier |
| 6,854,706 B2 | 2/2005 | Sato |
| 6,862,498 B2 | 3/2005 | Davis |
| 6,874,535 B2 | 4/2005 | Parsons |
| 6,874,707 B2 | 4/2005 | Skinner |
| 6,877,526 B2 | 4/2005 | Burrola |
| 6,877,714 B2 | 4/2005 | Hall |
| 6,877,717 B2 | 4/2005 | Collins |
| 6,891,838 B1 | 5/2005 | Petite |
| 6,892,114 B1 | 5/2005 | Addink |
| 6,895,987 B2 | 5/2005 | Addink |
| 6,898,467 B1 | 5/2005 | Smith |
| 6,903,647 B2 | 6/2005 | Linkner, Jr. |
| 6,904,668 B2 | 6/2005 | Dallmeyer |
| 6,914,893 B2 | 7/2005 | Petite |
| 6,932,316 B2 | 8/2005 | Herbert |
| 6,932,320 B2 | 8/2005 | Fukano |
| 6,938,834 B2 | 9/2005 | Harris |
| 6,944,523 B2 | 9/2005 | Addink |
| 6,947,810 B2 | 9/2005 | Skinner |
| 6,947,854 B2 | 9/2005 | Swarztrauber |
| 6,948,697 B2 | 9/2005 | Herbert |
| 6,950,728 B1 | 9/2005 | Addink |
| 6,955,334 B2 | 10/2005 | Parsons |
| 6,955,337 B2 | 10/2005 | Weber |
| 6,959,904 B2 | 11/2005 | Beraldo |
| 6,963,808 B1 | 11/2005 | Addink |
| 6,971,684 B2 | 12/2005 | Ferrari |
| 6,978,794 B2 | 12/2005 | Dukes |
| 6,985,060 B2 | 1/2006 | Parker |
| 6,991,214 B2 | 1/2006 | Richter |
| 6,993,416 B2 | 1/2006 | Christiansen |
| 6,997,642 B2 | 2/2006 | Bishop |
| 7,000,890 B2 | 2/2006 | Bell |
| 7,003,357 B1 | 2/2006 | Kreikemeier |
| 7,004,450 B2 | 2/2006 | Yoshimura |
| 7,010,395 B1 | 3/2006 | Goldberg |
| 7,010,396 B2 | 3/2006 | Ware |
| 7,012,394 B2 | 3/2006 | Moore |
| 7,012,546 B1 | 3/2006 | Zigdon |
| 7,017,605 B2 | 3/2006 | Stroud |
| 7,021,750 B2 | 4/2006 | Shibata |
| 7,024,256 B2 | 4/2006 | Krzyzanowski |
| 7,050,887 B2 | 5/2006 | Alvarez |
| 7,058,478 B2 | 6/2006 | Alexanian |
| 7,058,479 B2 | 6/2006 | Miller |
| 7,059,548 B2 | 6/2006 | Reiter |
| 7,063,270 B2 | 6/2006 | Bowers |
| 7,069,115 B1 | 6/2006 | Woytowitz |
| D524,910 S | 7/2006 | Matsumoto |
| 7,069,941 B2 | 7/2006 | Parsons |
| D527,073 S | 8/2006 | Yajima |
| 7,084,741 B2 | 8/2006 | Plummer |
| 7,086,383 B2 | 8/2006 | Ivens |
| 7,093,362 B2 | 8/2006 | Dallmeyer |
| 7,103,511 B2 | 9/2006 | Petite |
| 7,106,158 B2 | 9/2006 | Forsythe |
| 7,123,993 B1 | 10/2006 | Freeman |
| 7,133,749 B2 | 11/2006 | Goldberg |
| 7,146,225 B2 | 12/2006 | Guenst |
| 7,146,254 B1 | 12/2006 | Howard |
| 7,146,255 B2 | 12/2006 | Christiansen |
| 7,156,363 B2 | 1/2007 | Parsons |
| 7,168,638 B2 | 1/2007 | Saito |
| 7,172,366 B1 | 2/2007 | Bishop |
| 7,181,319 B1 | 2/2007 | Woytowitz |
| 7,182,272 B1 | 2/2007 | Marian |
| 7,182,311 B2 | 2/2007 | Kimble |
| 7,184,848 B2 | 2/2007 | Krzyzanowski |
| 7,187,262 B1 | 3/2007 | Henry |
| 7,187,285 B2 | 3/2007 | Staples |
| 7,188,822 B2 | 3/2007 | Marcichow |
| 7,196,602 B2 | 3/2007 | Adams |
| 7,206,669 B2 | 4/2007 | Christiansen |
| D541,905 S | 5/2007 | Yajima |
| 7,225,057 B2 | 5/2007 | Froman |
| 7,227,439 B2 | 6/2007 | Kelly |
| 7,240,740 B2 | 7/2007 | Reilly |
| 7,245,991 B1 | 7/2007 | Woytowitz |
| 7,246,787 B2 | 7/2007 | Kumar |
| 7,248,945 B2 | 7/2007 | Woytowitz |
| 7,249,749 B2 | 7/2007 | Niwa |
| 7,250,860 B2 | 7/2007 | Smith |
| D549,077 S | 8/2007 | Yajima |
| D549,241 S | 8/2007 | Giddens |
| 7,257,465 B2 | 8/2007 | Perez |
| 7,263,073 B2 | 8/2007 | Petite |
| 7,266,428 B2 | 9/2007 | Alexanian |
| 7,270,093 B2 | 9/2007 | Luercho |
| 7,273,206 B2 * | 9/2007 | Sato .................. F16K 31/0627 251/129.02 |
| 7,280,019 B2 | 10/2007 | Kolb |
| 7,286,904 B2 | 10/2007 | Graham |
| 7,289,862 B2 | 10/2007 | Britton |
| 7,293,757 B2 * | 11/2007 | Akabane ............ F02M 51/005 239/585.5 |
| 7,295,128 B2 | 11/2007 | Petite |
| 7,303,147 B1 | 12/2007 | Danner |
| 7,305,280 B2 | 12/2007 | Marian |
| 7,309,033 B2 | 12/2007 | Dallmeyer |
| 7,317,972 B2 | 1/2008 | Addink |
| 7,325,564 B2 | 2/2008 | Ryuen |
| 7,325,781 B2 | 2/2008 | Parsons |
| 7,328,089 B2 | 2/2008 | Curren |
| 7,330,796 B2 | 2/2008 | Addink |
| D563,507 S | 3/2008 | Kato |
| 7,339,957 B2 | 3/2008 | Hitt |
| 7,346,463 B2 | 3/2008 | Petite |
| 7,347,383 B2 | 3/2008 | Dallmeyer |
| 7,358,626 B2 | 4/2008 | Gardner |
| 7,359,769 B2 | 4/2008 | Bailey |
| 7,378,768 B2 | 5/2008 | Ohkawa |
| 7,383,721 B2 | 6/2008 | Parsons |
| 7,383,851 B2 | 6/2008 | Jacobsen |
| 7,389,952 B2 | 6/2008 | Dallmeyer |
| 7,392,053 B1 | 6/2008 | Conner |
| 7,396,000 B2 | 7/2008 | Parsons |
| 7,398,139 B1 | 7/2008 | Woytowitz |
| 7,400,944 B2 | 7/2008 | Bailey |
| 7,403,840 B2 | 7/2008 | Moore |
| 7,406,363 B2 | 7/2008 | Doering |
| 7,412,245 B2 | 8/2008 | Guo |
| 7,412,303 B1 | 8/2008 | Porter |
| 7,412,317 B2 | 8/2008 | Takamatsu |
| 7,414,502 B2 | 8/2008 | Tackes |
| 7,421,317 B2 | 9/2008 | Christiansen |
| 7,422,160 B2 | 9/2008 | Dallmeyer |
| 7,423,985 B1 | 9/2008 | Hill |
| 7,429,006 B2 | 9/2008 | Dallmeyer |

(56) References Cited

U.S. PATENT DOCUMENTS

| | | | |
|---|---|---|---|
| 7,437,778 B2 | 10/2008 | Parsons |
| 7,444,207 B2 | 10/2008 | Nickerson |
| D581,880 S | 12/2008 | Neitzel |
| 7,458,521 B2 | 12/2008 | Ivans |
| 7,472,883 B2 | 1/2009 | Murao |
| 7,474,024 B2 * | 1/2009 | Nakanishi | H05K 3/284 |
| | | | 310/64 |
| 7,475,863 B2 | 1/2009 | Donovan |
| 7,480,501 B2 | 1/2009 | Petite |
| 7,487,798 B2 | 2/2009 | Furuta |
| 7,487,925 B2 | 2/2009 | Skinner |
| 7,503,346 B1 | 3/2009 | Clark |
| 7,503,347 B2 | 3/2009 | Ryuen |
| 7,520,449 B2 | 4/2009 | Matsuo |
| 7,526,365 B1 | 4/2009 | Frerich |
| 7,530,506 B2 | 5/2009 | Kato |
| 7,532,100 B2 | 5/2009 | Henry |
| 7,546,181 B2 | 6/2009 | Vidovich |
| 7,556,537 B2 | 7/2009 | Schenk |
| 7,558,650 B2 | 7/2009 | Thornton |
| 7,562,399 B2 | 7/2009 | Parsons |
| 7,564,842 B2 | 7/2009 | Callaway, Jr. |
| 7,567,858 B1 | 7/2009 | Dunlap |
| 7,574,284 B2 | 8/2009 | Goldberg |
| 7,574,285 B2 | 8/2009 | Kah |
| 7,584,023 B1 | 9/2009 | Palmer |
| 7,596,429 B2 | 9/2009 | Cardinal |
| D603,015 S | 10/2009 | Matsumura |
| 7,613,547 B1 | 11/2009 | Woytowitz |
| 7,637,475 B2 | 12/2009 | Adams |
| 7,640,079 B2 | 12/2009 | Nickerson |
| 7,643,823 B2 | 1/2010 | Shamoon |
| 7,650,425 B2 | 1/2010 | Davis |
| 7,665,713 B1 | 2/2010 | Clark |
| 7,668,532 B2 | 2/2010 | Shamoon |
| 7,668,990 B2 | 2/2010 | Krzyzanowski |
| 7,690,623 B2 | 4/2010 | Parsons |
| 7,694,934 B2 | 4/2010 | Irwin |
| 7,697,248 B2 | 4/2010 | Tomimbang |
| 7,701,314 B2 | 4/2010 | Hazzard |
| 7,703,707 B2 | 4/2010 | Yasukawa |
| 7,703,709 B2 | 4/2010 | Akabane |
| 7,707,125 B2 | 4/2010 | Haji-Valizadeh |
| D615,618 S | 5/2010 | Someya |
| 7,710,226 B2 | 5/2010 | Nelson |
| 7,711,454 B2 | 5/2010 | Addink |
| 7,711,796 B2 | 5/2010 | Gutt |
| 7,719,394 B2 | 5/2010 | Nelson |
| 7,719,432 B1 | 5/2010 | Hill |
| 7,726,630 B2 | 6/2010 | Cripps |
| 7,731,154 B2 | 6/2010 | Parsons |
| 7,735,513 B2 | 6/2010 | Bush |
| 7,738,999 B2 | 6/2010 | Petite |
| 7,762,523 B2 | 7/2010 | Smith |
| D622,226 S | 8/2010 | Crist |
| D622,709 S | 8/2010 | Hern |
| 7,772,726 B1 | 8/2010 | Porter |
| 7,792,612 B2 | 9/2010 | Kah |
| 7,806,382 B1 | 10/2010 | Palumbo |
| 7,826,931 B2 * | 11/2010 | Lorenz | G05D 7/0676 |
| | | | 700/284 |
| 7,830,231 B2 | 11/2010 | Carlino |
| 7,844,368 B2 | 11/2010 | Alexanian |
| 7,844,369 B2 | 11/2010 | Nickerson |
| 7,857,282 B2 | 12/2010 | Goossens |
| 7,870,080 B2 | 1/2011 | Budike, Jr. |
| 7,877,168 B1 | 1/2011 | Porter |
| RE42,084 E | 2/2011 | Baecklund |
| D633,180 S | 2/2011 | Duong |
| 7,883,027 B2 | 2/2011 | Fekete |
| 7,895,993 B2 | 3/2011 | Weisz |
| 7,899,580 B2 | 3/2011 | Cardinal |
| 7,899,581 B1 | 3/2011 | Woytowitz |
| 7,911,341 B2 | 3/2011 | Raji |
| D636,278 S | 4/2011 | Franchini |
| 7,921,480 B2 | 4/2011 | Parsons |
| 7,922,150 B2 | 4/2011 | Cripps |
| 7,930,069 B2 | 4/2011 | Savelle |
| 7,933,945 B2 | 4/2011 | Krzyzanowski |
| 7,938,340 B2 | 5/2011 | Anderson |
| 7,950,416 B2 | 5/2011 | Nakai |
| 7,953,517 B1 | 5/2011 | Porter |
| 7,959,129 B2 | 6/2011 | Matsumoto |
| 7,962,101 B2 | 6/2011 | Vaswani |
| 7,962,244 B2 | 6/2011 | Alexanian |
| 7,973,627 B2 | 7/2011 | Yamagata |
| 7,981,386 B2 | 7/2011 | McAvoy |
| 7,982,564 B2 | 7/2011 | Farrar |
| 7,982,565 B2 | 7/2011 | Bradfield |
| 7,983,574 B2 | 7/2011 | Kolb |
| 7,996,115 B2 | 8/2011 | Nickerson |
| 8,006,719 B2 | 8/2011 | Nordstrom |
| 8,006,951 B2 | 8/2011 | Guggenmos |
| 8,010,238 B2 | 8/2011 | Ensworth |
| 8,019,482 B2 | 9/2011 | Sutardja |
| 8,024,075 B2 | 9/2011 | Fekete |
| 8,026,781 B2 | 9/2011 | Freakes |
| 8,028,970 B2 | 10/2011 | Fukano |
| 8,037,853 B2 | 10/2011 | Luercho |
| 8,037,901 B2 | 10/2011 | Matsumoto |
| 8,042,049 B2 | 10/2011 | Killian |
| 8,042,202 B2 | 10/2011 | Parsons |
| D648,000 S | 11/2011 | Shimura |
| 8,055,389 B2 | 11/2011 | Holindrake |
| 8,061,685 B2 | 11/2011 | Ueda |
| 8,064,412 B2 | 11/2011 | Petite |
| 8,064,935 B2 | 11/2011 | Shamoon |
| 8,070,129 B2 | 12/2011 | Makino |
| 8,081,053 B2 | 12/2011 | Yamagata |
| 8,104,993 B2 | 1/2012 | Hitt |
| 8,108,078 B2 | 1/2012 | Lorenz |
| 8,116,889 B2 | 2/2012 | Krzyzanowski |
| 8,127,746 B2 | 3/2012 | Escandell |
| 8,127,790 B2 | 3/2012 | Van Weelden |
| 8,127,791 B2 | 3/2012 | Najmolhoda |
| 8,128,059 B2 | 3/2012 | Uechi |
| 8,141,585 B2 | 3/2012 | Tschurtz |
| 8,145,360 B2 | 3/2012 | Brundisini |
| 8,160,750 B2 | 4/2012 | Weiler |
| 8,170,721 B2 | 5/2012 | Nickerson |
| 8,171,136 B2 | 5/2012 | Petite |
| 8,185,248 B2 | 5/2012 | Ensworth |
| 8,186,378 B2 | 5/2012 | Nordstrom |
| 8,188,821 B2 | 5/2012 | Nelson |
| 8,196,064 B2 | 6/2012 | Krzyzanowski |
| 8,200,368 B2 | 6/2012 | Nickerson |
| 8,209,061 B2 | 6/2012 | Palmer |
| 8,214,496 B2 | 7/2012 | Gutt |
| 8,215,327 B2 | 7/2012 | Bush |
| 8,215,610 B2 | 7/2012 | Shiao |
| 8,219,254 B2 | 7/2012 | O'Connor |
| 8,219,935 B2 | 7/2012 | Hunts |
| 8,220,776 B2 | 7/2012 | Tagata |
| 8,224,493 B2 | 7/2012 | Walker |
| 8,225,810 B2 | 7/2012 | Blanchard |
| 8,235,352 B2 | 8/2012 | Irwin |
| 8,244,404 B2 | 8/2012 | Nickerson |
| 8,245,402 B2 | 8/2012 | Seitter |
| 8,246,004 B2 | 8/2012 | Kratzer |
| 8,260,465 B2 | 9/2012 | Crist |
| 8,261,770 B2 | 9/2012 | Bush |
| 8,264,312 B2 | 9/2012 | Hamaoka |
| 8,264,313 B2 | 9/2012 | Sasao |
| 8,265,797 B2 | 9/2012 | Nickerson |
| 8,274,171 B2 | 9/2012 | Korol |
| 8,274,348 B2 | 9/2012 | Kolb |
| 8,276,878 B2 | 10/2012 | Parsons |
| 8,295,985 B2 | 10/2012 | Crist |
| 8,297,314 B2 | 10/2012 | Clark |
| 8,297,589 B2 | 10/2012 | Dourdeville |
| 8,301,309 B1 | 10/2012 | Woytoxitz |
| 8,305,168 B2 | 11/2012 | Cotic |
| 8,310,322 B2 | 11/2012 | Tomimbang |
| 8,326,440 B2 | 12/2012 | Christfort |

(56) References Cited

U.S. PATENT DOCUMENTS

| | | | |
|---|---|---|---|
| 8,335,304 B2 | 12/2012 | Petite | |
| 8,335,842 B2 | 12/2012 | Raji | |
| 8,347,918 B2 | 1/2013 | Shimizu | |
| 8,348,230 B2 | 1/2013 | Michl | |
| 8,348,231 B2 | 1/2013 | Czimmek | |
| 8,371,331 B2 | 2/2013 | Najmolhoda | |
| 8,374,726 B2 | 2/2013 | Holindrake | |
| 8,382,064 B2 | 2/2013 | Nisinosono | |
| 8,387,653 B2 | 3/2013 | Bush | |
| 8,396,606 B2 | 3/2013 | Forbes, Jr. | |
| 8,401,705 B2 | 3/2013 | Alexanian | |
| 8,410,931 B2 | 4/2013 | Petite | |
| 8,412,382 B2 | 4/2013 | Imes | |
| 8,416,041 B2 | 4/2013 | Freakes | |
| 8,417,390 B2 | 4/2013 | Nickerson | |
| 8,421,566 B2 * | 4/2013 | Sasao | H01F 7/128 335/220 |
| 8,425,020 B2 | 4/2013 | Borra | |
| 8,430,376 B1 | 4/2013 | Danner | |
| 8,432,242 B2 | 4/2013 | Irwin | |
| 8,433,448 B2 | 4/2013 | Walker | |
| 8,436,704 B1 | 5/2013 | Venkataraghavan | |
| 8,437,879 B2 | 5/2013 | Anderson | |
| 8,443,829 B2 | 5/2013 | Czimmek | |
| 8,447,843 B2 | 5/2013 | Johnson | |
| 8,448,916 B2 | 5/2013 | Kratzer | |
| 8,457,798 B2 | 6/2013 | Hackett | |
| 8,465,131 B2 | 6/2013 | Hibbard | |
| 8,469,334 B2 | 6/2013 | Yamagata | |
| 8,474,787 B2 | 7/2013 | Fink | |
| 8,478,871 B2 | 7/2013 | Gutt | |
| 8,485,619 B2 | 7/2013 | Borra | |
| 8,490,646 B2 | 7/2013 | Bush | |
| 8,494,683 B2 | 7/2013 | Piper | |
| 8,496,025 B2 | 7/2013 | Parsons | |
| 8,500,226 B2 | 8/2013 | Hibbard | |
| 8,504,210 B2 | 8/2013 | Ensworth | |
| 8,505,566 B2 | 8/2013 | Nguyen | |
| 8,505,573 B2 | 8/2013 | Herbert | |
| 8,516,087 B2 | 8/2013 | Wilson | |
| 8,527,549 B2 | 9/2013 | Cidon | |
| 8,528,834 B2 | 9/2013 | Skinner | |
| 8,529,028 B2 | 9/2013 | Borra | |
| 8,532,831 B2 | 9/2013 | Crist | |
| 8,534,641 B2 | 9/2013 | Schalowski | |
| 8,538,592 B2 | 9/2013 | Alexanian | |
| 8,540,353 B2 | 9/2013 | Mallory | |
| 8,548,632 B1 | 10/2013 | Porter | |
| 8,550,427 B2 | 10/2013 | Yoshida | |
| 8,556,227 B2 | 10/2013 | Buestgens | |
| 8,556,228 B2 | 10/2013 | Marcichow | |
| 8,556,232 B2 | 10/2013 | Oikawa | |
| 8,556,393 B2 | 10/2013 | Mallory | |
| 8,558,653 B2 * | 10/2013 | Wo | H02K 3/524 336/192 |
| 8,565,904 B2 | 10/2013 | Bragg et al. | |
| 8,567,755 B2 | 10/2013 | Najmolhoda | |
| 8,573,255 B2 | 11/2013 | Pifer | |
| 8,576,032 B2 | 11/2013 | Herbert | |
| 8,579,251 B2 | 11/2013 | Ambrosi | |
| 8,581,682 B2 | 11/2013 | Patino | |
| 8,584,704 B2 | 11/2013 | Pifer | |
| 8,596,774 B2 | 12/2013 | Borra | |
| 8,600,569 B2 | 12/2013 | Woytowitz | |
| 8,606,415 B1 | 12/2013 | Woytowitz | |
| 8,613,420 B2 | 12/2013 | Linortner | |
| 8,620,480 B2 | 12/2013 | Alexanian | |
| 8,620,481 B2 | 12/2013 | Holindrake | |
| 8,630,743 B2 | 1/2014 | Marsters | |
| 8,632,050 B2 | 1/2014 | Stoeckel | |
| 8,635,350 B2 | 1/2014 | Gutt | |
| 8,636,346 B2 | 1/2014 | Borra | |
| 8,641,177 B2 | 2/2014 | Borra | |
| 8,649,907 B2 | 2/2014 | Ersavas | |
| 8,650,069 B2 | 2/2014 | Mason, Sr. | |
| 8,650,898 B2 | 2/2014 | Ma | |
| 8,651,453 B2 | 2/2014 | Heyer | |
| 8,659,183 B2 | 2/2014 | Crist | |
| 8,659,372 B2 * | 2/2014 | Morimura | H01H 50/02 335/201 |
| 8,660,705 B2 | 2/2014 | Woytowitz | |
| 8,662,471 B2 | 3/2014 | Ohmi | |
| 8,662,647 B2 | 3/2014 | Rosati | |
| 8,669,836 B2 | 3/2014 | Kulke | |
| 8,678,343 B2 | 3/2014 | Czimmek | |
| 8,690,118 B2 | 4/2014 | Bunni | |
| 8,695,620 B2 | 4/2014 | Bush | |
| 8,700,222 B1 | 4/2014 | Woytowitz | |
| 8,708,466 B2 | 4/2014 | Mallory | |
| 8,712,592 B2 | 4/2014 | Carlson | |
| 8,714,519 B2 | 5/2014 | Voss | |
| 8,717,133 B2 * | 5/2014 | Ooishi | H01F 37/00 336/55 |
| 8,720,400 B2 | 5/2014 | Dinkel | |
| 8,727,511 B2 | 5/2014 | Mallory | |
| 8,733,393 B2 | 5/2014 | Najmolhoda | |
| 8,733,395 B2 | 5/2014 | Najmolhoda | |
| 8,733,908 B2 | 5/2014 | Borra | |
| 8,736,409 B2 | 5/2014 | Mita | |
| 8,738,188 B2 | 5/2014 | Nickerson | |
| 8,738,189 B2 | 5/2014 | Alexanian | |
| D706,389 S | 6/2014 | McLauchlan | |
| D706,390 S | 6/2014 | McLauchlan | |
| 8,739,830 B2 | 6/2014 | Bradbury | |
| 8,740,113 B2 | 6/2014 | Roessle | |
| 8,751,052 B1 | 6/2014 | Campbell | |
| 8,757,209 B2 | 6/2014 | Morgan | |
| 8,757,584 B2 | 6/2014 | Bill | |
| 8,757,586 B2 | 6/2014 | Gruen | |
| 8,757,587 B2 | 6/2014 | Miura | |
| 8,777,388 B2 | 7/2014 | Borra | |
| 8,783,653 B2 | 7/2014 | Jamison | |
| 8,793,024 B1 | 7/2014 | Woytowitz | |
| 8,793,025 B2 | 7/2014 | Lorenz | |
| 8,794,748 B2 | 8/2014 | Borra | |
| 8,807,725 B2 | 8/2014 | Borra | |
| 8,812,007 B2 | 8/2014 | Hitt | |
| 8,817,431 B2 | 8/2014 | Tomimbang | |
| 8,827,236 B2 | 9/2014 | Mangiafico | |
| 8,839,135 B2 | 9/2014 | Vander Griend | |
| 8,840,084 B2 | 9/2014 | Crist | |
| 8,847,716 B2 | 9/2014 | Fonville | |
| 8,849,461 B2 | 9/2014 | Ersavas | |
| 8,851,447 B2 * | 10/2014 | Crist | A01G 25/16 251/129.04 |
| 8,854,165 B2 | 10/2014 | Irwin | |
| 8,862,277 B1 | 10/2014 | Campbell | |
| 8,868,246 B2 | 10/2014 | Thornton | |
| 8,879,218 B2 | 11/2014 | Tomimbang | |
| 8,880,204 B2 | 11/2014 | Frei | |
| 8,882,247 B2 | 11/2014 | Borra | |
| 8,890,505 B2 | 11/2014 | Forbes, Jr. | |
| 8,909,381 B2 | 12/2014 | Crist | |
| 8,911,621 B2 | 12/2014 | Lippert | |
| 8,924,587 B2 | 12/2014 | Petite | |
| 8,924,891 B2 | 12/2014 | Hunts | |
| 8,930,032 B2 | 1/2015 | Shupe | |
| 8,931,758 B2 | 1/2015 | Kasagi | |
| 8,936,041 B2 | 1/2015 | Yun | |
| 8,944,100 B2 | 2/2015 | Pifer | |
| 8,944,101 B2 | 2/2015 | Pifer | |
| 8,948,921 B2 | 2/2015 | Halahan | |
| 8,955,822 B2 | 2/2015 | Parsons | |
| 8,957,748 B2 | 2/2015 | Tomimbang | |
| 8,960,233 B2 | 2/2015 | Nishinosono et al. | |
| 8,967,746 B2 | 3/2015 | Borra | |
| 8,973,895 B2 | 3/2015 | Thomas | |
| 8,977,400 B1 | 3/2015 | Porter | |
| 8,985,550 B2 | 3/2015 | Miura | |
| 8,991,955 B2 | 3/2015 | Borra | |
| 8,995,098 B2 | 3/2015 | Tomimbang | |
| 8,996,183 B2 | 3/2015 | Forbes, Jr. | |
| 8,998,114 B2 | 4/2015 | Olivier | |
| D728,746 S | 5/2015 | McLauchlan | |

(56) References Cited

U.S. PATENT DOCUMENTS

| | | |
|---|---|---|
| D728,747 S | 5/2015 | McLauchlan |
| 9,032,998 B2 | 5/2015 | O'Brien |
| 9,043,036 B2 | 5/2015 | Fekete |
| 9,049,821 B1 | 6/2015 | Hanna |
| 9,068,663 B2 | 6/2015 | Zhang |
| 9,069,337 B2 | 6/2015 | Forbes, Jr. |
| 9,074,699 B2 | 7/2015 | Jamison |
| 9,114,365 B2 | 8/2015 | Schmitt |
| 9,117,577 B2 | 8/2015 | Zurke |
| 9,127,780 B2 * | 9/2015 | Schnelker ............ F16K 31/0658 |
| 9,130,402 B2 | 9/2015 | Forbes, Jr. |
| 9,131,642 B2 | 9/2015 | Groeneveld |
| 9,140,378 B2 | 9/2015 | Da Pont |
| 9,149,013 B2 | 10/2015 | Andrews |
| 9,157,545 B2 | 10/2015 | Czimmek |
| 9,161,499 B2 | 10/2015 | Bailey |
| 9,169,626 B2 | 10/2015 | Guler |
| 9,169,941 B2 | 10/2015 | Lee |
| 9,183,163 B2 | 11/2015 | Frei |
| 9,184,524 B2 | 11/2015 | Tomita |
| 9,185,365 B2 | 11/2015 | Hong |
| 9,192,110 B2 | 11/2015 | Standerfer |
| 9,201,815 B2 | 12/2015 | Frei |
| 9,208,676 B2 | 12/2015 | Fadell |
| 9,222,593 B1 | 12/2015 | Clark |
| D747,784 S | 1/2016 | McLauchlan |
| 9,241,451 B2 | 1/2016 | Ersavas |
| 9,244,449 B2 | 1/2016 | Tennyson |
| 9,249,895 B2 | 2/2016 | Hettinger |
| 9,258,952 B2 | 2/2016 | Walker |
| D750,746 S | 3/2016 | McLauchlan |
| 9,279,756 B2 | 3/2016 | Bush |
| 9,288,102 B2 | 3/2016 | Sobhy |
| 9,301,460 B2 | 4/2016 | Runge |
| 9,305,694 B2 | 4/2016 | Shimizu |
| 9,320,205 B2 | 4/2016 | Ensworth |
| 9,343,853 B2 | 5/2016 | Okada |
| 9,348,338 B2 | 5/2016 | Nickerson |
| 9,366,351 B2 | 6/2016 | Engler |
| 9,371,803 B2 | 6/2016 | Pifer |
| 9,377,123 B2 | 6/2016 | Kibune |
| 9,389,157 B2 | 7/2016 | Bush |
| 9,395,010 B2 | 7/2016 | Jamison |
| 9,416,883 B2 | 8/2016 | Van Den Bijgaart |
| 9,425,978 B2 | 8/2016 | Frei |
| 9,435,460 B2 | 9/2016 | Herbert |
| 9,470,332 B2 | 10/2016 | Miura |
| 9,488,097 B2 | 11/2016 | Steinman |
| 9,493,936 B2 | 11/2016 | Bush |
| 9,500,291 B2 | 11/2016 | Pifer |
| 9,528,626 B2 | 12/2016 | Holmes |
| 9,551,427 B2 | 1/2017 | Van Den Bijgaart |
| 9,583,248 B2 | 2/2017 | Toda |
| 9,598,847 B2 | 3/2017 | Marcichow |
| 9,602,655 B2 | 3/2017 | Shamoon |
| 9,627,121 B2 * | 4/2017 | Peterson .................. H01F 7/08 |
| 9,665,106 B2 | 5/2017 | Lorenz |
| 9,678,485 B2 | 6/2017 | Malaugh |
| 9,679,690 B2 | 6/2017 | Nila |
| 9,681,610 B2 | 6/2017 | Crist |
| 9,683,472 B2 | 6/2017 | Thomas |
| 9,703,275 B2 | 7/2017 | Ersavas |
| 9,704,122 B2 | 7/2017 | Jung |
| 9,733,274 B2 | 8/2017 | Pietrowicz |
| 9,746,097 B1 | 8/2017 | Ishii |
| 9,756,797 B2 | 9/2017 | Sarver |
| 9,763,393 B2 | 9/2017 | Parsons |
| 9,766,609 B2 | 9/2017 | Kah, Jr. |
| 9,781,887 B2 | 10/2017 | Woytowitz |
| 9,800,463 B2 | 10/2017 | Imes |
| 9,814,190 B1 | 11/2017 | Stange |
| 9,822,514 B2 | 11/2017 | Parsons |
| 9,829,869 B2 | 11/2017 | Ersavas |
| 9,832,939 B2 | 12/2017 | Russell |
| 9,872,445 B2 | 1/2018 | Cline |
| 9,927,045 B2 | 3/2018 | Morgan |
| 9,945,492 B2 | 4/2018 | Timmermans |
| 9,978,553 B2 | 5/2018 | Tomimbang |
| 10,024,448 B2 | 7/2018 | Watanabe |
| 10,041,401 B2 | 8/2018 | Lenk |
| 10,058,042 B2 | 8/2018 | Crist |
| D829,304 S | 9/2018 | McLauchlan |
| 10,070,596 B2 | 9/2018 | Crist |
| 10,125,890 B2 | 11/2018 | Bähr |
| 10,139,006 B2 | 11/2018 | Muraoka |
| 10,151,399 B2 | 12/2018 | Muraoka |
| 10,188,050 B2 | 1/2019 | Walker |
| 10,194,599 B2 | 2/2019 | Ensworth |
| 10,201,133 B2 | 2/2019 | Tennyson |
| 10,214,191 B2 | 2/2019 | Dreyer |
| 10,288,188 B2 | 5/2019 | Schieweck |
| 10,362,739 B2 | 7/2019 | Ersavas |
| 10,388,446 B2 | 8/2019 | Ott |
| 10,390,502 B2 | 8/2019 | Lorenz |
| 10,502,337 B2 | 12/2019 | Koyama |
| 10,716,269 B2 | 7/2020 | Ersavas |
| 10,772,267 B2 | 9/2020 | Tennyson |
| 2001/0049563 A1 | 12/2001 | Addink |
| 2002/0013679 A1 | 1/2002 | Petite |
| 2002/0031101 A1 | 3/2002 | Petite |
| 2002/0035414 A1 | 3/2002 | Morikawa |
| 2002/0088875 A1 | 7/2002 | Sirkin |
| 2002/0091452 A1 | 7/2002 | Addink |
| 2002/0096655 A1 | 7/2002 | Balsdon |
| 2002/0130287 A1 | 9/2002 | Smith |
| 2002/0138969 A1 | 10/2002 | Dallmeyer |
| 2002/0145125 A1 * | 10/2002 | Tomoda ............... F16K 31/0631 |
| | | 251/129.15 |
| 2002/0166986 A1 | 11/2002 | Remby |
| 2002/0169643 A1 | 11/2002 | Petite |
| 2003/0036810 A1 | 2/2003 | Petite |
| 2003/0042451 A1 | 3/2003 | Bendzinski |
| 2003/0051759 A1 | 3/2003 | Schmidt |
| 2003/0102453 A1 | 6/2003 | Fukano |
| 2003/0179102 A1 | 9/2003 | Barnes |
| 2003/0201675 A1 | 10/2003 | Alexanian |
| 2004/0020538 A1 | 2/2004 | Antunez |
| 2004/0046137 A1 | 3/2004 | Herbert |
| 2004/0051069 A1 | 3/2004 | Miyazoe |
| 2004/0070302 A1 | 4/2004 | Parker |
| 2004/0086053 A1 | 5/2004 | Anderson |
| 2004/0090329 A1 | 5/2004 | Hitt |
| 2004/0100394 A1 | 5/2004 | Hitt |
| 2005/0000579 A1 | 1/2005 | Burrola |
| 2005/0055106 A1 | 3/2005 | Beutler |
| 2005/0090936 A1 | 4/2005 | Hitt |
| 2005/0098752 A1 | 5/2005 | Burrola |
| 2005/0150560 A1 | 7/2005 | Amato |
| 2005/0156067 A1 | 7/2005 | Ivans |
| 2005/0156068 A1 | 7/2005 | Ivans |
| 2005/0192710 A1 | 9/2005 | Thornton |
| 2006/0029060 A1 | 2/2006 | Pister |
| 2006/0029061 A1 | 2/2006 | Pister |
| 2006/0049271 A1 | 3/2006 | Hitt |
| 2006/0076527 A1 | 4/2006 | Bush |
| 2006/0108552 A1 | 5/2006 | Herbert |
| 2006/0178847 A1 | 8/2006 | Glancy |
| 2006/0184285 A1 | 8/2006 | Evelyn-Veere |
| 2006/0185654 A1 | 8/2006 | Modien |
| 2006/0271297 A1 | 11/2006 | Repelli |
| 2006/0272830 A1 | 12/2006 | Fima |
| 2006/0282467 A1 | 12/2006 | Peterson |
| 2007/0010915 A1 | 1/2007 | Burson |
| 2007/0016334 A1 | 1/2007 | Smith |
| 2007/0057217 A1 | 3/2007 | Kamidate |
| 2007/0088462 A1 | 4/2007 | Peleg |
| 2007/0140274 A1 | 6/2007 | Battistutto |
| 2007/0191991 A1 | 8/2007 | Addink |
| 2007/0203860 A1 | 8/2007 | Golden |
| 2007/0221750 A1 | 9/2007 | Roberts |
| 2007/0222581 A1 | 9/2007 | Hawkins |
| 2007/0239317 A1 | 10/2007 | Bogolea |
| 2007/0257757 A1 | 11/2007 | Kolb |
| 2007/0261245 A1 | 11/2007 | Hayashi |

(56) References Cited

U.S. PATENT DOCUMENTS

| | | |
|---|---|---|
| 2007/0291689 A1 | 12/2007 | Kapur |
| 2008/0001595 A1 | 1/2008 | Ha |
| 2008/0027586 A1 | 1/2008 | Hern |
| 2008/0027587 A1 | 1/2008 | Nickerson |
| 2008/0033775 A1 | 2/2008 | Dawson |
| 2008/0040509 A1 | 2/2008 | Werb |
| 2008/0097653 A1 | 4/2008 | Kaprielian |
| 2008/0119948 A1 | 5/2008 | O'Connor |
| 2008/0129495 A1 | 6/2008 | Hitt |
| 2008/0136620 A1 | 6/2008 | Lee |
| 2008/0147205 A1 | 6/2008 | Ollis |
| 2008/0148725 A1 | 6/2008 | Jacobsen |
| 2008/0157995 A1 | 7/2008 | Crist |
| 2008/0183842 A1 | 7/2008 | Raji |
| 2008/0199359 A1 | 8/2008 | Davis |
| 2008/0204176 A1 | 8/2008 | Sriraksat |
| 2008/0253327 A1 | 10/2008 | Kohvakka |
| 2008/0272208 A1 | 11/2008 | Anderson |
| 2008/0288116 A1 | 11/2008 | Nickerson |
| 2008/0289693 A1 | 11/2008 | Irwin |
| 2008/0297288 A1 | 12/2008 | Irwin |
| 2008/0302172 A1 | 12/2008 | Kates |
| 2008/0309441 A1 | 12/2008 | Anderson |
| 2009/0007706 A1 | 1/2009 | Hitt |
| 2009/0008471 A1 | 1/2009 | Wilson |
| 2009/0008472 A1 | 1/2009 | Wilson |
| 2009/0043427 A1 | 2/2009 | Addink |
| 2009/0094097 A1 | 4/2009 | Gardenswartz |
| 2009/0099701 A1 | 4/2009 | Li |
| 2009/0101855 A1 | 4/2009 | Nguyen |
| 2009/0120521 A1 | 5/2009 | Clark |
| 2009/0121049 A1 | 5/2009 | Flynn |
| 2009/0138105 A1 | 5/2009 | Crawford |
| 2009/0138131 A1 | 5/2009 | Uy |
| 2009/0145974 A1 | 6/2009 | Fekete |
| 2009/0150001 A1 | 6/2009 | Fekete |
| 2009/0150002 A1 | 6/2009 | Fekete |
| 2009/0168678 A1 | 7/2009 | Han |
| 2009/0177330 A1 | 7/2009 | Kah |
| 2009/0211096 A1 | 8/2009 | Seitter |
| 2009/0212248 A1 | 8/2009 | Kozak |
| 2009/0217189 A1 | 8/2009 | Martin |
| 2009/0217194 A1 | 8/2009 | Martin |
| 2009/0222140 A1 | 9/2009 | Christiansen |
| 2009/0222141 A1 | 9/2009 | Ensworth |
| 2009/0223128 A1 | 9/2009 | Kuschak |
| 2009/0267008 A1 | 10/2009 | Lucas |
| 2009/0276102 A1 | 11/2009 | Smith |
| 2009/0281672 A1 | 11/2009 | Pourzia |
| 2009/0291575 A1 | 11/2009 | Henry |
| 2009/0302870 A1 | 12/2009 | Paterson |
| 2009/0308460 A1 | 12/2009 | Tschurtz |
| 2009/0309755 A1 | 12/2009 | Williamson |
| 2009/0328176 A1 | 12/2009 | Martin |
| 2010/0001223 A1 | 1/2010 | Tschurtz |
| 2010/0004789 A1 | 1/2010 | Savelle |
| 2010/0019181 A1 | 1/2010 | Herbert |
| 2010/0038440 A1 | 2/2010 | Ersavas |
| 2010/0049563 A1 | 2/2010 | Lopez Seco |
| 2010/0059698 A1 | 3/2010 | Guggenmos |
| 2010/0078584 A1 | 4/2010 | Van Den Bijgaart |
| 2010/0082169 A1 | 4/2010 | Crist |
| 2010/0082744 A1 | 4/2010 | Raji |
| 2010/0084591 A1 | 4/2010 | Shiao |
| 2010/0094923 A1 | 4/2010 | Martinez |
| 2010/0097733 A1 | 4/2010 | E. |
| 2010/0109685 A1 | 5/2010 | Morton |
| 2010/0111727 A1 | 5/2010 | Yamagata |
| 2010/0122733 A1 | 5/2010 | Grygus |
| 2010/0123535 A1 | 5/2010 | Yamagata |
| 2010/0131119 A1 | 5/2010 | Brundisini |
| 2010/0155638 A1 | 6/2010 | Zurke |
| 2010/0161144 A1 | 6/2010 | Crist |
| 2010/0179701 A1 | 7/2010 | Gilbert |
| 2010/0187457 A1 | 7/2010 | Kratzer |
| 2010/0187458 A1 | 7/2010 | Ueda |
| 2010/0193720 A1 | 8/2010 | Cripps |
| 2010/0198712 A1 | 8/2010 | Benisti |
| 2010/0218833 A1 | 9/2010 | Bush |
| 2010/0251807 A1 | 10/2010 | Morton |
| 2010/0252760 A1 | 10/2010 | Hettinger |
| 2010/0252769 A1 | 10/2010 | Goepfert |
| 2010/0256827 A1 | 10/2010 | Bragg |
| 2010/0268391 A1 | 10/2010 | Anderson |
| 2010/0269923 A1 | 10/2010 | Parsons |
| 2010/0289411 A1 | 11/2010 | Smits |
| 2010/0294971 A1 | 11/2010 | Hajjar |
| 2010/0308245 A1 | 12/2010 | Fink |
| 2010/0313980 A1 | 12/2010 | Shimizu |
| 2010/0314567 A1 | 12/2010 | Uechi |
| 2010/0324987 A1 | 12/2010 | Benisti |
| 2010/0325005 A1 | 12/2010 | Benisti |
| 2010/0327199 A1 | 12/2010 | Linortner |
| 2011/0001072 A1 | 1/2011 | Tagata |
| 2011/0005481 A1 | 1/2011 | Dinkel |
| 2011/0011783 A1 | 1/2011 | Lippert |
| 2011/0012041 A1 | 1/2011 | De Santis |
| 2011/0015794 A1 | 1/2011 | Lorenz |
| 2011/0017845 A1 | 1/2011 | Crist |
| 2011/0024665 A1 | 2/2011 | Hajjar |
| 2011/0037006 A1 | 2/2011 | Zurke |
| 2011/0042598 A1 | 2/2011 | Kozak |
| 2011/0043230 A1 | 2/2011 | Morton |
| 2011/0049405 A1 | 3/2011 | Bill |
| 2011/0054642 A1 | 3/2011 | Bondar |
| 2011/0057133 A1 | 3/2011 | Nisinosono |
| 2011/0062361 A1 | 3/2011 | Yoshida |
| 2011/0068286 A1 | 3/2011 | Nomichi |
| 2011/0073188 A1 | 3/2011 | Marcus |
| 2011/0073788 A1 | 3/2011 | Marcus |
| 2011/0073791 A1 | 3/2011 | Oikawa |
| 2011/0077785 A1 | 3/2011 | Nickerson |
| 2011/0079740 A1 | 4/2011 | Bill |
| 2011/0080240 A1 | 4/2011 | Patino |
| 2011/0111700 A1 | 5/2011 | Hackett |
| 2011/0121217 A1 | 5/2011 | Ohmi |
| 2011/0147629 A1 | 6/2011 | Gruen |
| 2011/0148552 A1 | 6/2011 | Tomimbang |
| 2011/0148555 A1 | 6/2011 | Sasao |
| 2011/0155934 A1 | 6/2011 | Guler |
| 2011/0168813 A1 | 7/2011 | Bunni |
| 2011/0168929 A1 | 7/2011 | Buestgens |
| 2011/0180464 A1 | 7/2011 | Schmitt |
| 2011/0180736 A1 | 7/2011 | Mangiafico |
| 2011/0186760 A1 | 8/2011 | Michl |
| 2011/0190947 A1 | 8/2011 | Savelle |
| 2011/0190948 A1 | 8/2011 | Fekete |
| 2011/0198522 A1 | 8/2011 | Ambrosi |
| 2011/0204272 A1 | 8/2011 | Kratzer |
| 2011/0215271 A1 | 9/2011 | Voss |
| 2011/0224836 A1 | 9/2011 | Hern |
| 2011/0227676 A1 | 9/2011 | Cotic |
| 2011/0248198 A1 | 10/2011 | Huang |
| 2011/0248805 A1 | 10/2011 | Hamaoka |
| 2011/0279576 A1 | 11/2011 | Borra |
| 2011/0279577 A1 | 11/2011 | Borra |
| 2011/0279579 A1 | 11/2011 | Borra |
| 2011/0288690 A1 | 11/2011 | Ensworth |
| 2011/0301767 A1 | 12/2011 | Alexanian |
| 2011/0302708 A1 | 12/2011 | Parsons |
| 2012/0068096 A1 | 3/2012 | Herbert |
| 2012/0078425 A1 | 3/2012 | Gardenswartz |
| 2012/0085950 A1 | 4/2012 | Lorenz |
| 2012/0089259 A1 | 4/2012 | Williams |
| 2012/0089373 A1 | 4/2012 | Hong |
| 2012/0109387 A1 | 5/2012 | Martin |
| 2012/0132296 A1 | 5/2012 | Parsons |
| 2012/0205568 A1 | 8/2012 | Bush |
| 2012/0221718 A1 | 8/2012 | Imes |
| 2012/0222634 A1 | 9/2012 | Dinkel |
| 2012/0232708 A1 | 9/2012 | Ensworth |
| 2012/0266095 A1 | 10/2012 | Killian |
| 2012/0290139 A1 | 11/2012 | Brundisini |
| 2013/0002012 A1 | 1/2013 | Korol |

(56) References Cited

U.S. PATENT DOCUMENTS

| | | |
|---|---|---|
| 2013/0025721 A1 | 1/2013 | Yun |
| 2013/0035774 A1 | 2/2013 | Warren |
| 2013/0048746 A1 | 2/2013 | Littrell |
| 2013/0061380 A1 | 3/2013 | Parsons |
| 2013/0061381 A1 | 3/2013 | Parsons |
| 2013/0063231 A1 | 3/2013 | Tomimbang |
| 2013/0085619 A1 | 4/2013 | Howard |
| 2013/0110293 A1 | 5/2013 | Illig |
| 2013/0173070 A1 | 7/2013 | Tennyson |
| 2013/0190934 A1 | 7/2013 | Holindrake |
| 2013/0264506 A1 | 10/2013 | Schnelker |
| 2013/0264507 A1* | 10/2013 | Schnelker ............ F16K 27/029 251/129.15 |
| 2013/0274932 A1 | 10/2013 | Curren |
| 2013/0284960 A1 | 10/2013 | Schnelker |
| 2013/0297082 A1 | 11/2013 | Ensworth |
| 2013/0306891 A1 | 11/2013 | Fietz |
| 2013/0310992 A1 | 11/2013 | Larsen |
| 2013/0318231 A1 | 11/2013 | Raji |
| 2014/0005810 A1 | 1/2014 | Frei |
| 2014/0005843 A1 | 1/2014 | Thomas |
| 2014/0005851 A1 | 1/2014 | Frei |
| 2014/0006506 A1 | 1/2014 | Frei |
| 2014/0018965 A1 | 1/2014 | Pearson |
| 2014/0020379 A1 | 1/2014 | Steinman |
| 2014/0020663 A1 | 1/2014 | Pifer |
| 2014/0081471 A1 | 3/2014 | Woytowitz |
| 2014/0084194 A1 | 3/2014 | Kibune |
| 2014/0088770 A1 | 3/2014 | Masters |
| 2014/0129039 A1 | 5/2014 | Olive-Chahinian |
| 2014/0143397 A1 | 5/2014 | Gutt |
| 2014/0172180 A1 | 6/2014 | Woytowitz |
| 2014/0203200 A1 | 7/2014 | Da Silva |
| 2014/0222223 A1 | 8/2014 | Horton |
| 2014/0229024 A1 | 8/2014 | Wang |
| 2014/0236868 A1 | 8/2014 | Cook |
| 2014/0239211 A1 | 8/2014 | Morgan |
| 2014/0245160 A1 | 8/2014 | Bauer |
| 2014/0264114 A1 | 9/2014 | Farace |
| 2014/0361206 A1 | 12/2014 | Holmes |
| 2014/0367595 A1 | 12/2014 | Miura |
| 2014/0374512 A1 | 12/2014 | Honjo |
| 2015/0005965 A1 | 1/2015 | Ensworth |
| 2015/0019031 A1 | 1/2015 | Crist |
| 2015/0047897 A1 | 2/2015 | Zimet |
| 2015/0088324 A1 | 3/2015 | Crist |
| 2015/0102243 A1 | 4/2015 | Timmermans |
| 2015/0279538 A1 | 10/2015 | Toda |
| 2015/0280541 A1 | 10/2015 | Ando |
| 2015/0380143 A1 | 12/2015 | Saiki |
| 2016/0092600 A1 | 3/2016 | Chan |
| 2016/0113219 A1 | 4/2016 | Tennyson |
| 2016/0123490 A1 | 5/2016 | McLauchlan |
| 2016/0157446 A1 | 6/2016 | Bentwich |
| 2016/0198646 A1 | 7/2016 | Ensworth |
| 2016/0295819 A1 | 10/2016 | Porter |
| 2017/0081028 A1 | 3/2017 | Jones |
| 2017/0094918 A1 | 4/2017 | Crist |
| 2017/0191580 A1 | 7/2017 | Pifer |
| 2017/0223911 A1 | 8/2017 | Lorenz |
| 2017/0234445 A1* | 8/2017 | Watanabe ............... F16F 1/187 251/65 |
| 2017/0367277 A1 | 12/2017 | Mohindra |
| 2017/0370495 A1 | 12/2017 | Markley |
| 2018/0231139 A1 | 8/2018 | Morgan |
| 2018/0279566 A1 | 10/2018 | Wlassich |
| 2018/0332784 A1 | 11/2018 | Crist |
| 2018/0338436 A1 | 11/2018 | Crist |
| 2018/0341764 A1 | 11/2018 | Chou |
| 2018/0368261 A1 | 12/2018 | Kwak |
| 2019/0078543 A1 | 3/2019 | Yamazaki |
| 2019/0116743 A1 | 4/2019 | Ensworth |
| 2019/0150381 A1 | 5/2019 | Tennyson |

FOREIGN PATENT DOCUMENTS

| | | |
|---|---|---|
| CN | 1511383 | 7/2004 |
| CN | 101021729 A | 8/2007 |
| CN | 101849494 A | 10/2010 |
| CN | 102483628 A | 5/2012 |
| CN | 101849494 B | 11/2014 |
| CN | 102483628 B | 3/2016 |
| DE | 102011055586 A1 | 5/2013 |
| EP | 0748584 A1 | 12/1996 |
| EP | 1324166 A2 | 7/2003 |
| EP | 1763990 A2 | 3/2007 |
| EP | 1798907 | 6/2007 |
| EP | 2215906 A1 | 8/2010 |
| EP | 2281445 | 2/2011 |
| EP | 2281445 A2 | 2/2011 |
| EP | 3010027 A2 | 4/2016 |
| EP | 3301692 A1 | 4/2018 |
| ES | 2209614 A1 | 6/2004 |
| GB | 2177582 A | 1/1987 |
| JP | 2010034223 A | 2/2010 |
| TR | 200900883 A2 | 2/2009 |
| TR | 200805998 A2 | 12/2009 |
| WO | 8606579 A1 | 11/1986 |
| WO | 9708942 A1 | 3/1997 |
| WO | 1999039567 | 8/1999 |
| WO | 2001095277 | 12/2001 |
| WO | 0235193 A2 | 5/2002 |
| WO | 02058254 A1 | 7/2002 |
| WO | 2004040415 A2 | 5/2004 |
| WO | 2005002321 A2 | 1/2005 |
| WO | 2007104152 A2 | 9/2007 |
| WO | 2007131169 | 11/2007 |
| WO | 2009132425 A1 | 11/2009 |
| WO | 2010019109 | 2/2010 |
| WO | 2011017059 A2 | 2/2011 |
| WO | 2011044289 | 4/2011 |
| WO | 2011044289 A1 | 4/2011 |
| WO | 2012153893 A1 | 11/2012 |
| WO | 2016007159 A1 | 1/2016 |
| WO | 2016027506 A1 | 2/2016 |
| WO | 2019211820 A1 | 11/2019 |

OTHER PUBLICATIONS

USPTO, U.S. Appl. No. 09/592,907, filed Jun. 13, 2000, entitled "Canister Purge Valve for High Regeneration Airflow," abandoned.
Rain Bird Corporation IC System Design Guide v 2.3, updated Aug. 2016, 21 pages.
Rain Bird Corporation IC System Operation and Troubleshooting Guide, Jul. 2009, 27 pages.
Rain Bird Corporation, IC System Installation Guide, Jul. 2009, 19 pages.
U.S. Appl. No. 16/992,962, filed Aug. 13, 2020, Michael James Tennyson et al., entitled Wireless Irrigation Control.
'PureSense on-line help', https://www.pserm.com/IrrigationManagerHelp/PureSens_Irrigation_Manager.htm, Mar. 24, 2010.
Akyildiz et al., "Wireless sensor networks: a survey," Computer Networks 38 (2002) 393-422.
EPO; App. No. 06018783.8; Extended European Search Report dated Nov. 5, 2012; 14 pages.
EPO; App. No. 10 170 920; Exam Report dated Dec. 19, 2012; 6 pages.
EPO; App. No. 10822643.2; Extended European Search Report dated Nov. 17, 2014.
EPO; App. No. Ep 06018783; Supplementary Partial European Search Report dated Dec. 15, 2011; 7 pages.
EPO; App. No. Ep 10170920.2; European Search Report dated Mar. 8, 2012; 7 pages.
EPO; App. No. EP09180196; Extended European Search Report dated Apr. 9, 2010; 7 pages.
Intel, "Instrumenting the World: An Introduction to Wireless Sensor Networks," Version 1, Feb. 2004.
Li, "Study on Precision Agriculture Monitoring Framework Based on WSN," Anti-counterfeiting, Security, and Identification, 2nd International Conference, 2008, 182-185.

(56) References Cited

OTHER PUBLICATIONS

Microchip Technology Inc.; PIC/16F631/677/685/687,689/690 Data Sheet; 20-Pin Flash-Based, 8-Bit CMOS Microcontrollers with Nano Watt Technology; 2006; 294 pages.
Nokia, "Machine-to-Machine," White Paper (2004).
PCT; App. No. PCT/TR2009/000103; International Report on Patentability dated Feb. 24, 2011.
PCT; App. No. PCT/TR2009/000103; International Search Report dated Feb. 1, 2010.
PCT; App. No. PCT/TR2009/000103; Written Opinion dated Feb. 12, 2011.
PCT; App. No. PCT/US2010/043273; International Search Report dated Mar. 2, 2011; 3 pages.
PCT; App. No. PCT/US2010/043273; Written Opinion of the International Searching Authority dated Mar. 2, 2011; 3 pages.
PCT; International Search Report corresponding to International Application No. PCT/ US2007/068242; dated Jul. 28, 2008; 4 Pages.
PCT; International Search Report corresponding to International Application No. PCT/ US2010/051699; dated Nov. 30, 2010; 2 Pages.
PCT; Written Opinion of the International Searching Authority corresponding to International Application No. PCT/US2010/051699; dated Nov. 30, 2010; 8 Pages.
Rain Bird, 'FD Field Decoders: Rain Bird Decoders', Feb. 17, 2005, pp. 1-4, printed from www.rainbird.com/golf/products/centralcontrol/decoders.htm, Rain Bird Corporation, Glendora, CA.
Rain Bird, 'Full/Part Circle Roters', Oct. 2004, pp. 1-4, Catalog No. 438, Rain Bird Corporation, Glendora, CA.
Rain Bird, 'Tech Specs: Rain Bird Decoders', Oct. 2004, Rain Bird Corporation Golf Division, Tucson, AZ; 2 pages.
Rain Bird, "Master Parts Book 2008-2009", Jan. 2008, pp. 129-130, 140, Rain Bird Corporation, Parts and Service Center, Azusa, CA.
Rain Bird, "Maxicom2 Decoders: Sensor-Pulse", Sep., 2002, pp. 1-2, Rain Bird Corporation, Azusa, CA.
Rain Bird, "Rain Bird Latching Solenoid: Part No. 231831", 1999, Rain Bird Corporation, Tucson, AZ, 1 page.
Rain Bird, "Rain Bird MDC Decoder-based Control System", Jan., 2006, pp. 1-4, Rain Bird Corporation, Azusa, CA.
SIPO; App. No. 200911000193.6; Office Action dated Nov. 5, 2012; 23 pages.
SIPO; App. No. 201080037966.2; Office Action and partial summary translation provided by Chinese Associate dated Jan. 6, 2014; 6 pages.
SIPO; App. No. 201080037966.2; Office Action dated Sep. 3, 2014; 14 pages.
The Toro Company; "Golf Decoder Control System (GDC)"; http://web.archive.org/web/20070625035525/www.toro.com/irrigation/golf/Igturffield/gdc/index.html; Available at least as early as Jun. 25, 2007, pp. 66.
USPTO; U.S. Appl. No. 13/844,304; Office Action dated Oct. 16, 2015.
USPTO; U.S. Appl. No. 13/500,882 ; Office Action dated Dec. 18, 2014.
USPTO; U.S. Appl. No. 11/228,413; Examiner Interview Summary dated Apr. 22, 2009; 2 pages.
USPTO; U.S. Appl. No. 11/228,413; Examiner Interview Summary dated Dec. 7, 2009; 2 pages.
USPTO; U.S. Appl. No. 11/228,413; Notice of Allowance dated Jun. 18, 2010; 8 pages.
USPTO; U.S. Appl. No. 11/228,413; Notice of Panel Decision from Pre-Appeal Brief Review dated Apr. 28, 2010; 2 pages.
USPTO; U.S. Appl. No. 11/228,413; Office Action dated Apr. 2, 2008; 12 pages.
USPTO; U.S. Appl. No. 11/228,413; Office Action dated May 20, 2009; 10 pages.
USPTO; U.S. Appl. No. 11/228,413; Office Action dated Dec. 2, 2008; 9 pages.
USPTO; U.S. Appl. No. 11/228,413; Office Action dated Dec. 7, 2009; 12 pages.
USPTO; U.S. Appl. No. 11/228,413; Supplemental Notice of Allowance dated Aug. 5, 2010; 4 pages.
USPTO; U.S. Appl. No. 11/228,413; Supplemental Notice of Allowance dated Sep. 2, 2010; 4 pages.
USPTO; U.S. Appl. No. 12/505,397; Office Action dated Feb. 13, 2013; 16 pages.
USPTO; U.S. Appl. No. 12/505,401; Notice of Allowance dated May 7, 2012; 5 pages.
USPTO; U.S. Appl. No. 12/505,401; Office Action dated Oct. 31, 2011; 14 pages.
USPTO; U.S. Appl. No. 12/510,111; Notice of Allowance dated Apr. 2, 2014; 12 pages.
USPTO; U.S. Appl. No. 12/510,111; Notice of Allowance dated May 16, 2014; 9 pages.
USPTO; U.S. Appl. No. 12/510,111; Office Action dated Jun. 4, 2013; 22 pages.
USPTO; U.S. Appl. No. 12/510,111; Office Action dated Oct. 16, 2012; 12 pages.
USPTO; U.S. Appl. No. 12/510,111; Office Action dated Dec. 27, 2013; 18 pages.
USPTO; U.S. Appl. No. 12/510,111; Office Action dated Feb. 29, 2012; 21 pages.
USPTO; U.S. Appl. No. 12/510,118; Notice of Allowance dated Apr. 2, 2014; 5 pages.
USPTO; U.S. Appl. No. 12/510,118; Notice of Allowance dated May 16, 2014; 9 pages.
USPTO; U.S. Appl. No. 12/510,118; Office Action dated Jun. 5, 2013; 20 pages.
USPTO; U.S. Appl. No. 12/510,118; Office Action dated Oct. 16, 2012; 15 pages.
USPTO; U.S. Appl. No. 12/510,118; Office Action dated Dec. 30, 2013; 17 pages.
USPTO; U.S. Appl. No. 12/510,118; Office Action dated Feb. 29, 2012; 21 pages.
USPTO; U.S. Appl. No. 12/537,772; Office Action dated Mar. 21, 2013.
USPTO; U.S. Appl. No. 12/537,772; Office Action dated Dec. 29, 2011.
USPTO; U.S. Appl. No. 12/849,488; Notice of Allowance dated Feb. 22, 2013.
USPTO; U.S. Appl. No. 12/849,488; Notice of Allowance dated Jul. 3, 2013.
USPTO; U.S. Appl. No. 12/849,488; Notice of Allowance dated Oct. 28, 2013.
USPTO; U.S. Appl. No. 12/849,488; Office Action dated Jun. 22, 2012.
USPTO; U.S. Appl. No. 12/866,471; Office Action dated Mar. 17, 2011; 18 pages.
USPTO; U.S. Appl. No. 12/886,471; Notice of Allowance dated Sep. 20, 2011; 7 pages.
USPTO; U.S. Appl. No. 12/886,471; Supplemental Notice of Allowance dated Oct. 19, 2011; 3 pages.
USPTO; U.S. Appl. No. 13/151,269; Office Action dated Jan. 18, 2012.
USPTO; U.S. Appl. No. 13/332,337; Notice of Allowance dated Mar. 13, 2014; 11 pages.
USPTO; U.S. Appl. No. 13/332,337; Notice of Allowance dated Dec. 6, 2013; 11 pages.
USPTO; U.S. Appl. No. 13/500,882; Notice of Allowance dated Oct. 5, 2015.
USPTO; U.S. Appl. No. 13/500,882; Office Action dated Apr. 3, 2015.
USPTO; U.S. Appl. No. 13/532,557; Notice of Allowance dated Apr. 4, 2017.
USPTO; U.S. Appl. No. 13/532,557; Notice of Allowance dated Jul. 31, 2017; (pp. 1-8).
USPTO; U.S. Appl. No. 13/532,557; Office Action dated Sep. 9, 2016.
USPTO; U.S. Appl. No. 13/532,557; Office Action dated Jan. 2, 2015.
USPTO; U.S. Appl. No. 13/532,557; Office Action dated Oct. 15, 2015.

(56) References Cited

OTHER PUBLICATIONS

USPTO; U.S. Appl. No. 13/570,139; Notice of Allowance dated May 9, 2013; 15 pages.
USPTO; U.S. Appl. No. 13/570,139; Office Action dated Dec. 26, 2012; 8 pages.
USPTO; U.S. Appl. No. 13/844,248; Notice of Allowance dated May 22, 2014.
USPTO; U.S. Appl. No. 13/844,304; Notice of Allowance dated Mar. 6, 2017.
USPTO; U.S. Appl. No. 13/844,304; Office Action dated Oct. 3, 2016.
USPTO; U.S. Appl. No. 13/844,304; Office Action dated Dec. 30, 2014.
USPTO; U.S. Appl. No. 13/963,966; Notice of Allowance dated Aug. 6, 2014; 7 pages.
USPTO; U.S. Appl. No. 13/963,966; Office Action dated Feb. 6, 2014; 16 pages.
USPTO; U.S. Appl. No. 14/304,502; Notice of Allowance dated Jan. 27, 2017; 8 pages.
USPTO; U.S. Appl. No. 14/304,502; Office Action dated Jul. 12, 2016; 12 pages.
USPTO; U.S. Appl. No. 14/466,469; Notice of Allowance dated Sep. 11, 2015.
USPTO; U.S. Appl. No. 14/466,469; Office Action dated Dec. 29, 2014.
USPTO; U.S. Appl. No. 14/493,106; Application filed Sep. 22, 2014, entitled "Integrated Control Circuitry and Coil Assembly for Irrigation Control," (57 pages).
USPTO; U.S. Appl. No. 14/493,106; Notice of Allowance dated Apr. 30, 2018.
USPTO; U.S. Appl. No. 14/493,106; Office Action dated Apr. 21, 2016; 14 pages.
USPTO; U.S. Appl. No. 14/493,106; Office Action dated Sep. 22, 2017.
USPTO; U.S. Appl. No. 14/493,106; Office Action dated Oct. 11, 2016; 9 pages.
USPTO; U.S. Appl. No. 14/507,751; Application filed Oct. 6, 2014, entitled "Integrated Control Circuitry and Coil Assembly for Irrigation Control," (57 pages).
USPTO; U.S. Appl. No. 14/507,751; Notice of Allowance dated Feb. 21, 2017; 8 pages.
USPTO; U.S. Appl. No. 14/507,751; Notice of Allowance dated Oct. 12, 2016; 6 pages.
USPTO; U.S. Appl. No. 14/507,751; Office Action dated Apr. 19, 2016; 14 pages.
USPTO; U.S. Appl. No. 14/970,349; Notice of Allowance dated Mar. 25, 2019; (pp. 1-10).
USPTO; U.S. Appl. No. 14/970,349; Notice of Allowance dated Oct. 2, 2018; (pp. 1-9).
USPTO; U.S. Appl. No. 14/970,349; Office Action dated Feb. 8, 2018; (pp. 1-10).
USPTO; U.S. Appl. No. 14/989,771; Notice of Allowance dated Sep. 13, 2018.
USPTO; U.S. Appl. No. 14/989,771; Office Action dated Feb. 22, 2018.
USPTO; U.S. Appl. No. 15/380,816; Notice of Allowance dated May 18, 2018.
USPTO; U.S. Appl. No. 15/380,816; Office Action dated Dec. 5, 2017.
USPTO; U.S. Appl. No. 15/499,620; Notice of Allowance dated Apr. 9, 2019; 7 pages.
USPTO; U.S. Appl. No. 15/499,620; Office Action dated Dec. 13, 2018; 7 pages.
USPTO; U.S. Appl. No. 15/616,736; Application filed Jun. 7, 2017, entitled "Methods and Systems for Irrigation and Climate Control," (77 pages).
USPTO; U.S. Appl. No. 15/616,736; Office Action dated Feb. 20, 2020; (pp. 1-15).
USPTO; U.S. Appl. No. 15/937,267; Office Action dated Jul. 6, 2020; (pp. 1-18).
USPTO; U.S. Appl. No. 15/937,267; Office Action dated Nov. 1, 2019; (pp. 1-17).
USPTO; U.S. Appl. No. 16/049,568; Office Action dated Jan. 13, 2020; (pp. 1-15).
USPTO; U.S. Appl. No. 16/052,471; Office Action dated Jan. 13, 2020; (pp. 1-15).
USPTO; U.S. Appl. No. 16/452,397; Notice of Allowance dated Mar. 11, 2020; (pp. 1-9).
USPTO: U.S. Appl. No. 15/616,736; Office Action dated May 29, 2019; (pp. 1-16).
USTPO; U.S. Appl. No. 14/493,106; Office Action dated Apr. 11, 2017; 11 pages.
Williamson; U.S. Appl. No. 60/797,540; Filed May 4, 2006; 13 Pages.
Zigbee, 'Zigbee Resource Guide—Spring 2008,' 2008, pp. 28-31, Fourier Systems Ltd., New Albany, IN.
Zigbee; 'Zigbee Resource Guide—Spring 2008;' 2008; pp. 1-32; Fourier Systems Ltd.; New Albany, IN.

\* cited by examiner

SOLENOID AND METHOD OF MANUFACTURE

CROSS-REFERENCE TO RELATED APPLICATIONS

This application claims benefit of U.S. Provisional Application No. 62/477,893, filed Mar. 28, 2017, and claims benefit of U.S. Provisional Application No. 62/353,811, filed Jun. 23, 2016, which are hereby incorporated herein by reference in their entirety.

FIELD

The present application generally relates to solenoids and, in particular, to solenoids configured for improved assembly efficiency and functionality.

BACKGROUND

Solenoids are used to control a variety of devices. For example, solenoids can be used in irrigation systems to control the function of a variety of devices, such as valves, rotors, and the like. In this regard, solenoids can be used in diaphragm valves, such as found in U.S. Pat. Nos. 7,694,934 and 8,740,177, to control the flow of water therethrough.

However, solenoids can be difficult and costly to manufacture. For example, solenoids typically include wires which extend from the body of the solenoid for connection to an electrical source and/or signal. These externally extending wires can make assembly of the solenoid difficult as the wires can get in the way of the assembly equipment and potentially require manual assembly during one or more steps of the manufacturing process.

Further, these externally extending wires can also permit water, dust, and other material to infiltrate the internal assembly of the solenoid. Such infiltration can occur over the course or time or as a result of imperfect sealing of the wires during assembly. This can cause the solenoid to work poorly or even fail.

In addition to addressing these issues, there is a desire to further improve the performance of solenoids. For instance, conversion of electrical current into the magnetic field in a solenoid may vary depending on the placement and assembly of the core and windings in the solenoid. The overall magnetic field may vary depending on the configuration of the internal components of the solenoid.

Solenoids can also be adapted to include electrical components such as sensors, circuits, communications devices, micro circuitry, and the like. In one form, solenoids may be used in irrigation systems that incorporate one or more controllers for sending signals to one or more solenoids for controlling water flow. However, one shortcoming is the ability to send data sensed in the irrigation zones back to the controller. It can be wirelessly sent when the sensors are in range. But, when the irrigation area is large, the wireless capability may not be able to reach the controller. There is a desire to address this communication issue.

Previously, external sensors, microcircuits, transceivers, and the like were coupled on an external side of the solenoid. In this form, the devices could be directly attached to the outer surface of the solenoid and/or electrically coupled to the external wires of the solenoid. In the past, it had been difficult to assemble/install such devices internally to the solenoid. Further, it had been difficult to provide room for such devices internally to the solenoid and, even if installed internally, was susceptible to overheating and/or shorting to the external electrical connections to the solenoid.

DETAILED DESCRIPTION

Solenoids can be used to control valves, such as diaphragm valves shown in U.S. Pat. No. 8,740,177, and sprinklers where the valves are integrated into a sprinkler. In one form, the solenoid can be used to control and relieve pressure in a control chamber of a diaphragm valve. The solenoid functions by opening a flow path between the control chamber and an outlet of the valve, thereby reducing pressure in the control chamber. As the pressure is reduced in the control chamber, the diaphragm valve opens to permit flow through the valve. The solenoid can then close, preventing flow out of the control chamber, thereby increasing the pressure in the control chamber until the valve closes.

Figure 1:
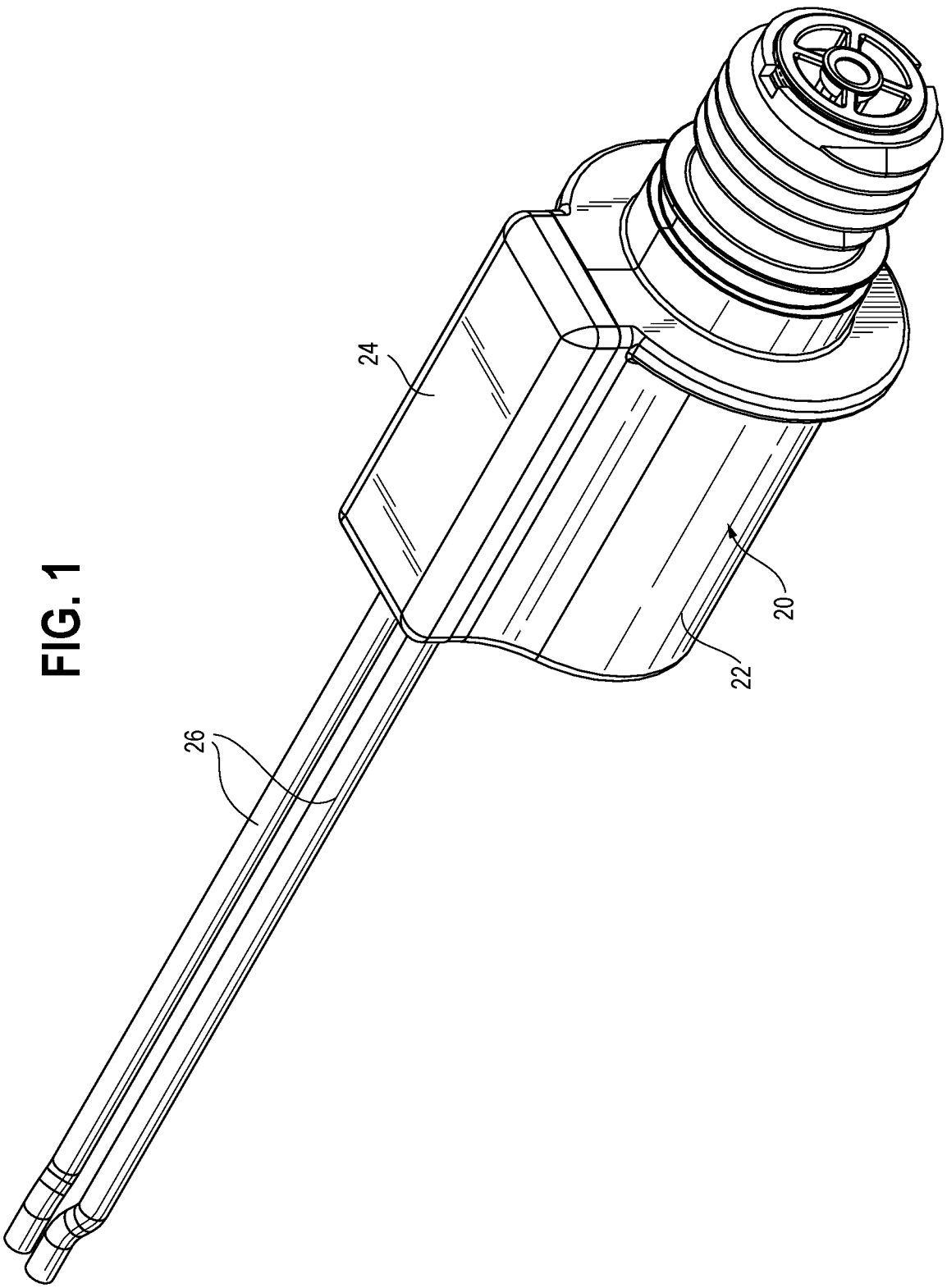
FIG. 1 is a perspective view of one form of solenoid.

Referring to FIG. 1, there is illustrated a solenoid 20. The solenoid 20 includes an outer housing 22, a lid or cover 24, as well as external wires 26 extending therefrom. The wires 26 are used to provide power to the solenoid 20 from a source (not shown) external to the outer housing 22. The wires 26 can also be used to send and/or receive signals between the solenoid and another device, such as a controller. In one form the outer housing 22 can be overmolded about internal components of the solenoid. The outer housing 22 can be made from a variety of materials such as nylon, other polymers, and the like.

Figure 2:
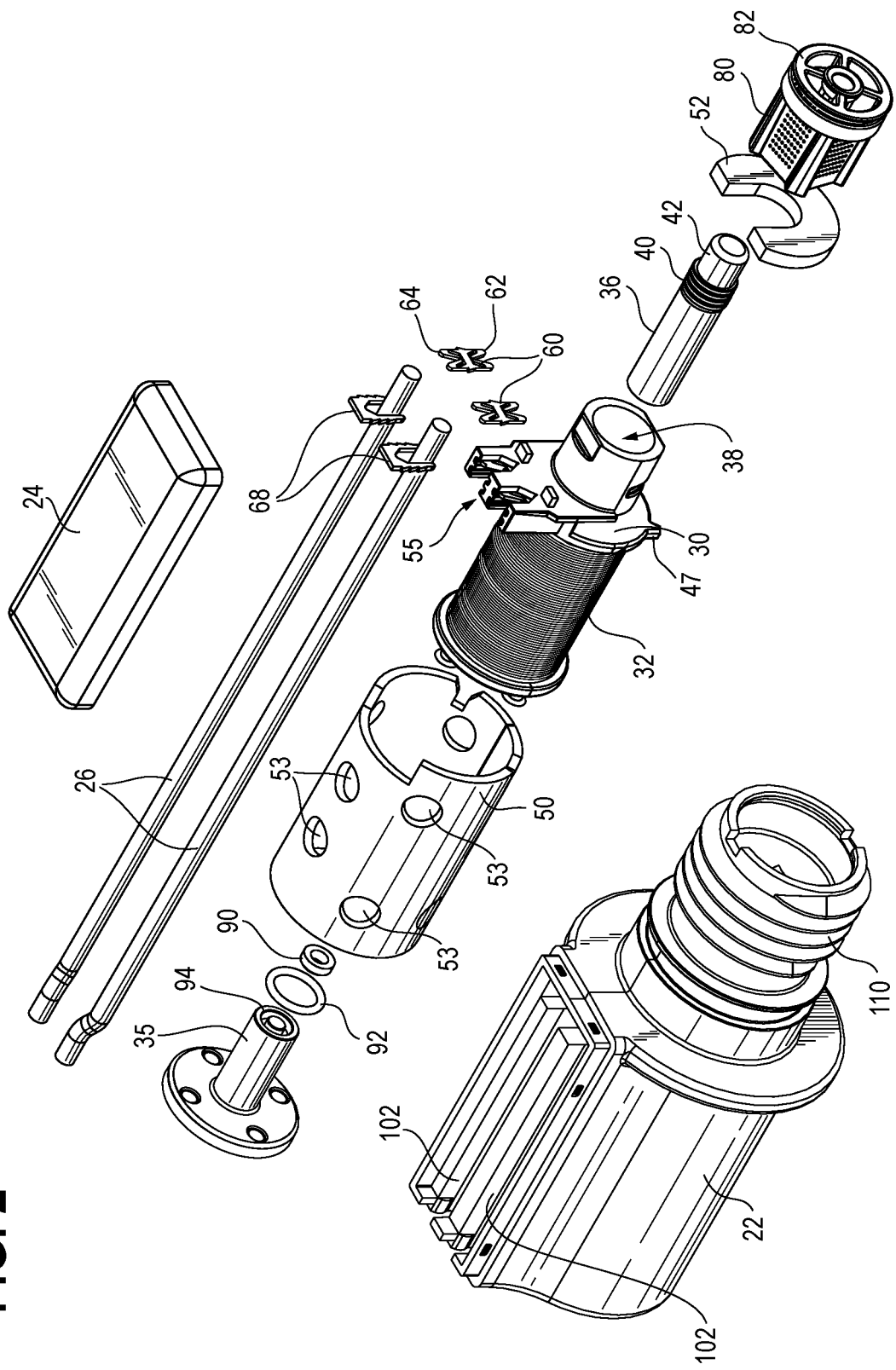
FIG. 2 is a partially exploded view of the solenoid of FIG. 1.
Figure 3:
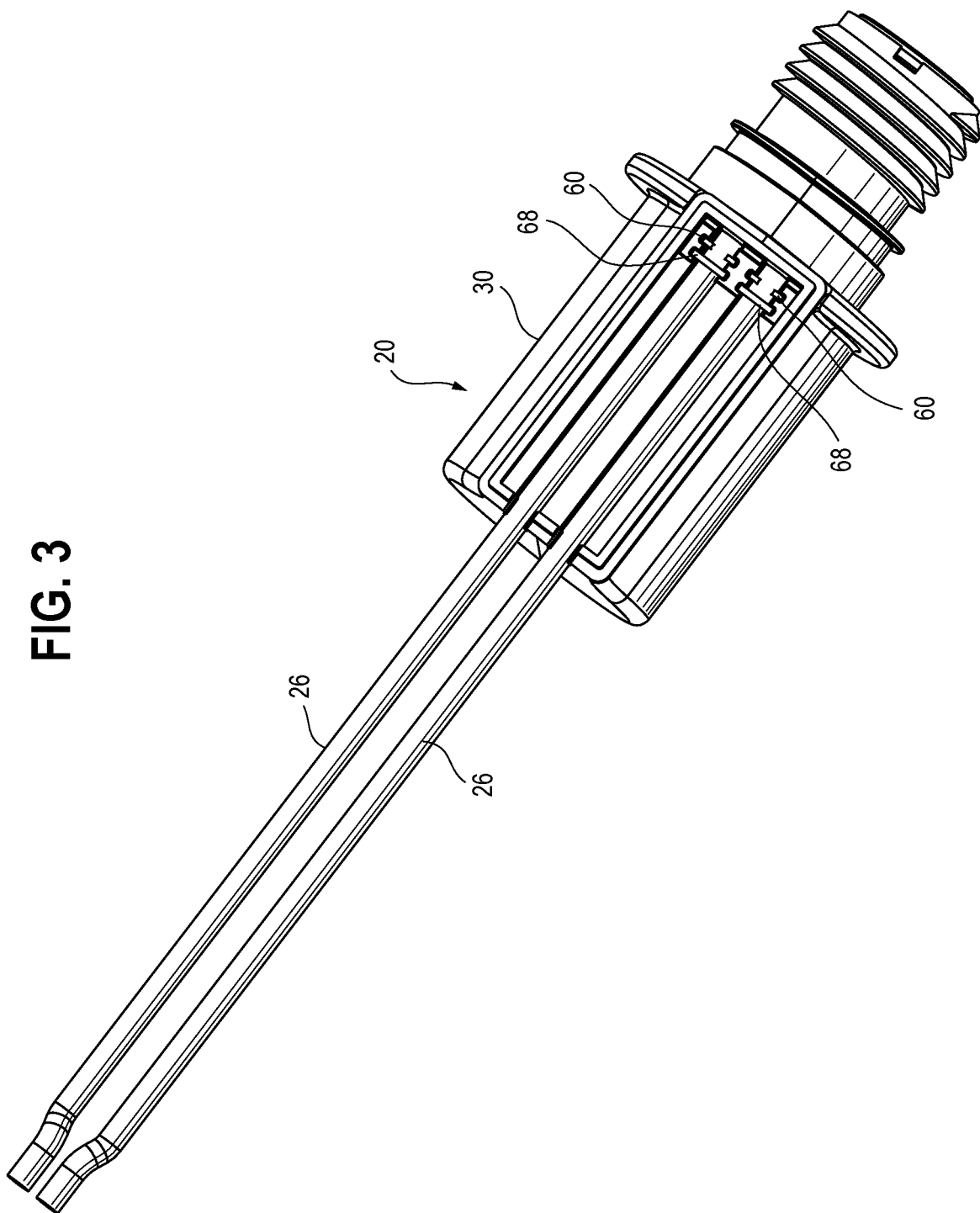
FIG. 3 is a top view of a solenoid with a top seal removed.

An exploded view of solenoid 20 is shown in FIG. 2, with more of the internal features shown. The solenoid 20 includes a bobbin 30 having winding or wire 32 wrapped about a central portion 34 (FIG. 5) thereof forming a coil. A core 35 is positioned within the central portion 34. The bobbin 30 can be formed from a variety of materials including, but not limited to nylon, polymers, plastics, and other materials which generally do not conduct electricity. The wire 32 can be made from a variety of conductive materials, such as copper and the like. The core 35 can also be made from a variety of materials, such as stainless steel and the like. When current is delivered to the solenoid 20, the wire 32, in the form of a coil, creates a magnetic field.

Figure 8:
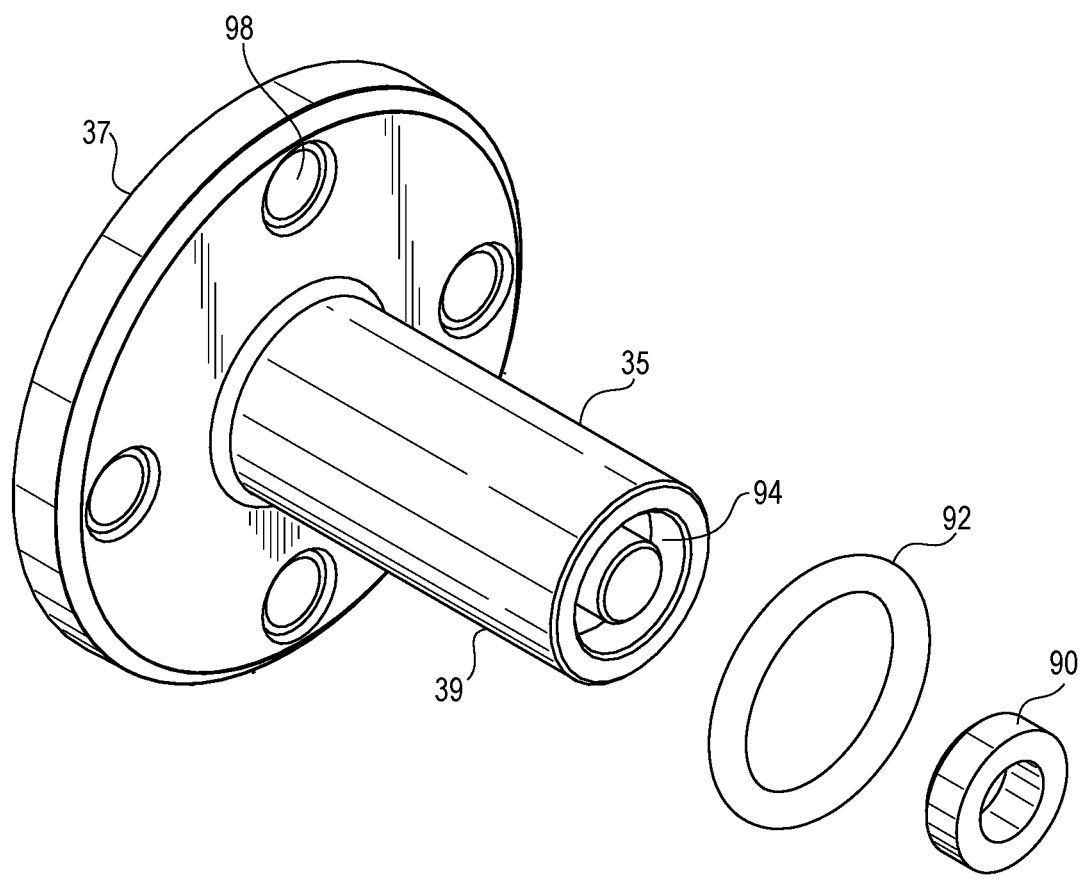
FIG. 8 is an exploded view of a core with a shading ring.
Figure 9:
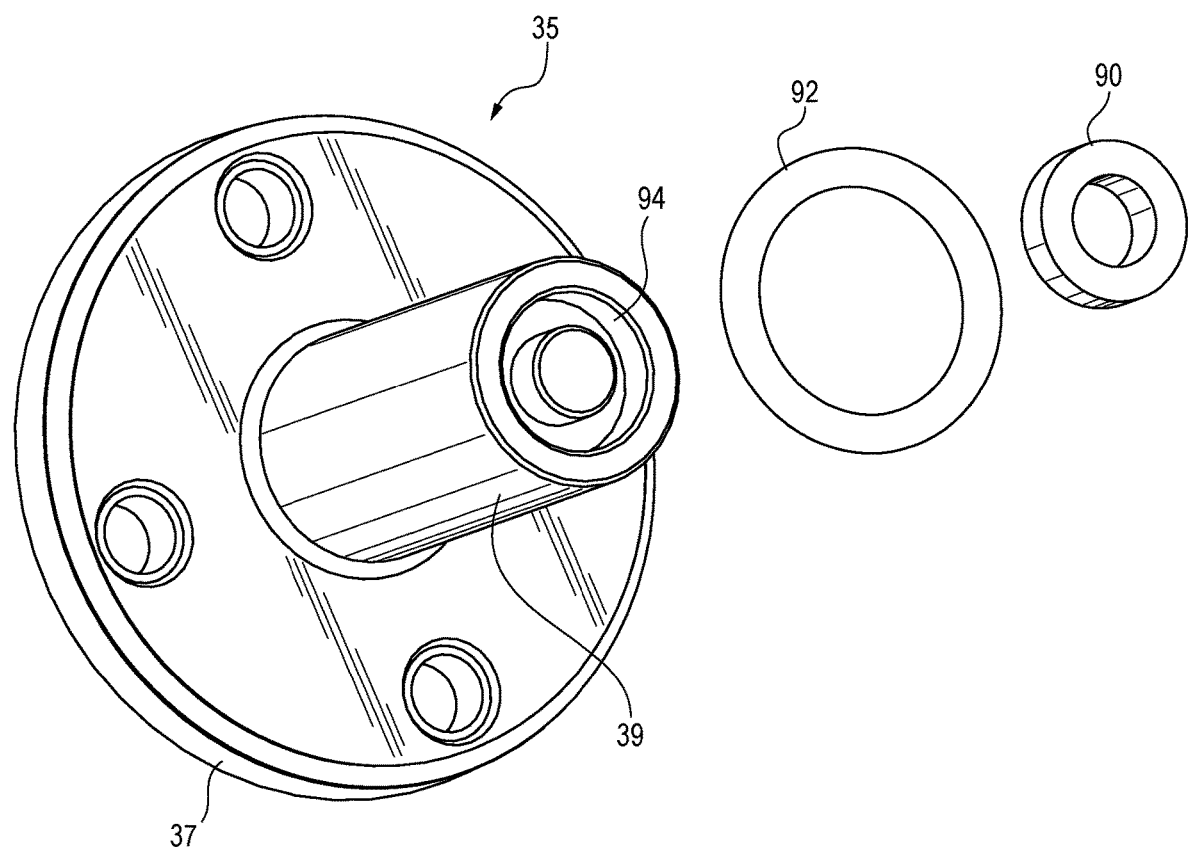
FIG. 9 is a front perspective view of the core and shading ring of FIG. 8.
Figure 10:
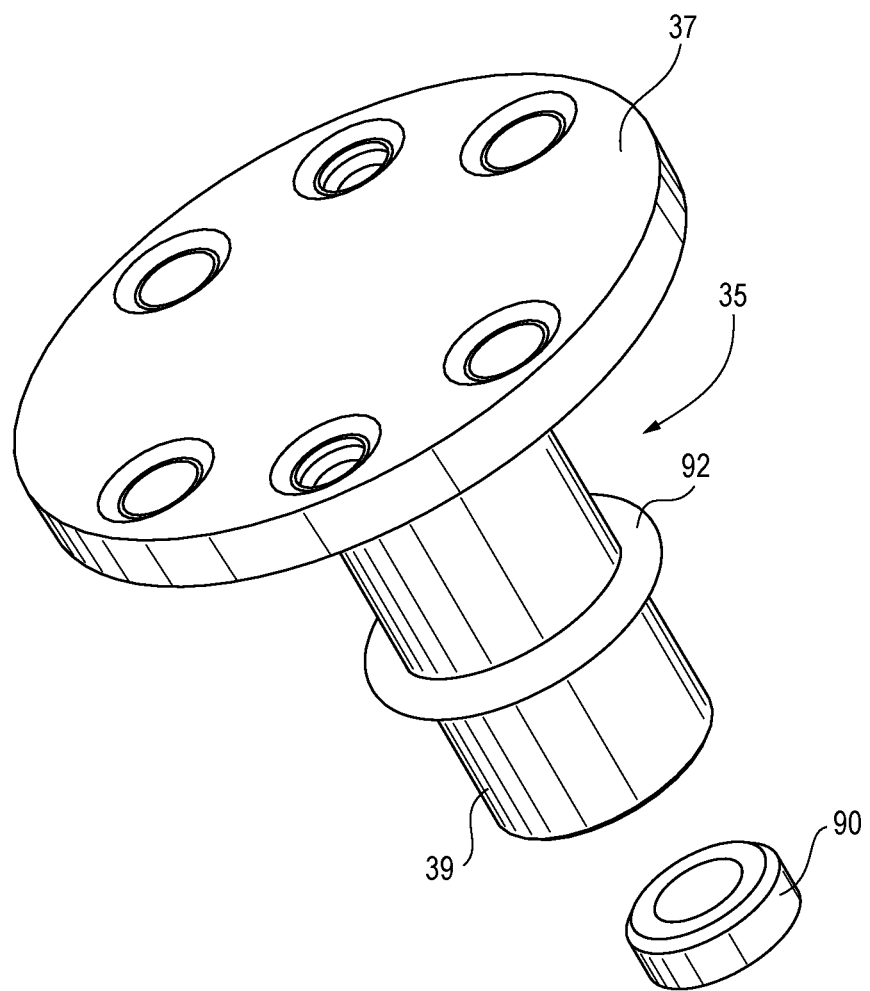
FIG. 10 is a rear perspective view of the core and shading ring of FIG. 8.

In one form, the core 35 is made from a single piece of material. In this regard, the core may be machined or cast from a single piece of material. In another form, the core 35 is made of powdered metal particles. Such powdered metal particles may include, but are not limited to steel, stainless steel, and other magnetic metals. In one form, the powdered metal is 400 series stainless steel powders. Traditionally, solenoid cores are made from multiple pieces of material that contact one another or are otherwise adhered to one another, such as by welding. However, such prior multi-piece configurations of solenoid cores are believed to have decreased performance when compared to a single, unitary core, as shown in FIGS. 8-10. The single-piece configuration of the core 35 can enhance a variety of functions, especially when in combination with other components described below. For example, the single-piece configuration of the core 35 helps complete the magnetic circuit and is believed to reduce magnetic flux from escaping the circuit. It should be appreciated that the core 35 may alternatively be produced in a conventional manner as a two-piece assembly with a flange and core base. The core 35 may include a flange portion 37 and a core portion 39 extending therefrom, as seen in FIGS. 8-10.

A plunger 36 is positioned with the bobbin 30 via an opening 38 that extends into the central portion 34 of the bobbin 30. The plunger 36 includes a spring 40 and a plunger seal 42. During operation, the spring 40 biases the plunger 36 either towards a retracted position or an extended position relative to the opening 38 of the bobbin 30. In one form, the spring 40 biases the plunger 36 towards the opening 38 such that the plunger seal 42 seals a flow path, such as at a valve seat 44 (See FIG. 11). This sealing prevents fluid from flowing through the solenoid 20. In this form, when current flows through the wire 32 and generates a sufficient magnetic field, the plunger 36 is drawn away from the opening 38 against the biasing force of the spring 40 and the static pressure of the fluid in the solenoid to permit fluid to flow through the valve seat 44. It should be appreciated that the spring 40 can be configured in a reverse manner, whereby the spring 40 biases the plunger away from the opening 38 and a magnetic field causes the plunger to move towards the opening 38.

A cylinder 50 can be positioned around the bobbin 30 and wire 32. The cylinder 50, can be affixed to the bobbin 30 in a variety of manners, such as by using a front cylinder side wall 52, which can be slotted into both the bobbin 30 and. More specifically, the leading end of the bobbin 30 has a terminal connection housing 55 used to retain various connections between wires 26 and wire 32. The terminal connection housing 55 can include a slot to receive the front cylinder side wall 52, which fits into the bobbin 30 and contacts the cylinder 50. In one form, the front cylinder side wall 52 is slotted into the bobbin 30 as close to the plunger 36 as possible to improve the performance of the solenoid. Further, a back wall (not shown) may also be used to affix the cylinder 50 to the bobbin 30. In one form, the core 35 functions as a back wall to help maintain the position of the cylinder 50 about the bobbin 30. In one form, the cylinder 50 includes one or more openings 53 to permit molded material to enter between the cylinder 50 and the bobbin 30. The front cylinder side wall 52 made be made of a metal to contact the cylinder 52 to help in forming the magnetic field.

Wire-to-wire terminals 60 are used to help connect supply wires 26 to bobbin wire 32 ends. More specifically, the bobbin 30 includes the terminal connection housing 55 near the front end which includes a pair of terminal connector slots for each end of the bobbin coil wire 32. The bobbin coil wire ends are positioned in the lower portion of the terminal connection housing 55 and in the forward slots. Terminals 60 include a lower portion 62 that couples to ends (not shown) of wire 32 in the terminal connection housing 55. The wire-to-wire terminals 60 function as insulation displacement terminals such that lower portion 62 displaces insulation or varnish that covers the wire 32 and make a connection. An upper portion 64 of the terminals 60 is then used to couple to supply wires 26 in a similar manner. In this form, insulation does not need to be removed from the wires 32 and 26 during installation, but instead the wire-to-wire terminals may displace the insulation at the appropriate locations. It should be appreciated that the upper and lower portions 64,62 can be the same or different such that they may accommodate different wires and/or gauges of wires.

Figure 5:
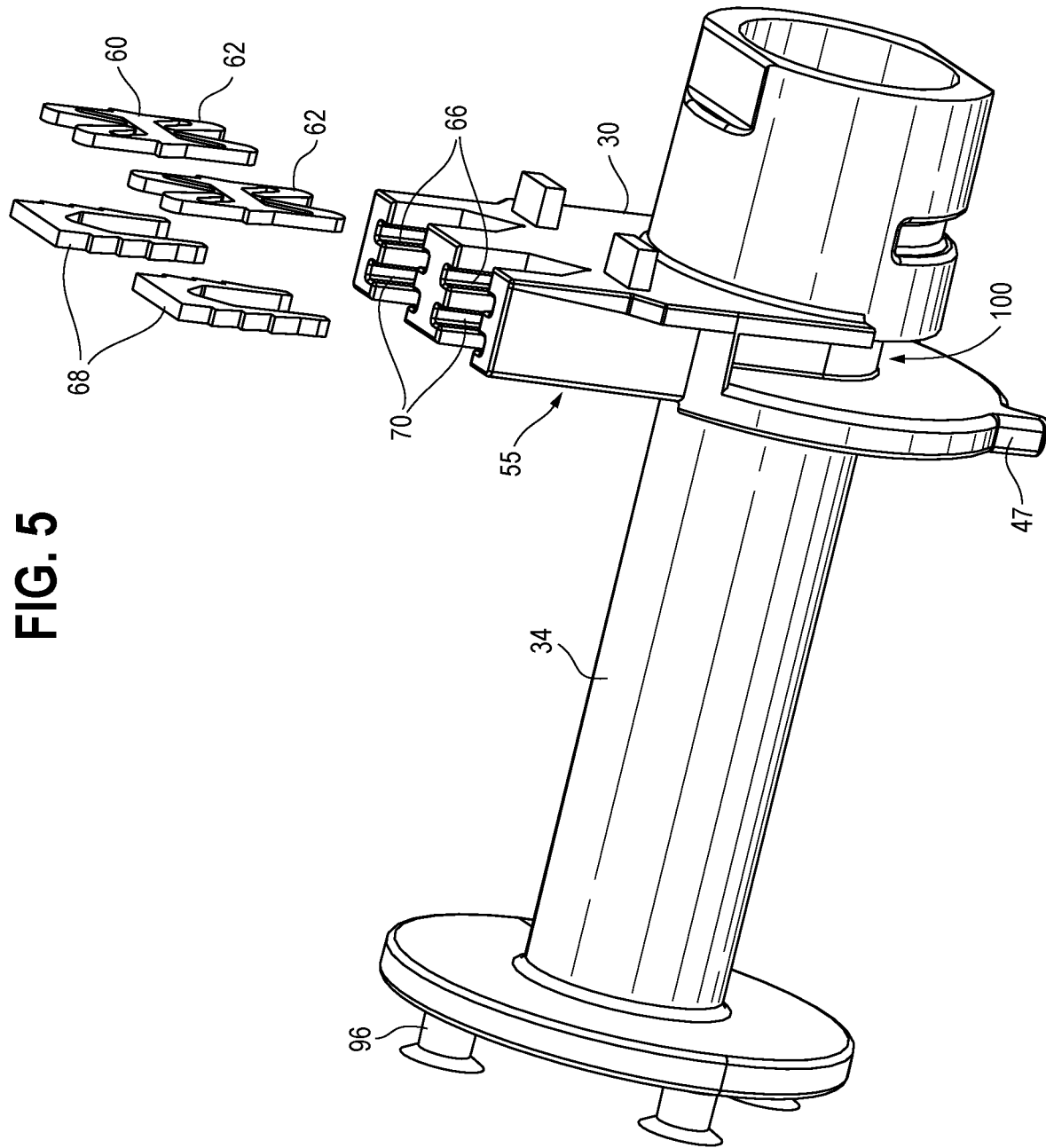
FIG. 5 is a side view of a bobbin with wire terminals shown removed therefrom.
Figure 6:
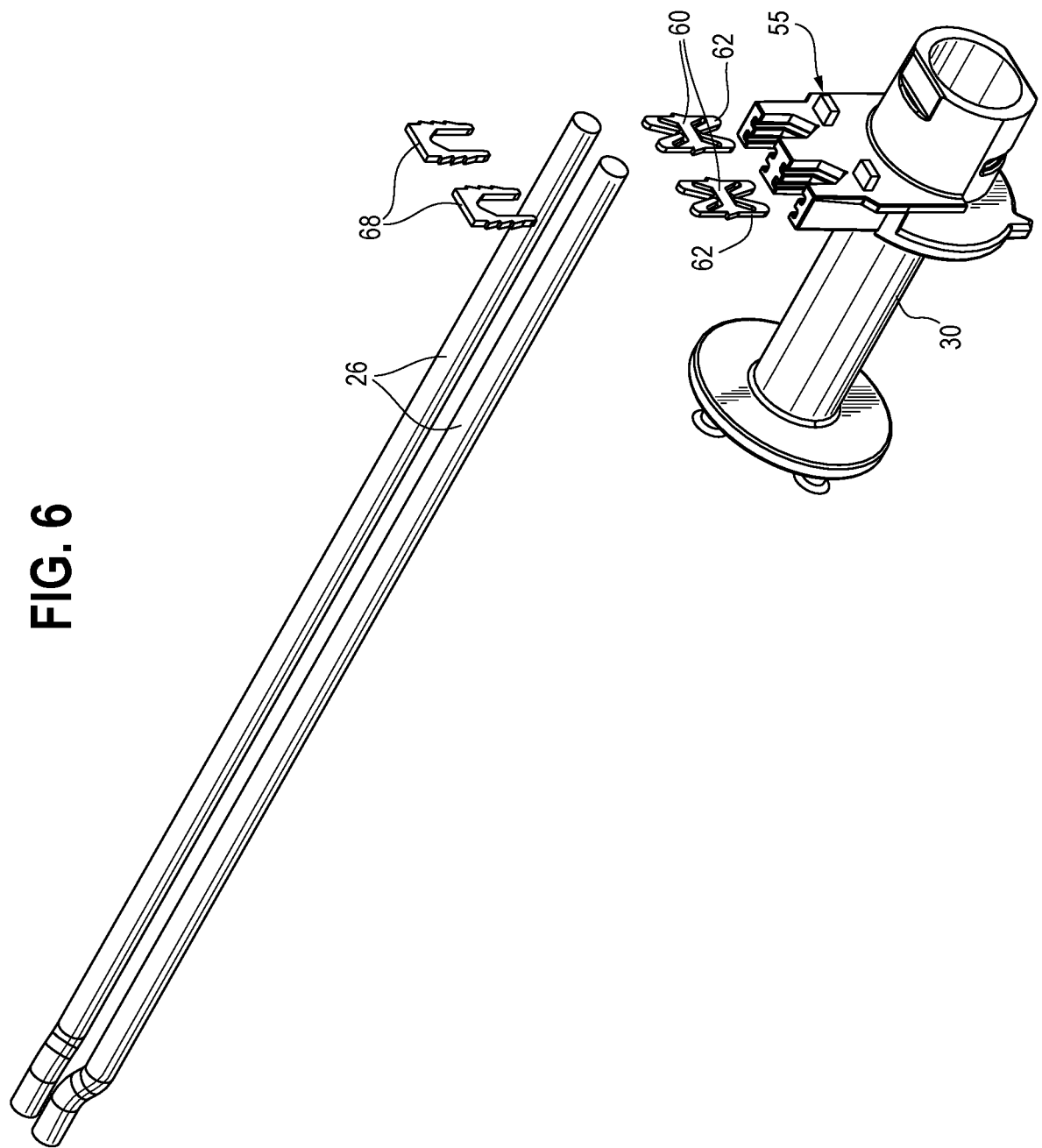
FIG. 6 is a perspective view showing the relative placement of wire terminals and source wires relative to a bobbin.
Figure 7:
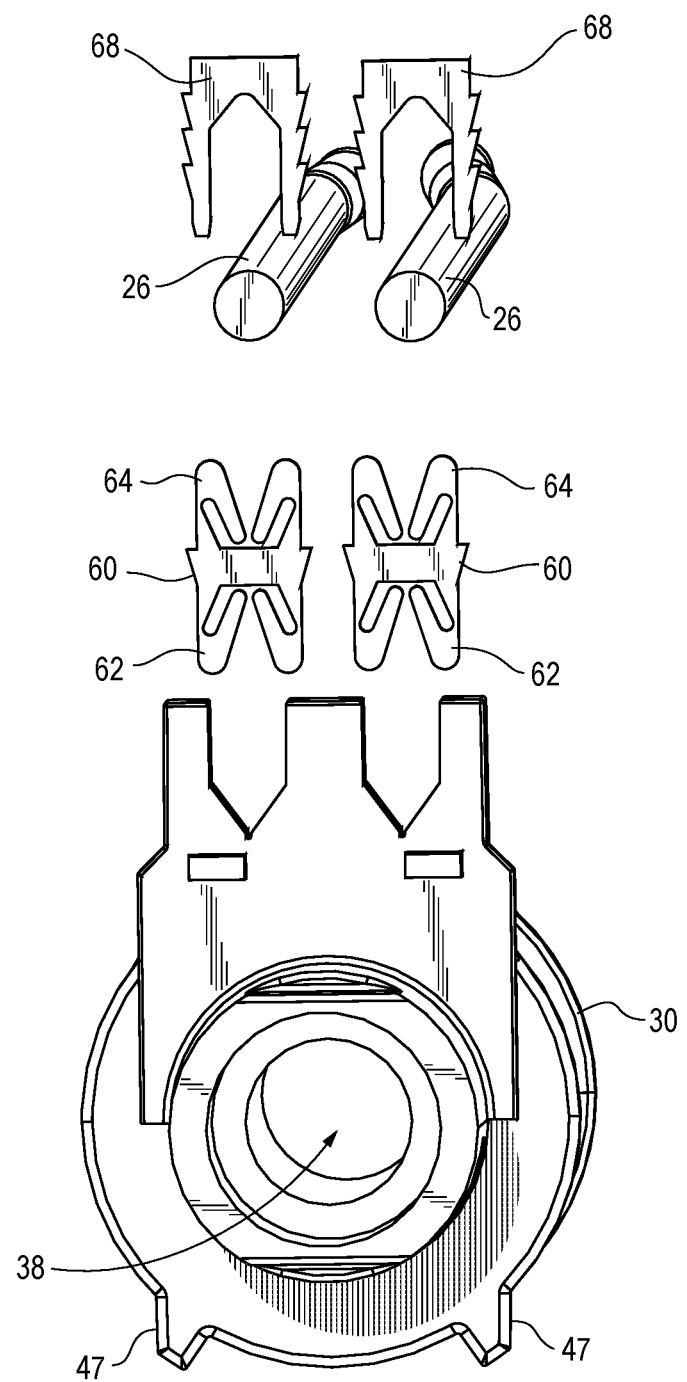
FIG. 7 is a front view showing the relative placement of wire terminals and source wires in relation to the bobbin of FIG. 6.

Referring to FIGS. 5-7, the terminals 60 can be inserted into forward slots 66 such that the lower portions 62 are coupled to ends of wire 32. Wires 26 can be placed adjacent the upper portions 64 and then strain relief terminals 68 can then be inserted into rearward slots 70 to help secure the position and electrical connection between wires 26 and wire 32. The terminals 60 and 68 can be secured in the terminal connection housing 55 in a variety of manners, such as by press fitting, adhering, and the like. It should be appreciated that the order of assembly of these components does not necessarily correspond with the structures shown in FIGS. 5 and 6. Instead the process of assembling the solenoid will be discussed in more detail below.

Figure 11:
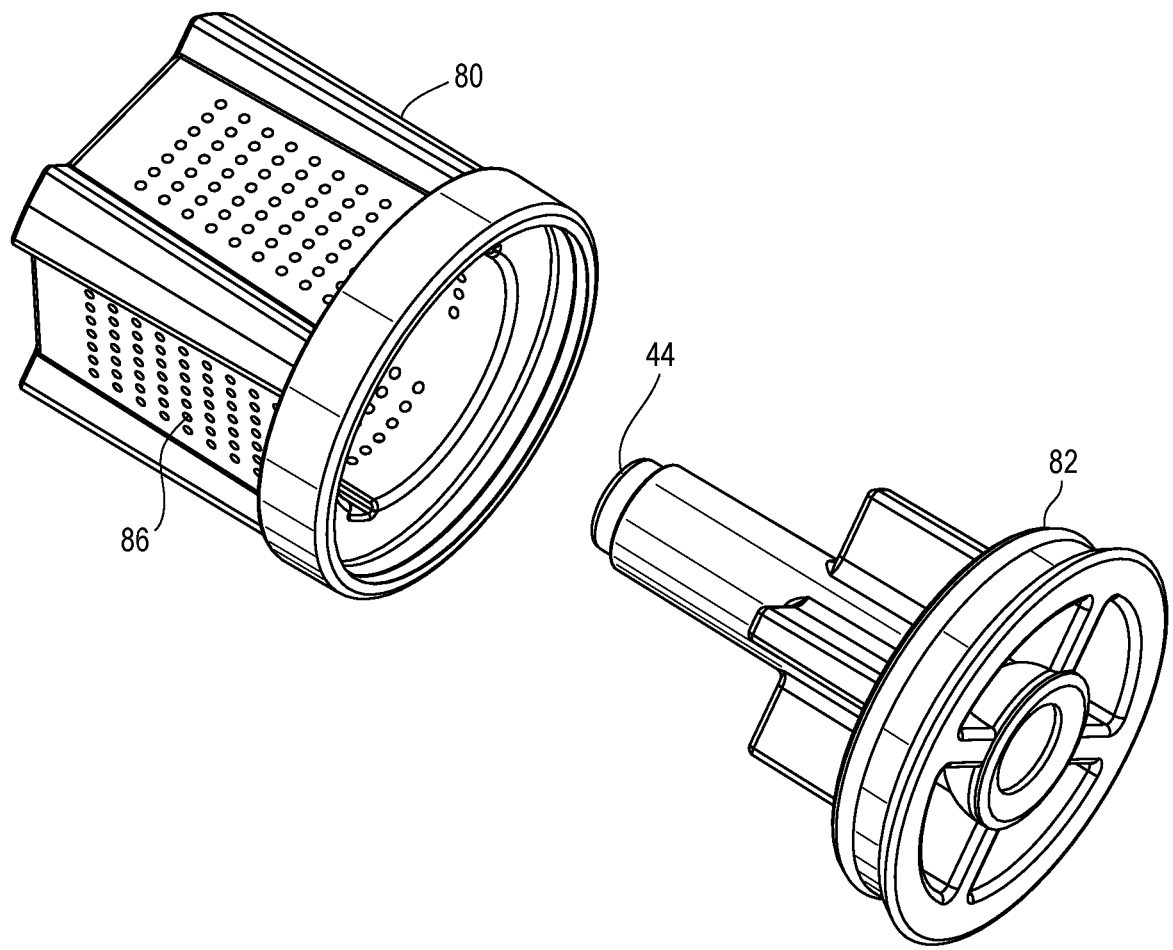
FIG. 11 is an exploded view of a filter.
Figure 12:
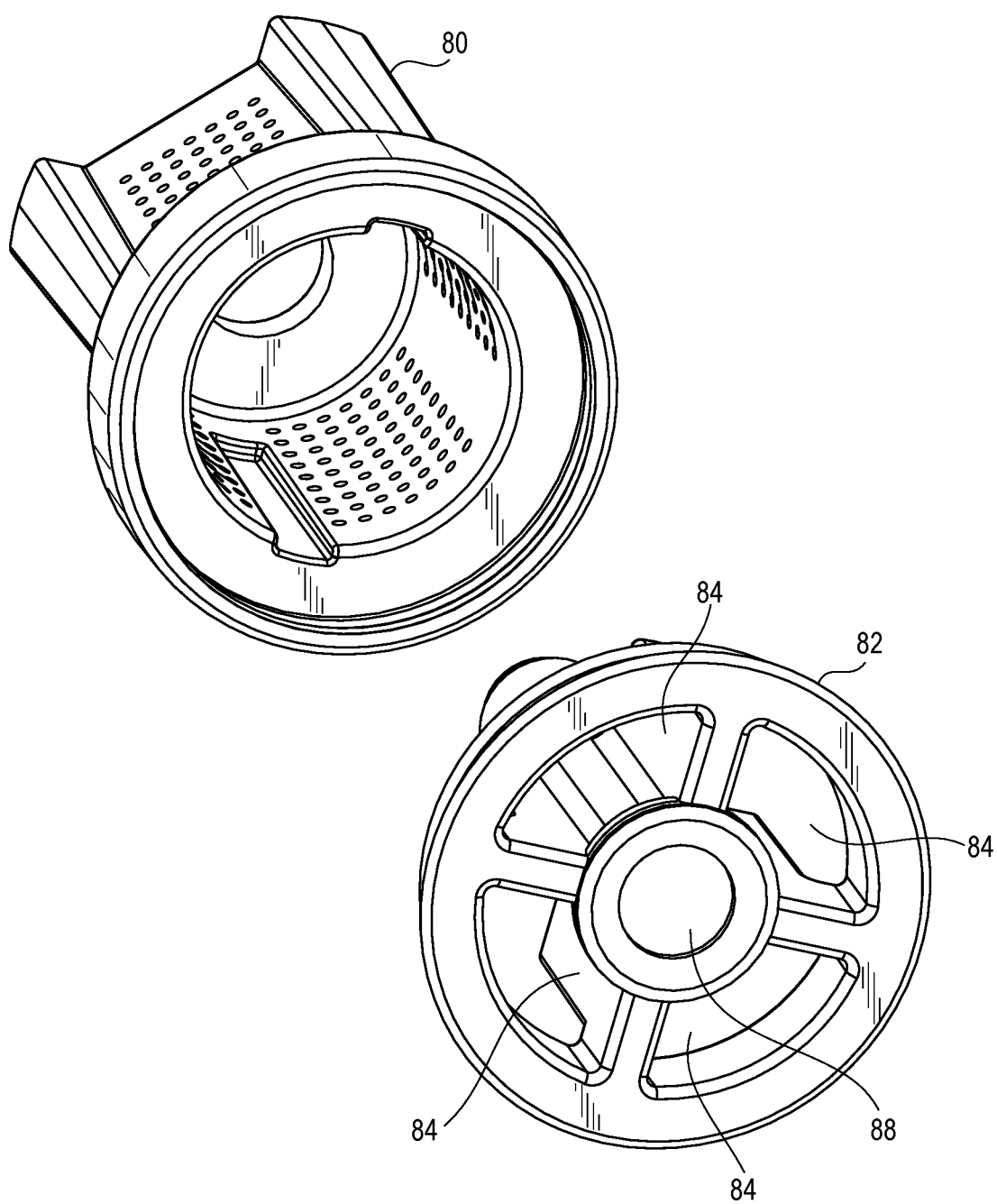
FIG. 12 is a front perspective view of the filter of FIG. 11.

With references to FIGS. 11 and 12, the solenoid 20 also may include a filter 80 and retainer 82. The retainer 82 and filter 80 can help define a fluid flow path adjacent the opening 38. In this regard, fluid may flow through valve seat 44 between the filter 80 and retainer 82. In one form, a fluid may flow through openings 84 in the retainer 82, through filter openings 86, valve seat 44, and opening 88. Fluid also may flow in a reverse direction. During operation, the plunger seal 42 can be used to seal valve seat 44. This will prevent fluid flow through the solenoid 20. In one form, it should be appreciated that fluid does not enter and exit the filter on the same axis. Instead, fluid enters the filter 80 along a longitudinal axis and then moves radially outwardly through a screen. This permits a smaller outside thread connection while maintaining desired fluid flow to operate the valve.

As shown in FIGS. 1, 8, and 9, one form of the solenoid 20 includes a shading ring 90 and one or more gaskets 92. The shading ring 90 can be made from a variety of materials, such as copper and the like, and inserted into an annular recess 94 to the core 35. The shading ring 90 can function as a secondary coil in the electromagnetic circuit to the primary coil of the wire 32 connected to a power supply. The alternating magnetic field created by the shading ring is 90 degrees out of phase with the magnetic field created by the wire 32. The magnetic flux created by the shading ring 90 assists in holding the plunger 36 against the core 35, which reduces a buzzing sound produced by AC solenoids.

When in use, the solenoid 20 is powered via wires 26 that transmit power to wire 32 via the terminals 60. In one form, the wires 26 transfer an electric current (AC) to the wire 32 which, in turn, produces a magnetic field. The magnetic field is directed to the core 35, and the magnetic field attracts the plunger 36 to the core 35. As noted above, the shading ring 90 functions as a secondary coil in the electromagnetic circuit that is shifted 90 degrees out of phase with the magnetic field created by the wire 32. The magnetic flux of the shading ring 90 assists in holding the plunger 36 steady against the core 35, without allowing it to repeatedly contact the terminal end of the core, which produces a buzzing sound. The core 35 is stationary inside the bobbin 30, and the plunger 36 is allowed to move linearly in the bobbin 30 as a result of the coil 32 and the spring 40.

In one form, when the plunger 36 is attracted towards the core 35, the solenoid 20 will permit fluid flow. The current must stay on to hold the plunger 36 away from the valve seat 44 to permit fluid flow. Once the current is turned off the spring 40 acting on the plunger 36 will extend the plunger 36 to seat on the valve seat 44 which stops the flow through the passage.

Figure 4:
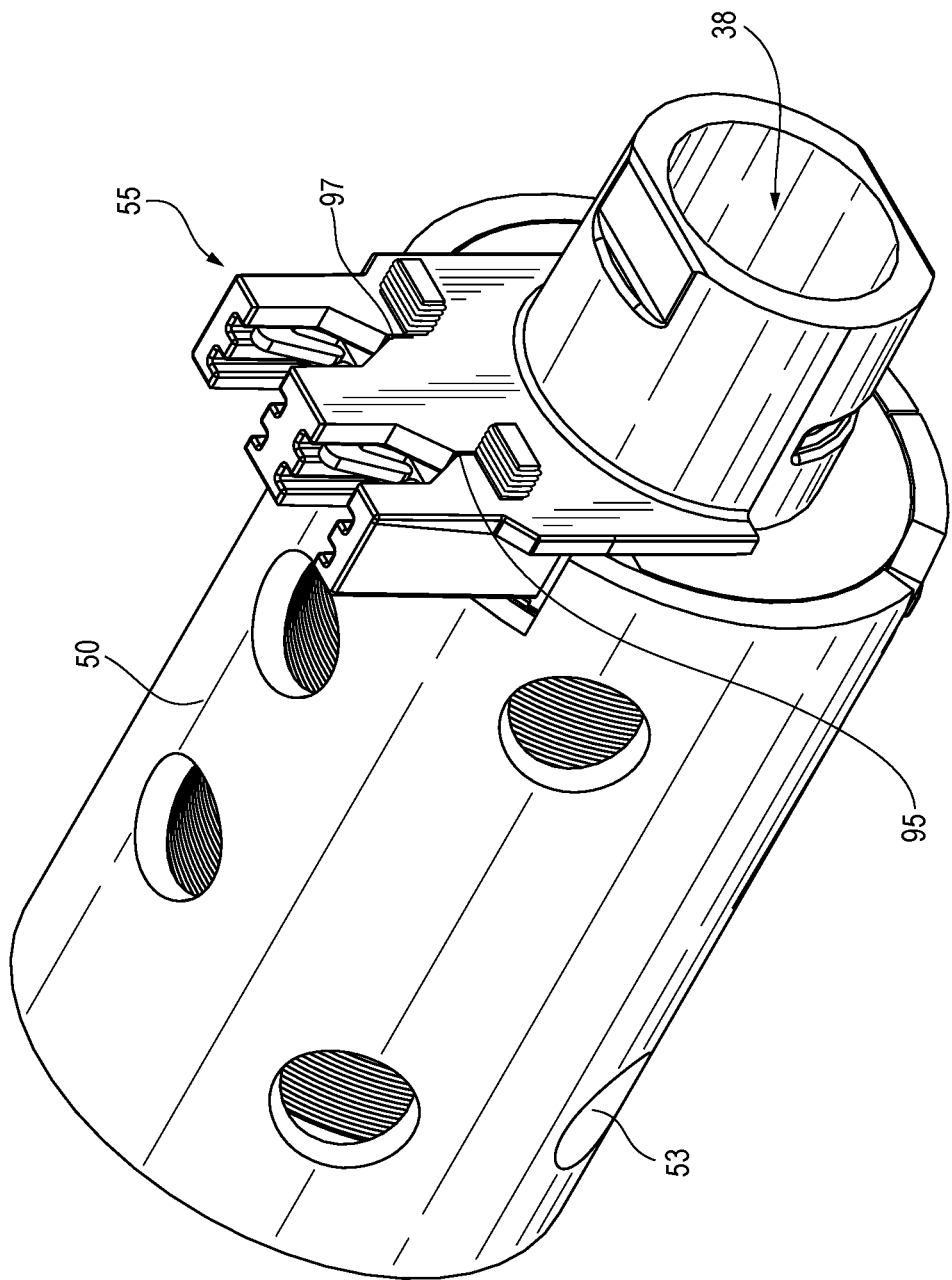
FIG. 4 is a perspective view of a solenoid with an outer housing and wires removed.

The solenoid 20 can be assembled in a variety of manners. In one form, a coil winder can be used to wrap wire 32 around the bobbin 30. The winder can be programmed for the respective sizes of the wire and bobbin, as well as the desired number of turns. The ends of wire 32 can be positioned in the bobbin such that they are located in the terminal connection housing 55 and will contact the terminals 60 which are then pressed into slots 66. For example, the wire 32 includes a first end 95 and a second end 97, each of which can be inserted into respective portions of the terminal connection housing 55, such as shown in FIG. 4. The core 35 can be assembled by inserting the shading ring 90 into the annular recess 94 and also fitting gasket 92 about the pole of the core 35. The assembled core 35 can then be inserted into the bobbin 30. In one form, the core 35 can be ultrasonically welded to the bobbin 30, after inserting protrusions 96 (FIG. 5) into openings 98 (FIG. 8).

Next, the cylinder 50 can be slid onto the bobbin 30 and core 35. Side wall 52 can be positioned to contact the cylinder 50. In another form, the core 35 can be installed after the cylinder 50 is slid onto the bobbin 30. In this form, a portion of the core 35, such as flange portion 37, can be used to retain the cylinder 50 about the bobbin 30 by abutting an end of the cylinder 50. The opposite end of the cylinder can be maintained in a desired position by tabs 47 on the bobbin 30. The core 35 can then be staked into place, as noted above to retain the cylinder in position.

This assembly can then be combined with the housing 22. In one form, the housing 22 is overmolded about the cylinder 50. As noted above, the cylinder 50 includes openings 53 to permit the molding material to flow into any space between the cylinder 50 and the bobbin 30 and wire 32. This allows for pressure equalization between the outside and inside of the cylinder 50 so that the cylinder 50 does not collapse. Oftentimes, molding can be complicated as external wires are already connected to the solenoid. However, in one form, the external wires 26 are not connected to the solenoid 20 until after overmolding the housing onto the solenoid. This permits an easier molding process and generally a less leak prone solenoid.

After the housing 22 has been overmolded, wires 26 can be inserted into channels 102 in the housing 22 to contact the second end 64 of terminals 60. Next, terminals 68 are inserted to hold the wires 26 in the housing 22. The terminals 68 can be press fit so as to help pierce any outer sheathing, if present, on the wires 26 at the second end 64 of terminals 60. It should be understood that the terminals 68 can be press fit or secured in other manners, such as snap fit, adhesives, and the like. After the wires 26 are installed, a filler material such as UV adhesive may optionally be used to coat and seal the connections and otherwise fill the interior area between the housing 22 and the cover 24. It should be understood that the filler material may include a variety of materials. For example, materials that are compatible with water and/or provide thermal conductivity properties may be used such as UV adhesive, epoxy, thermally conductive epoxy, and the like. Further, one or more gaskets, O-rings, adhesives, seals, and the like may be used, such as at the channels where the external wires enter the housing and other locations on the housing 22 and cover 24. The gaskets, O-rings, seals, and the like may also help function as strain relief for the external wires. The cover 24 can then be attached to the housing 22, such as by ultrasonic welding. In one form, the overall sealing of the housing 22 and the cover 24 and the filler in the interior area is such that moisture and other contaminants are substantially prevented from contacting the contained electrical components and wires.

The plunger 40 can be separately assembled with the spring 40 and plunger seal 42 and then inserted into the opening 38 of the bobbin 30. Finally, the filter 80 and retainer 82 can be installed. The filter 80 and retainer 82 can be maintained in place in a variety of manners such as press fitting, snap fitting, threading, adhesives, welding, and the like. In one form, the filter 80 can be press fit into the bobbin 30 and the retainer 82 can be snap fit into the filter 80. An external O-ring can be added to the housing at the threads.

Figure 13:
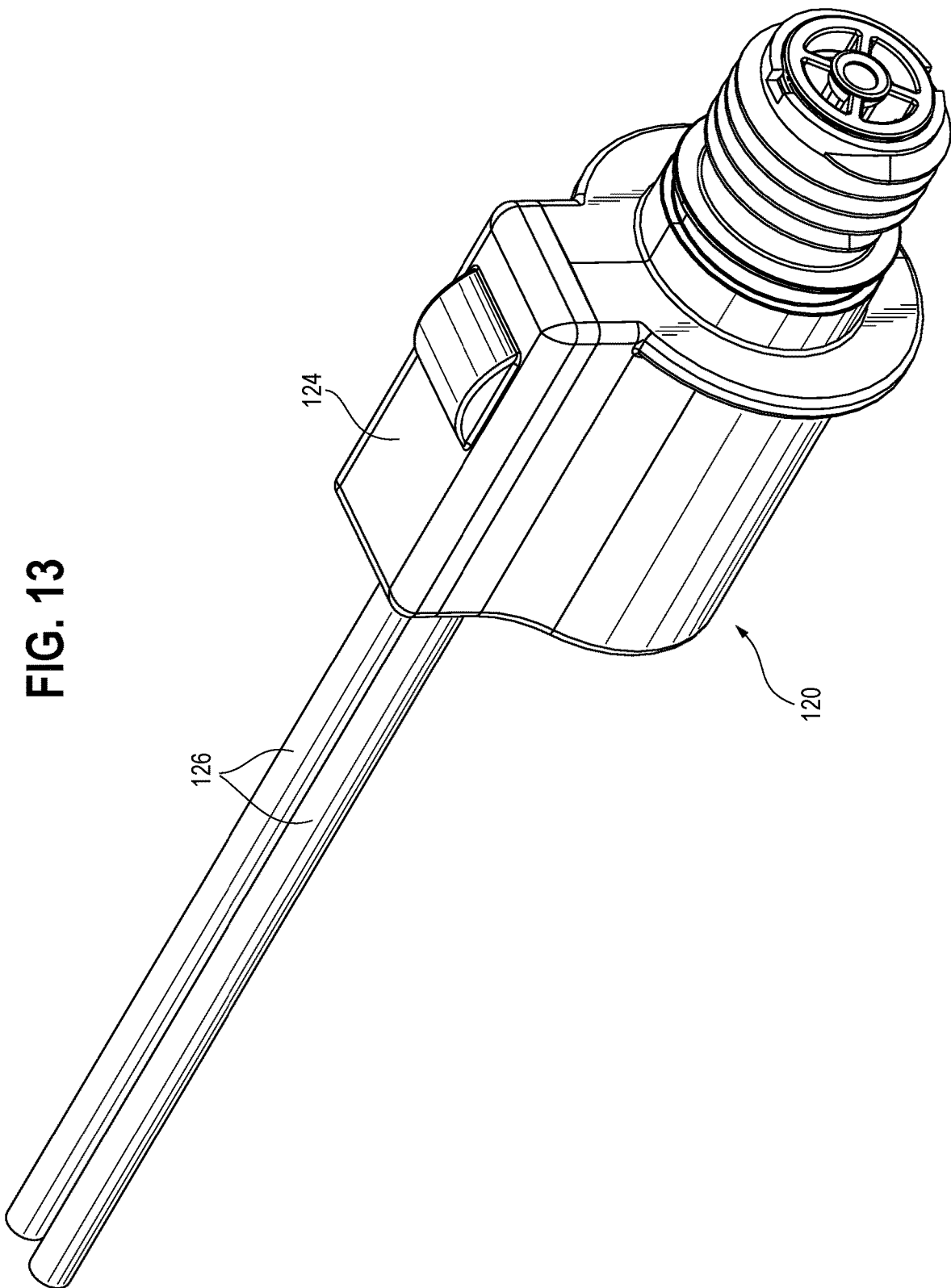
FIG. 13 is a perspective view of another form of solenoid.
Figure 14:
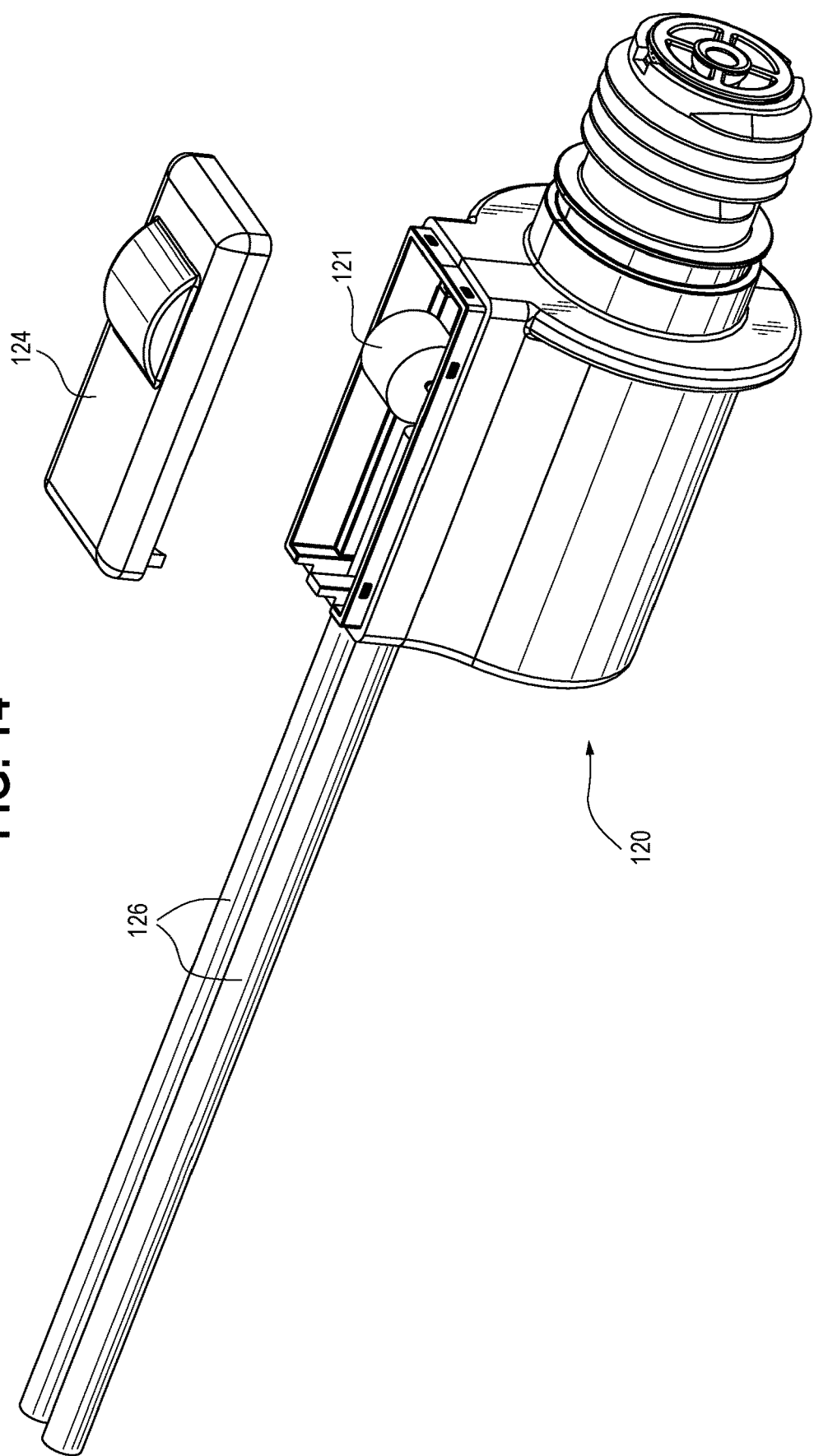
FIG. 14 is a perspective view of the solenoid of FIG. 13 with a cover removed.
Figure 15:
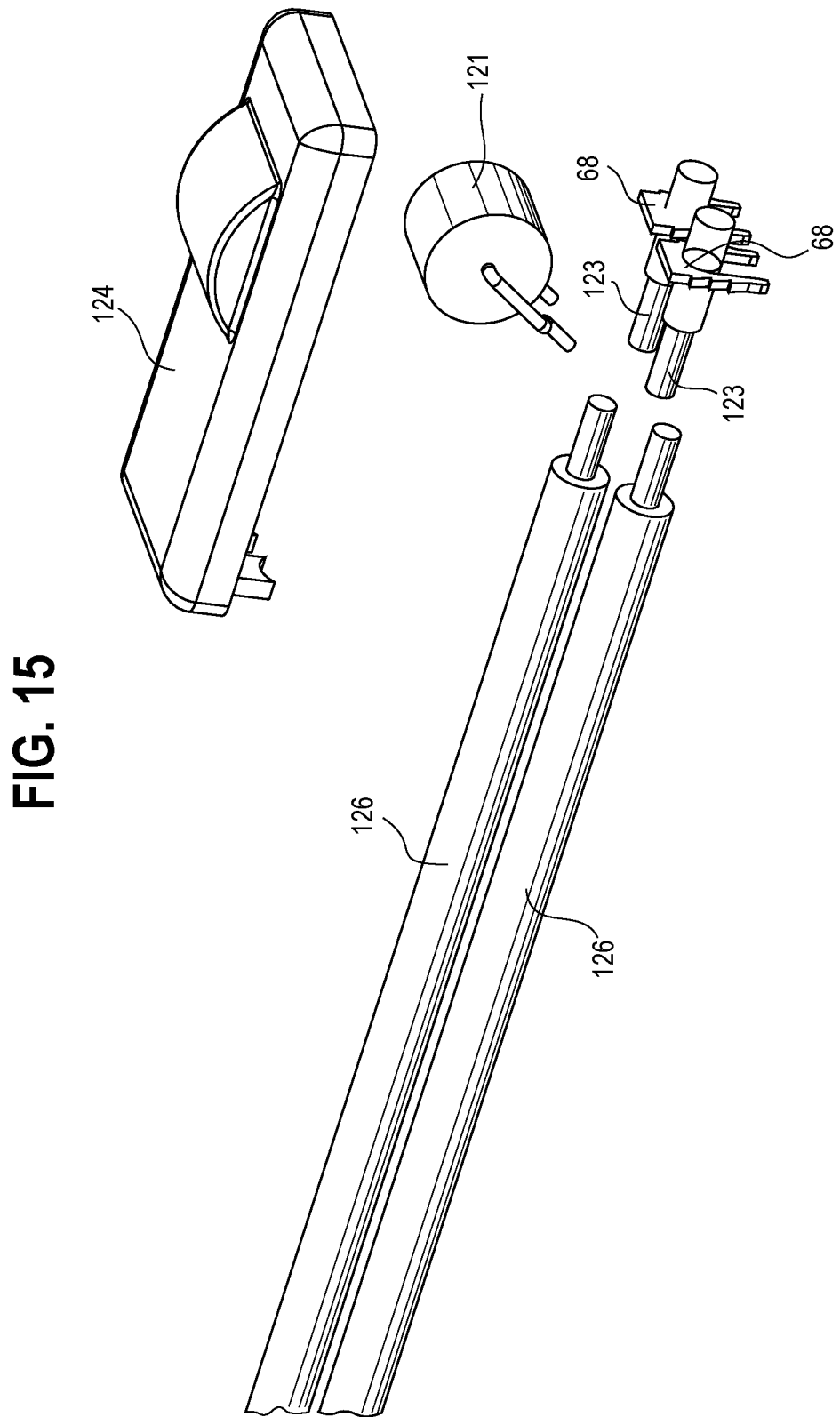
FIG. 15 is a perspective view of wires and a gas discharge tube of the solenoid of FIG. 13.

Another form of a solenoid 120 is shown in FIGS. 13-15. Solenoid 120 includes many similar components as discussed above for solenoid 20 such that they will not be discussed in detail. Solenoid 120 can include extra features, such as a gas discharge tube 121. The gas discharge tube 121 functions as a surge protection device to assist in protecting solenoids from lightning strikes and other power surges. Solenoid 120 includes generally the same internal coil assembly but does not have wires 126 connected directly to terminals 68. Instead, lead ends 123 are held in place via terminals 68 and coupled to the terminals 60. Lead ends 123 are then coupled to both the gas discharge tube 121 and externally extending wires 126, such as through soldering, welding, and the like. Cover 124 is also modified to accommodate the size and shape of the gas discharge tube 121. In an alternative form, the solenoid 120 may include a spark gap device and/or circuit board (not shown) in place of the gas discharge tube 121.

Figure 16:
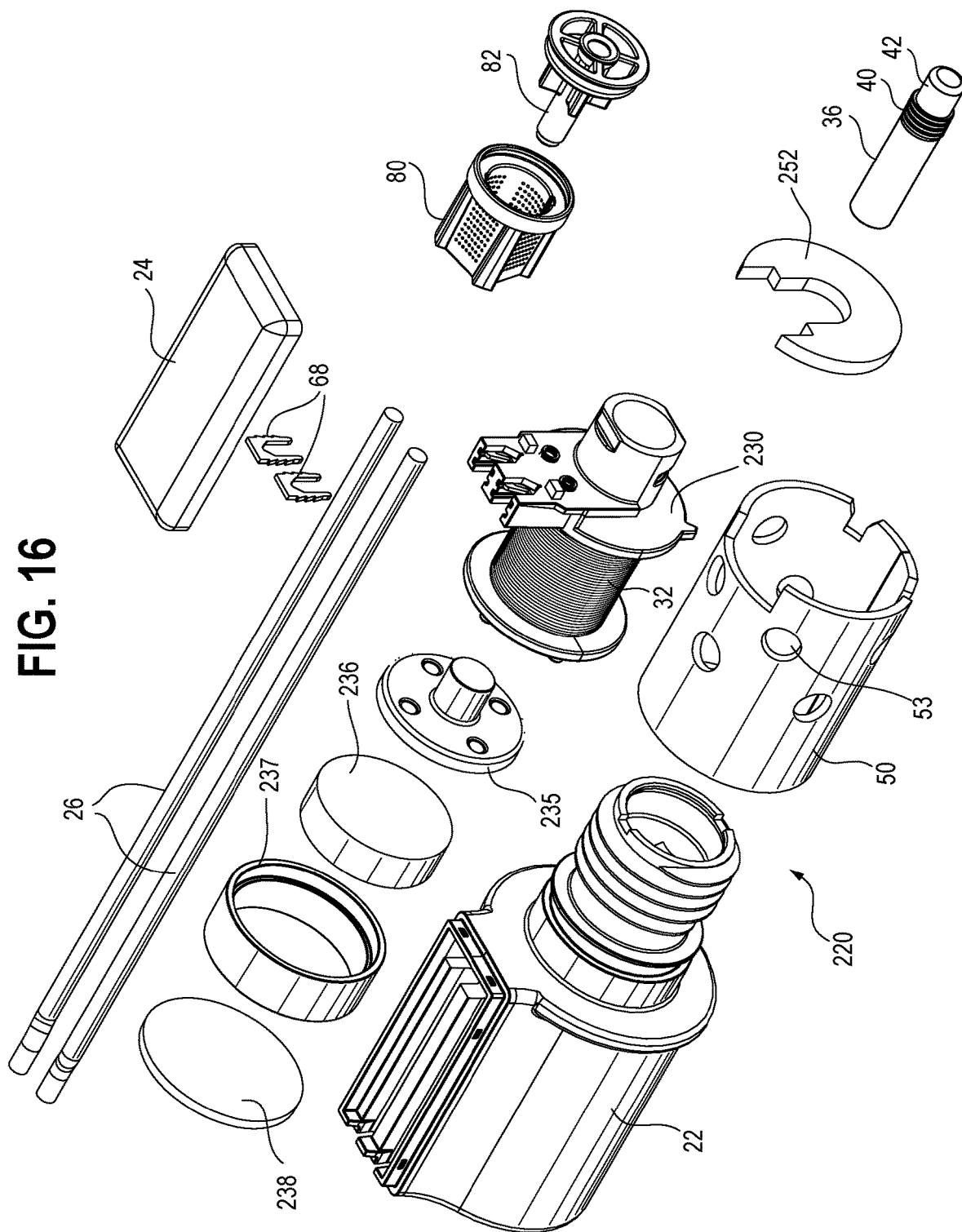
FIG. 16 is an exploded view of another form of solenoid.

Yet another form of solenoid is shown in FIG. 16. In this form, solenoid 220 can be a DC solenoid, such as using 9 VDC. The solenoid 220 includes a different core, as shown as core 235 that does not include a shading ring. Further, the solenoid 220 includes a permanent magnet 236, a magnet holder 237, and a back plate 238. Further, an alternative form of front side wall 252 is shown. The magnet holder 237 can serve at least two purposes. The first is to hold the magnet 236 centered to the core during assembly. The second function is to direct the magnetic flux from the permanent magnet towards the core as the magnet holder 237 can be made from non-magnetic material. Further, the core 235 has been shortened such that the end of the core is closer to the permanent magnet 236 to improve performance of the solenoid 220. The back plate 238 is also utilized to help close the magnetic circuit.

Solenoid 220 works in a similar manner as solenoid 20, with a few exceptions. Current is transferred from wires 26 to wire 32 which is in the form of DC current delivered in a short pulse from a controller (not shown). The pulse produces a magnetic field to start the retraction of the plunger 36 to the core 235. Once the plunger 40 moves closer to the core 235, the permanent magnet 236 has its own magnetic field that attracts the plunger 36 to the core 235 and holds the plunger 36 against the core 235. No current is needed to maintain plunger 36 at the core 235. This opens the solenoid valve to allow fluid flow. A 9 VDC pulse with reversed polarity will be transferred to the solenoid 220, and this will balance out the magnetic field produced by the permanent magnet 236 and allow the spring 42 to move the plunger 36 from away from the core 235. This closes the solenoid by seating the plunger on the valve seal.

The solenoid 220 can be manufactured in a similar manner as solenoid 20 and solenoid 120. Further, many of the components of the solenoids 20, 120, and 220 are the same such that generic subassemblies can be prepared and used in any of the solenoids and/or other components can be shared amongst the solenoids.

Figure 17:
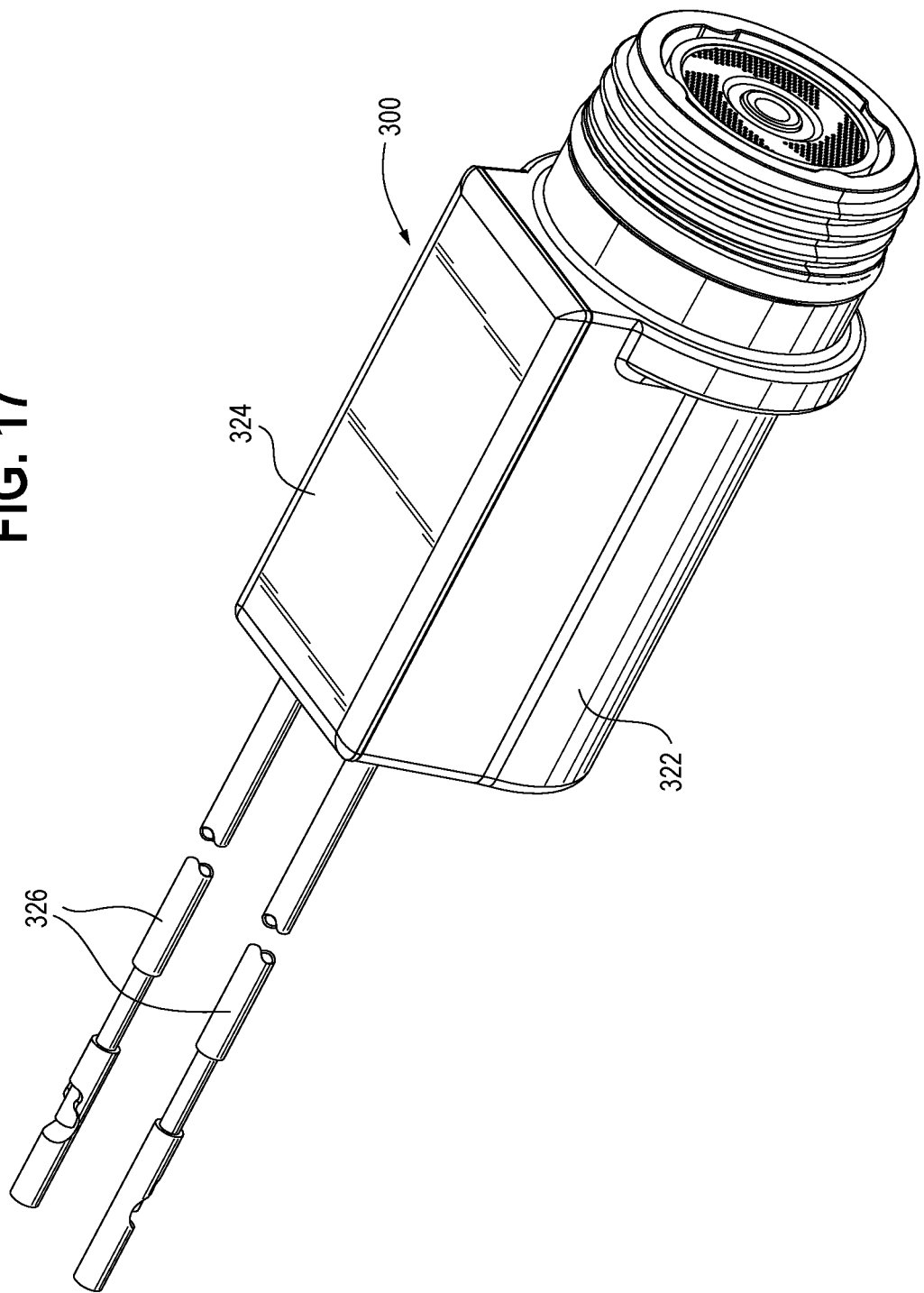
FIG. 17 is perspective view of another form of solenoid.
Figure 18:
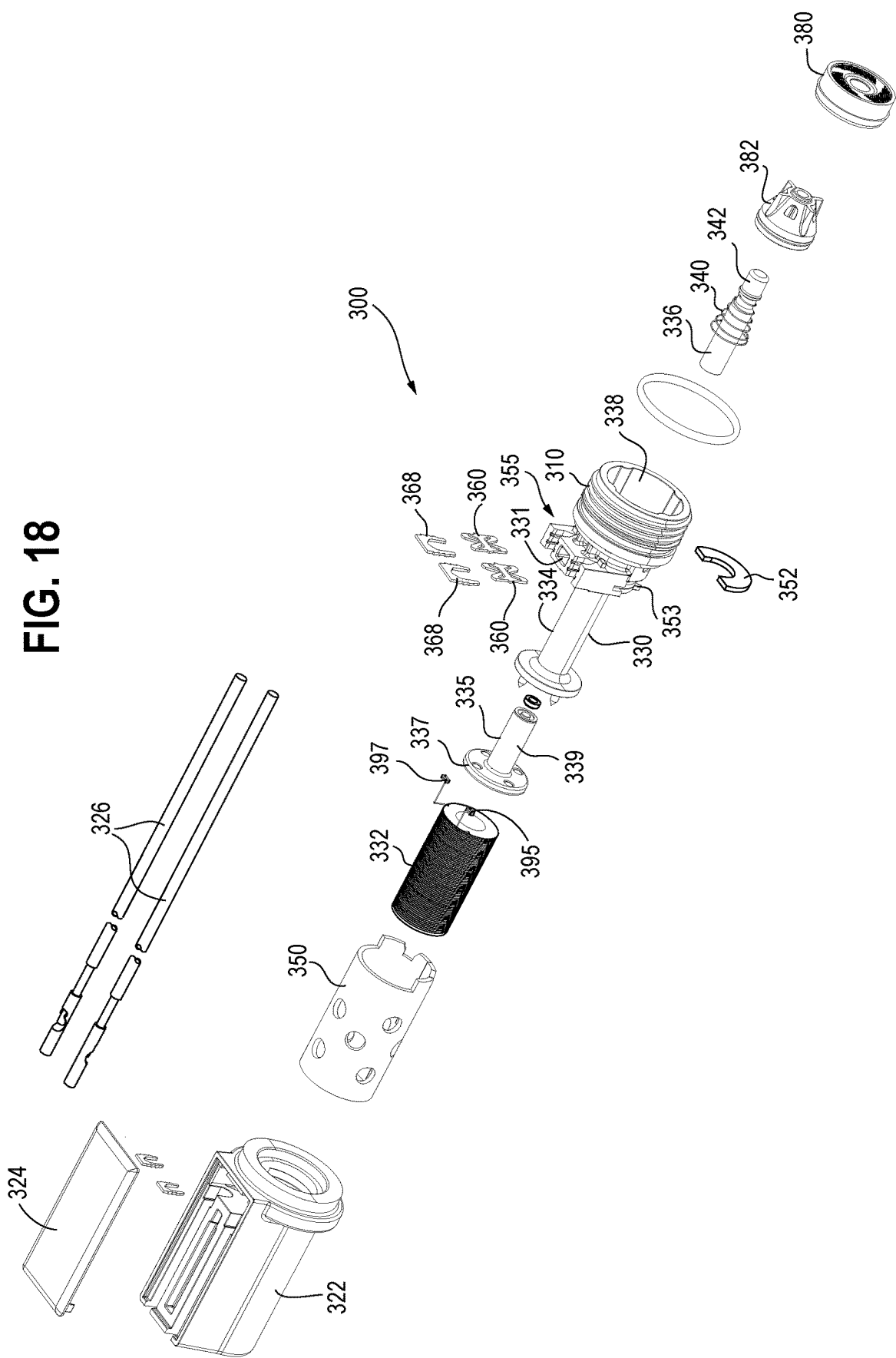
FIG. 18 is a partially exploded view of the solenoid of FIG. 17.

A further form is shown in FIGS. 17-18 as solenoid 300. Solenoid 300 includes many similar features to those discussed above with respect to other embodiments. Similar and/or the same reference numbers are used to designate similar features. Therefore, these features will not be discussed in detail, but it should be understood that the previous discussion of these similar features is applicable to solenoid 300, as well as the remaining embodiments discussed herein below.

The solenoid 300 includes an outer housing 322, a cover 324, as well as external wires 236 extending therefrom. The wires 326 are used to provide power to the solenoid 300 from a source (not shown) external to the outer housing 322. The wires 326 can also be used to send and/or receive signals between the solenoid and another device, such as a controller. In one form the outer housing 322 can be overmolded about internal components of the solenoid 300.

An exploded view of solenoid 300 is shown in FIG. 18, with more of the internal features shown. The solenoid 300 includes a bobbin 330 having winding or wire 332 wrapped about a central portion 334 thereof forming a coil. A core 335 is positioned within the central portion 334.

The solenoid 300 includes threads 310 on the bobbin 330 instead of being positioned on the housing 322. The embodiment shown in FIG. 2 includes threads 110 on the housing 22. By placing the threads 310 on the bobbin 330, water intrusion between the bobbin and housing can be minimized.

The bobbin 330 may also include a cavity 331. The cavity 331 may be used to align the position of the bobbin 330 when the housing 322 is overmolded onto the bobbin 330 in a manner similar to described above. In this regard, a guide pin can be inserted into the cavity 331 to maintain the bobbin 330 in a desired position during the molding process.

Similar to the forms discussed above, the core 335 is made from a single piece of material. In this regard, the core may be machined or cast from a single piece of material. In another form, the core 335 is made of powdered metal particles. Exemplary powdered metals include, but are not limited to, steel, stainless steel, and other magnetic metals. In one form, the powdered metal is 400 series stainless steel powders. The core 335 may include a flange portion 337 and a core portion 339 extending therefrom.

A plunger 336 is positioned with the bobbin 330 via an opening 338 that extends into the central portion 334 of the bobbin 330. The plunger 336 includes a spring 340 and a plunger seal 342. During operation, the spring 340 biases the plunger 336 either towards a retracted position or an extended position relative to the opening 338 of the bobbin 330. In one form, the spring 340 biases the plunger 336 towards the opening 338 such that the plunger seal 342 seals a flow path. This sealing prevents fluid from flowing through the solenoid 300. In this form, when current flows through the wire 332 and generates a sufficient magnetic field, the plunger 336 is drawn away from the opening 338 against the biasing force of the spring 340 and the static pressure of the fluid in the solenoid to permit fluid to flow. It should be appreciated that the spring 340 can be configured in a reverse manner, whereby the spring 340 biases the plunger away from the opening 338 and a magnetic field causes the plunger to move towards the opening 338.

A cylinder 350 can be positioned around the bobbin 330 and wire 332. The cylinder 350, can be affixed to the bobbin 330 in a variety of manners, such as by using the flange portion 337 of the core to retain an end of the cylinder 350. Further, the leading end of the bobbin 330 has a terminal connection housing 355 that can be used to help align the cylinder 350. The terminal connection housing 355 can include a slot 353 to receive the front cylinder side wall 352 which contacts the cylinder 350 to make an electrical connection. In one form, the front cylinder side wall 352 is slotted into the bobbin 330 as close to the plunger 336 as possible to improve the performance of the solenoid. In this form, the core 335 functions as a back wall to help maintain the position of the cylinder 350 about the bobbin 330 and also create an electrical connection between the core 335 and cylinder 350. Further, similar to the embodiments described above, the cylinder 350 includes one or more openings 353 to permit molded material to enter between the cylinder 350 and the bobbin 330.

Wire-to-wire terminals 360 are used to help connect supply wires 326 to bobbin wire 332 ends. More specifically, the bobbin 330 includes the terminal connection housing 355 near the front end which includes a pair of terminal connector slots for each end of the bobbin coil wire 32. The bobbin coil wire ends 395, 397 are positioned in the lower portion of the terminal connection housing 355 and in the forward slots 366. Terminals 360 include a lower portion 362 that couples to ends 395, 397 of wire 332 in the terminal connection housing 355. The wire-to-wire terminals 360 function as insulation displacement terminals such that lower portion 362 displaces insulation or varnish that covers the wire 332 and make a connection. An upper portion 364 of the terminals 360 is then used to couple to supply wires 326 in a similar manner. In this form, insulation does not need to be removed from the wires 332 and 326 during installation, but instead the wire-to-wire terminals 360 may displace the insulation at the appropriate locations. It should be appreciated that the upper and lower portions 362, 364 can be the same or different such that they may accommodate different wires and/or gauges of wires.

Figure 22:
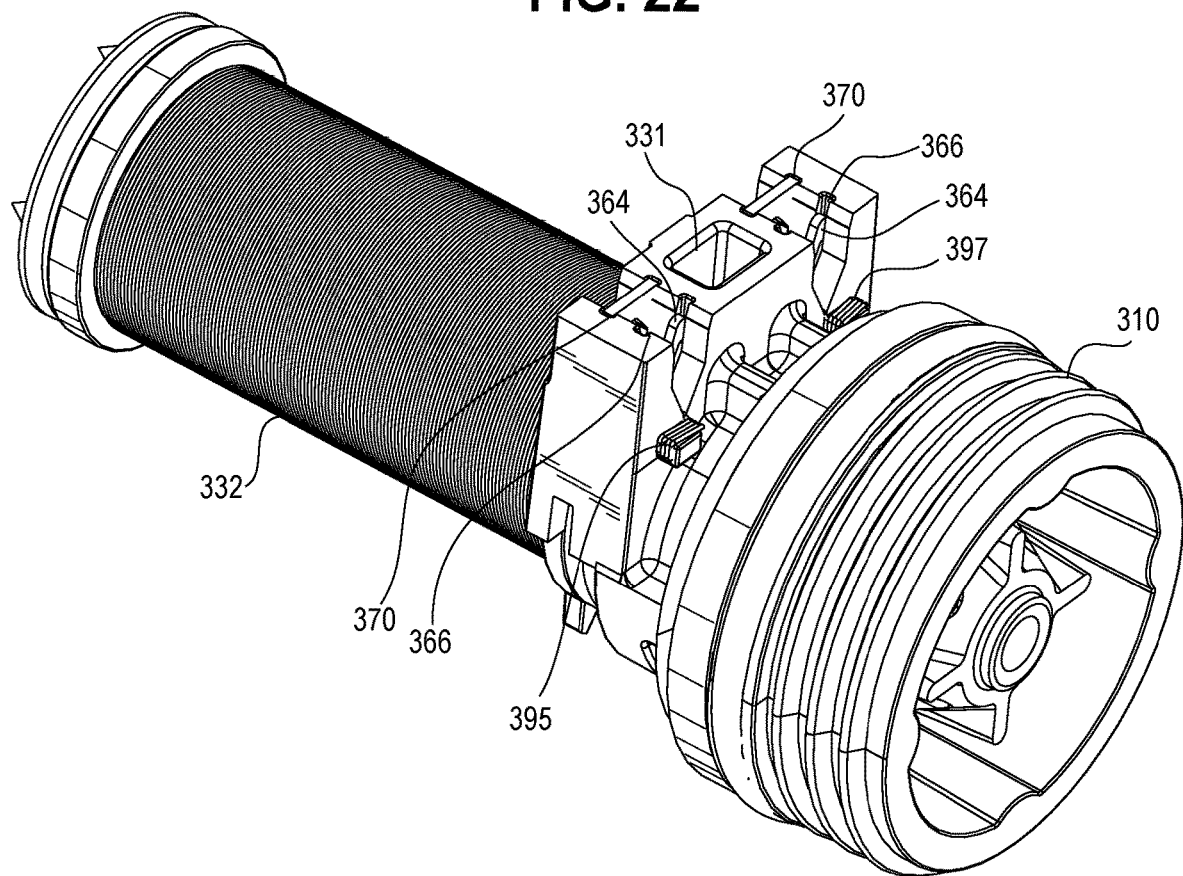
FIG. 22 is a perspective view of the solenoid of FIG. 21 with the cylinder removed.
Figure 23:
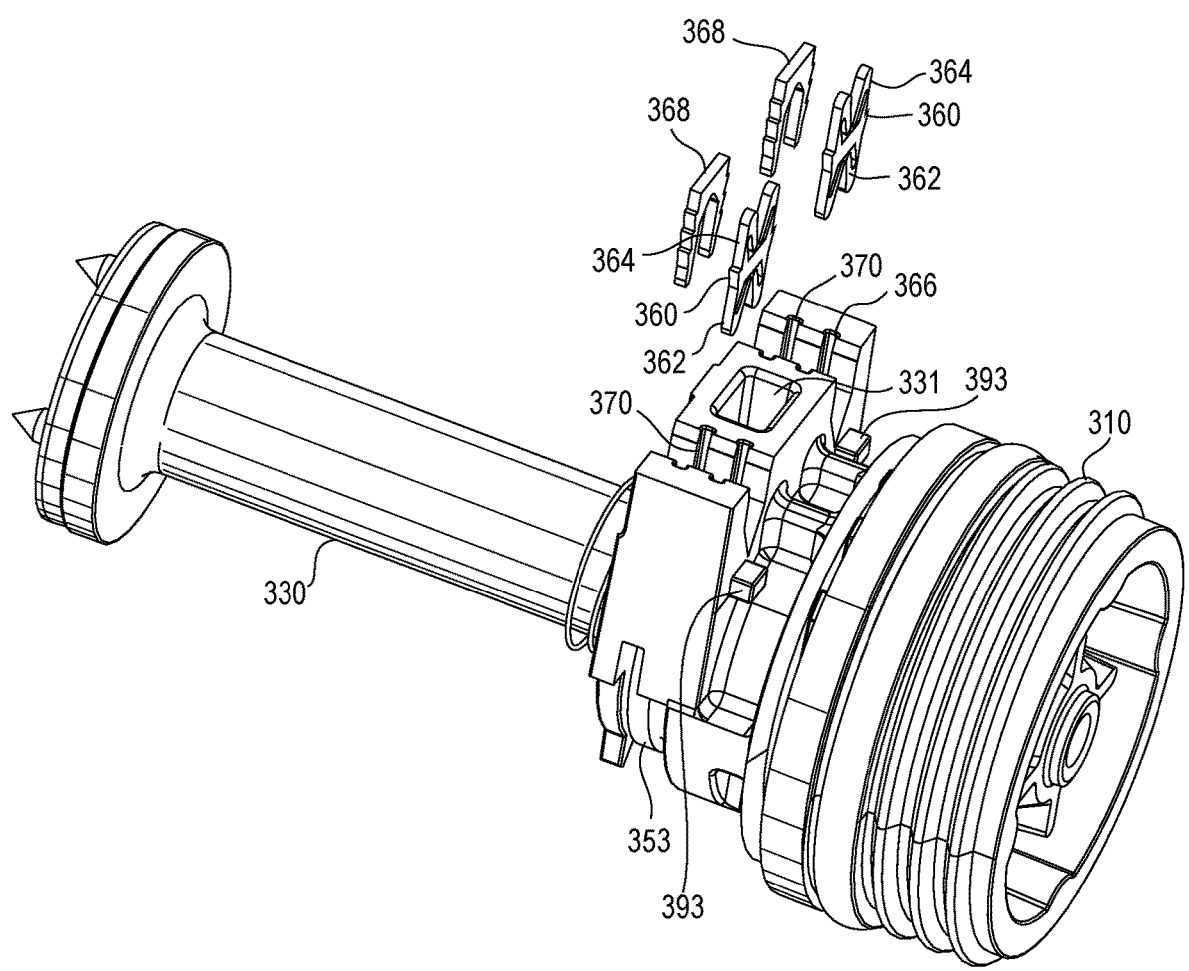
FIG. 23 is a side view of a bobbin with wire terminals shown removed therefrom.
Figure 24:
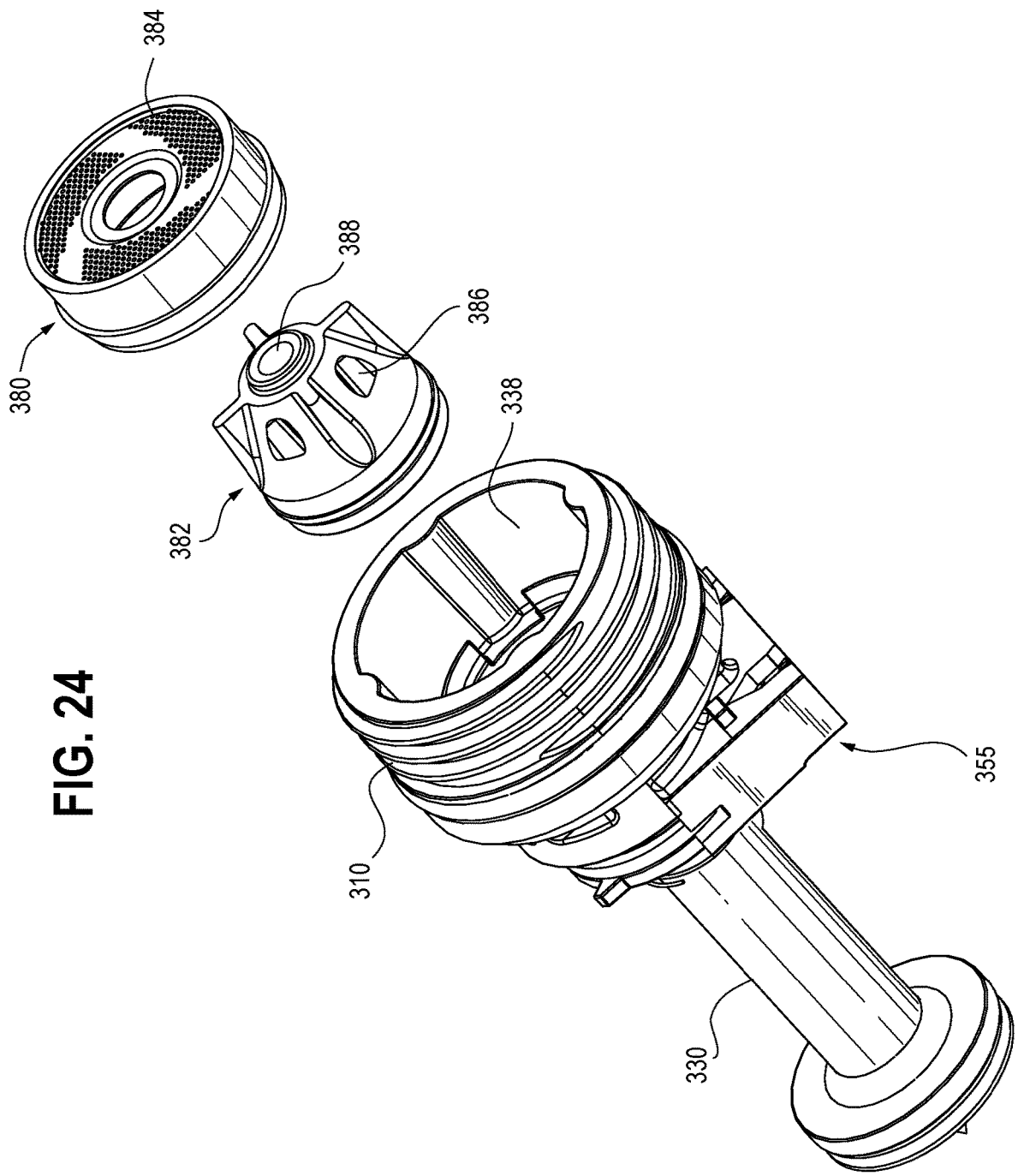
FIG. 24 is an exploded view of a bobbin with a filter.
Figure 25:
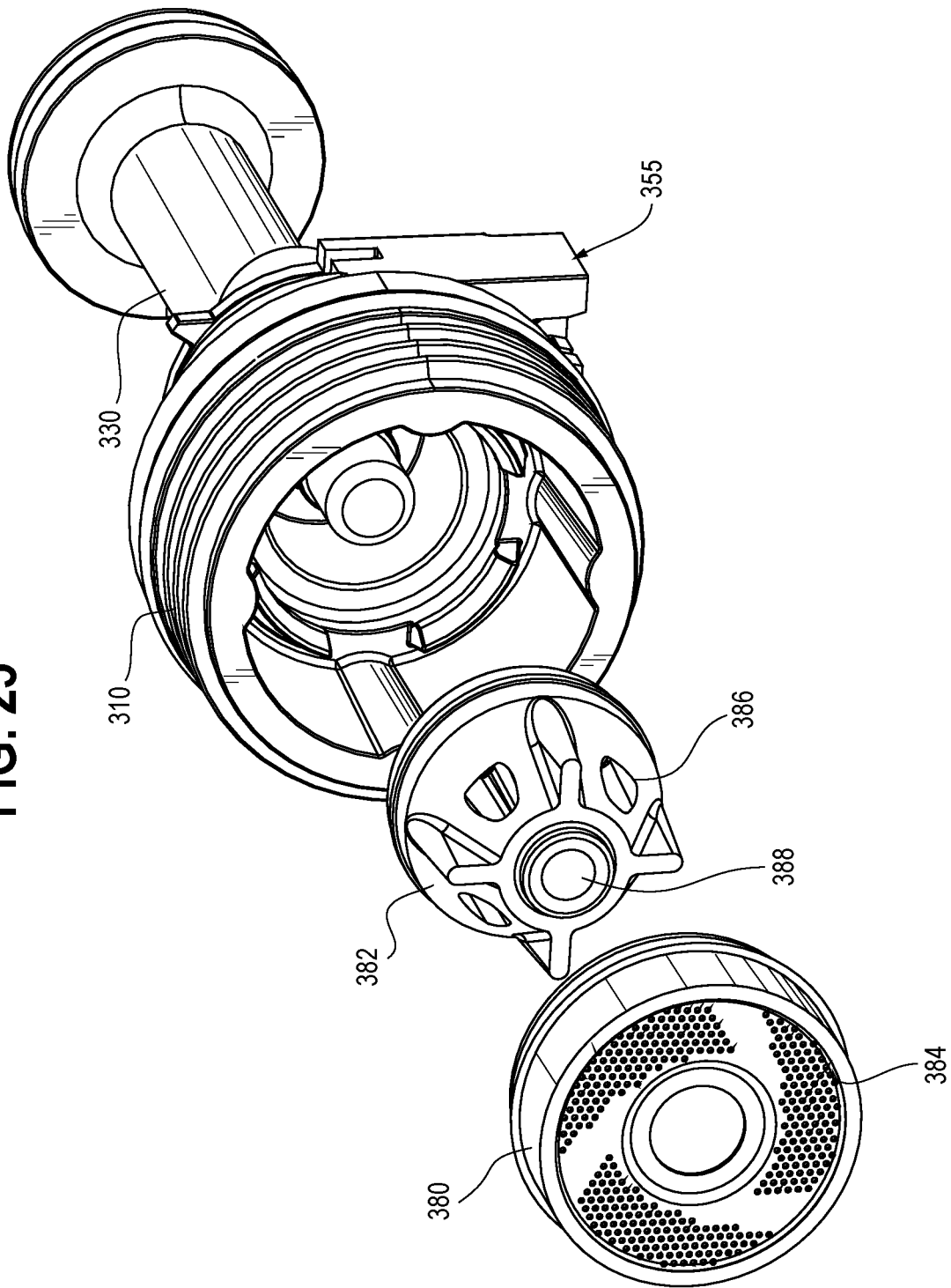
FIG. 25 is a front perspective view of the bobbin and filter of FIG. 24.

Referring to FIGS. 22 and 23, the terminals 360 can be inserted into forward slots 366 such that the lower portions 362 are coupled to ends 395,397 of wire 332. The ends 395,397 may be wrapped around protrusions 393. Wires 326 can be placed adjacent the upper portions 364 and then strain relief terminals 368 can then be inserted into rearward slots 370 to help secure the position and electrical connection between wires 326 and wire 332. The terminals 360 and 368 can be secured in the terminal connection housing 355 in a variety of manners, such as by press fitting, adhering, and the like. It should be appreciated that the order of assembly of these components does not necessarily correspond with the structures shown in FIGS. 22 and 23. Instead, the process of assembling the solenoid can be as discussed above with respect to previously described embodiments.

The solenoid 300 also may include a filter 380 and retainer 382. The retainer 382 and filter 380 can help define a fluid flow path adjacent the opening 338. In this regard, fluid may flow through valve seat 344 between the filter 380 and retainer 382. In one form, a fluid may flow through openings 384 in the filter 380, through retainer openings 386, and opening 388. Fluid also may flow in a reverse direction.

Figure 19:
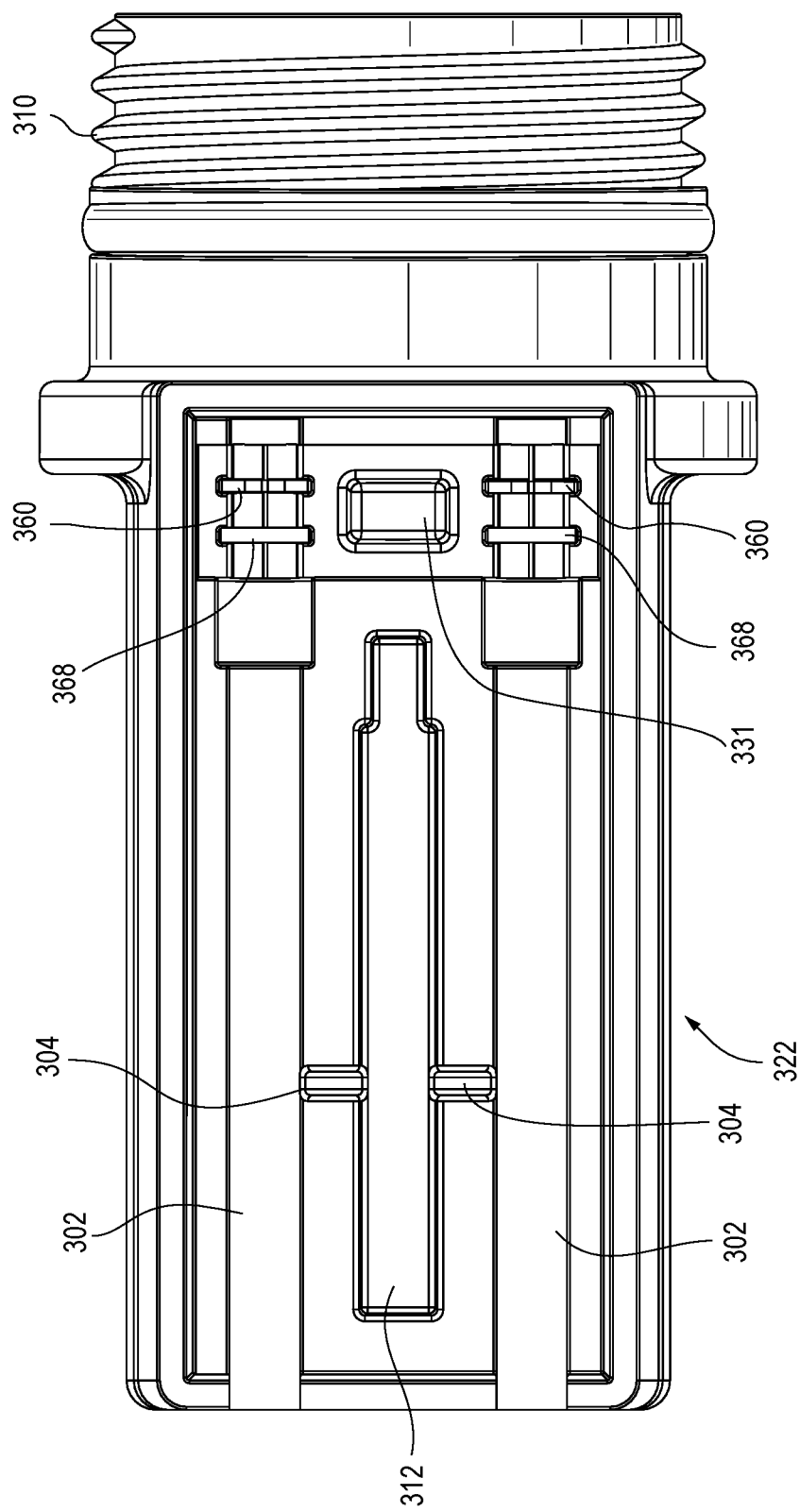
FIG. 19 is a top view of one form of housing.

As seen in FIG. 19, the housing 322 can be manufactured to include channels 302 for receiving the wires 326. The housing 322 can also include one or more cavities 312 for holding a variety of different electrical components. The components can include a variety of different devices, sensors, transmitters, receivers, transceivers, overvoltage devices, decoders, encoders, circuitry, chips, and the like. These electrical components can be used for a variety of different purposes such as controlling the solenoid 300, transmitting and/or receiving information from one or more sensors, communicating with a controller, communicating with other solenoids, and the like. Sensors may include temperature sensors, moisture sensors, solar radiation, humidity, light, and the like.

Further, the housing 322 can include recesses 304 for providing access between the cavity 312 and channels 302. The recesses 304 can be configured to provide appropriate space to permit an electrical connection between any circuitry or devices in the cavity 312 and the wires 326 in the channels 302.

Figure 20A:
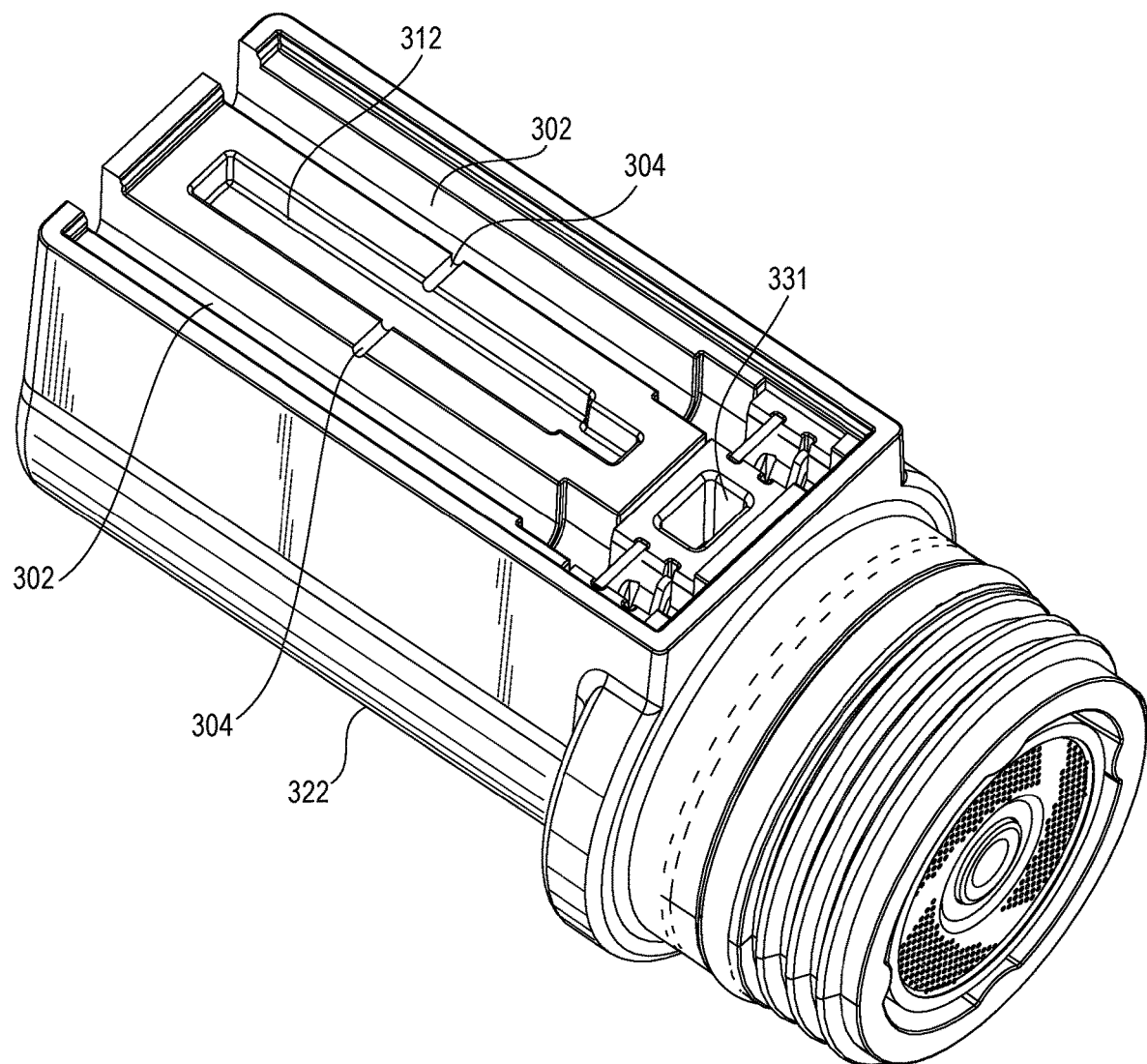
FIG. 20A is a perspective view of the housing of FIG. 19.
Figure 20B:
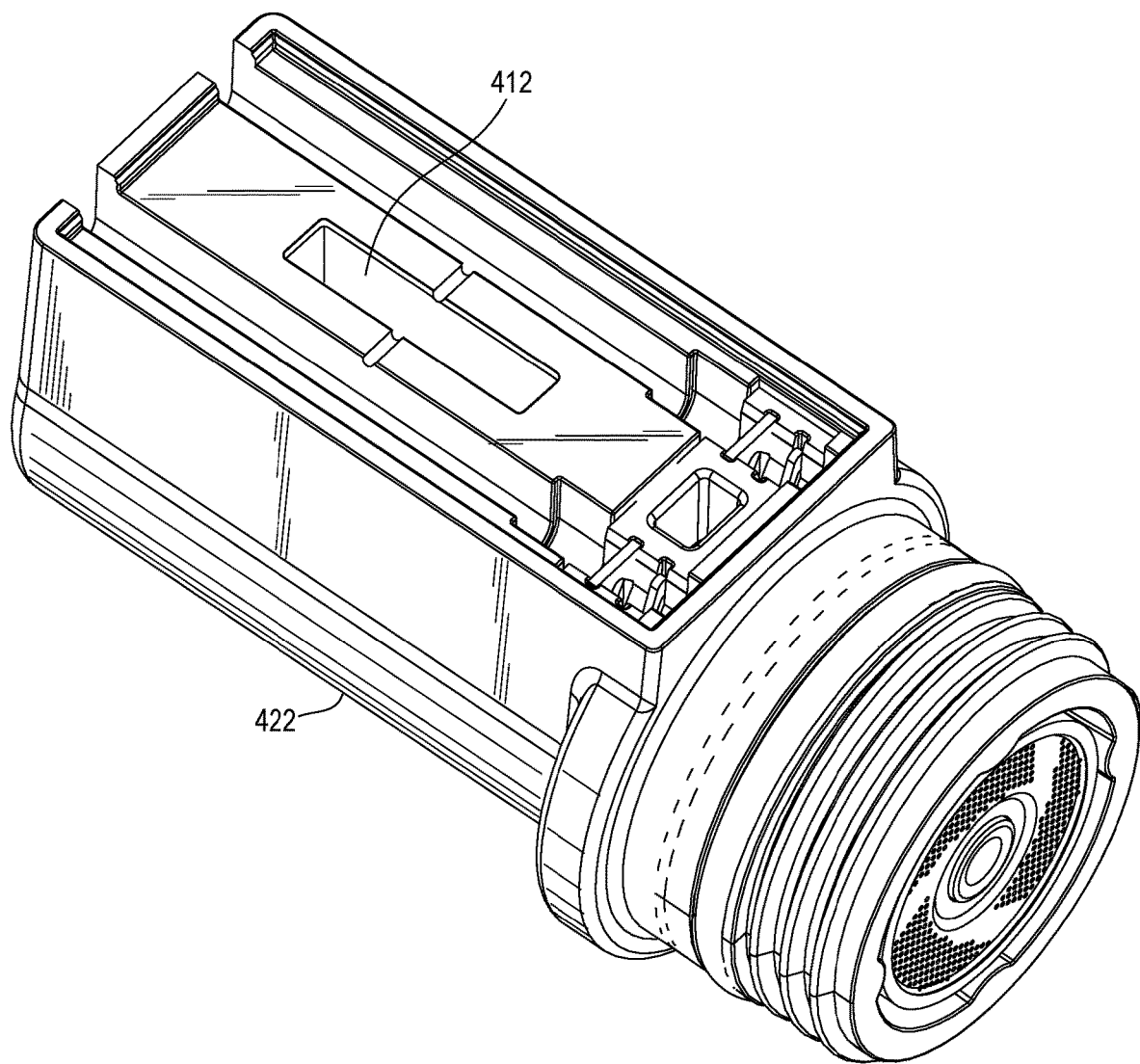
FIG. 20B is a perspective view of another form of housing.
Figure 20C:
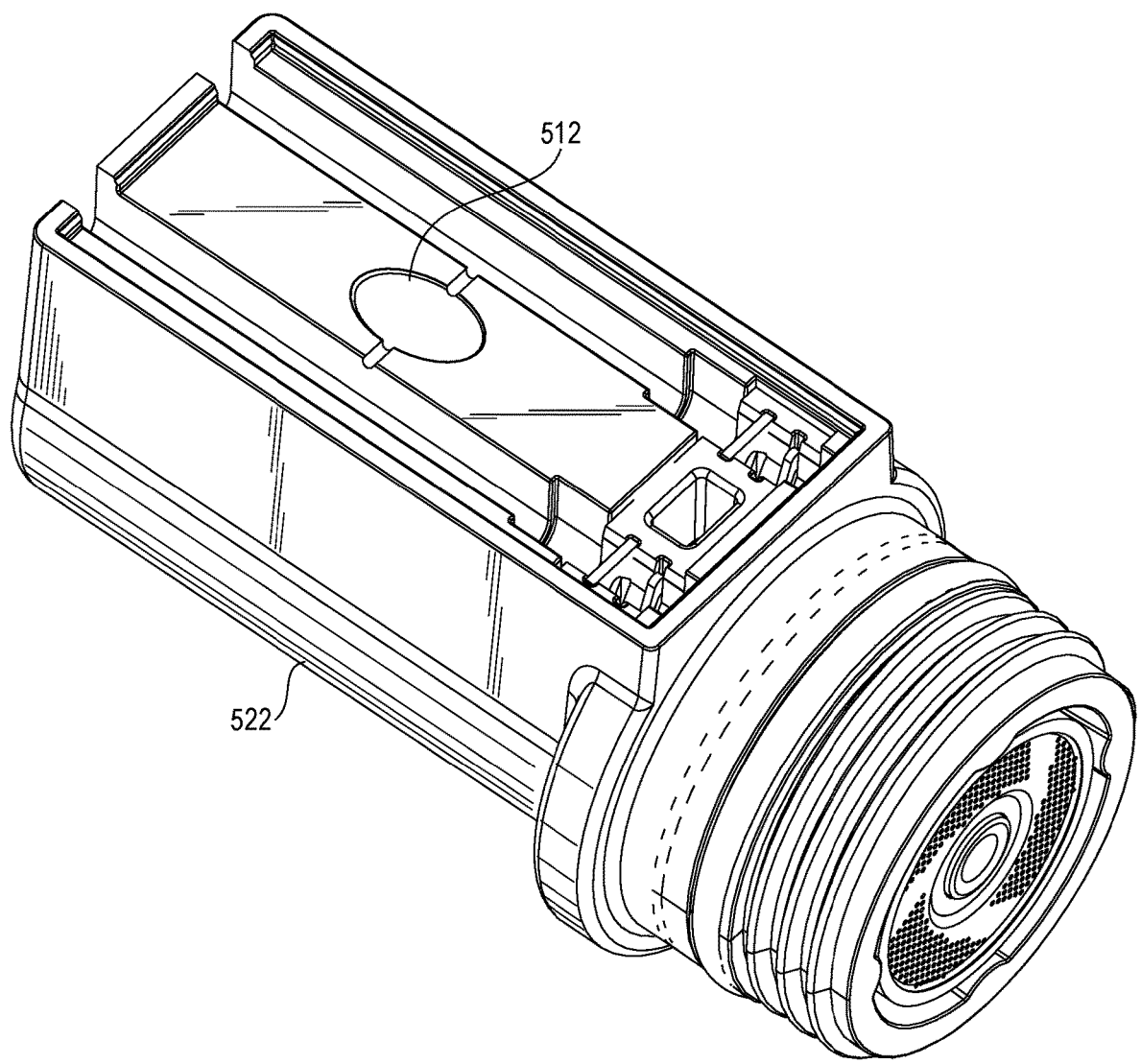
FIG. 20C is a perspective view of another form of housing.
Figure 20D:
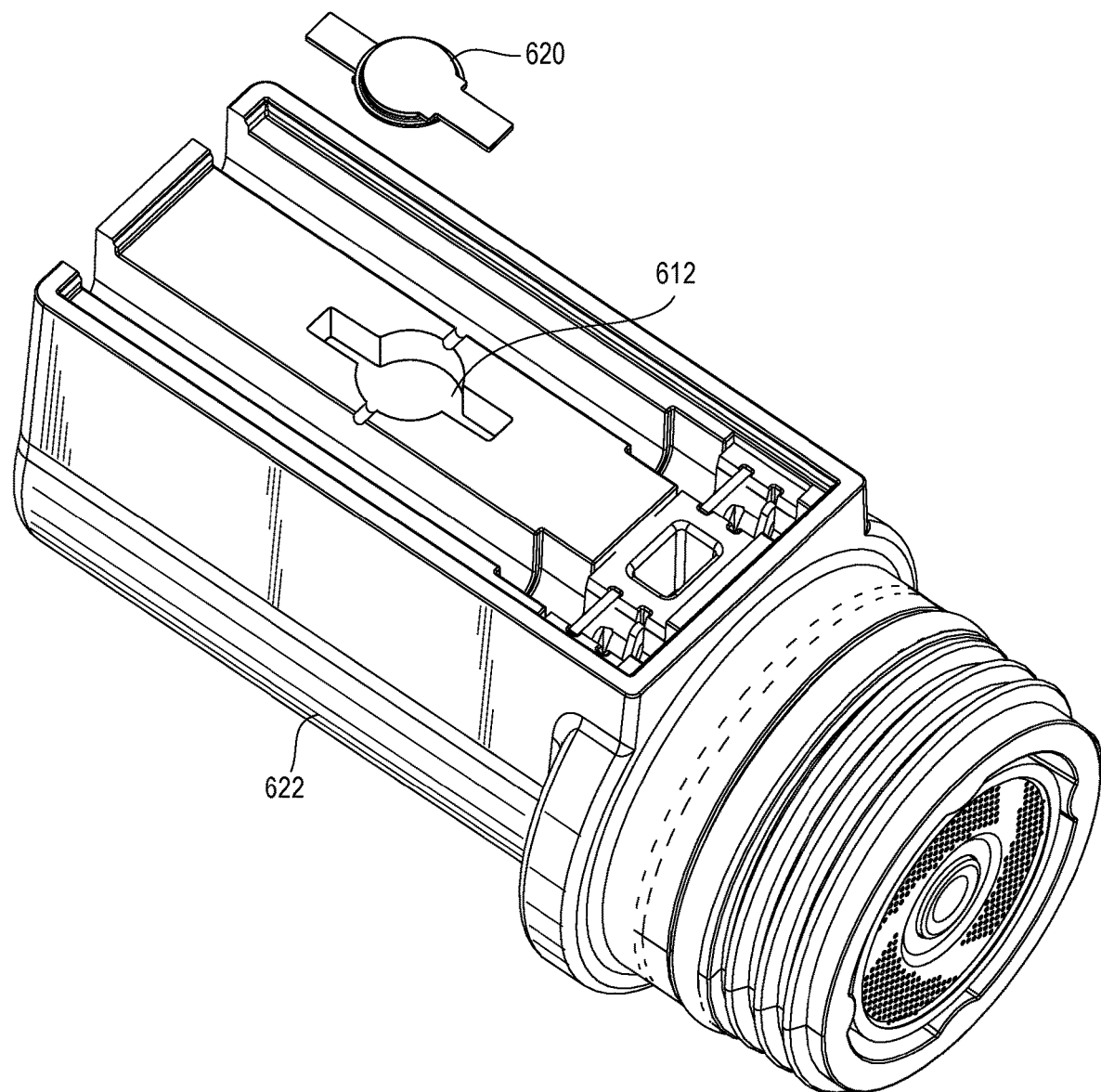
FIG. 20D is a perspective view of another form of housing with an overvoltage device.
Figure 21:
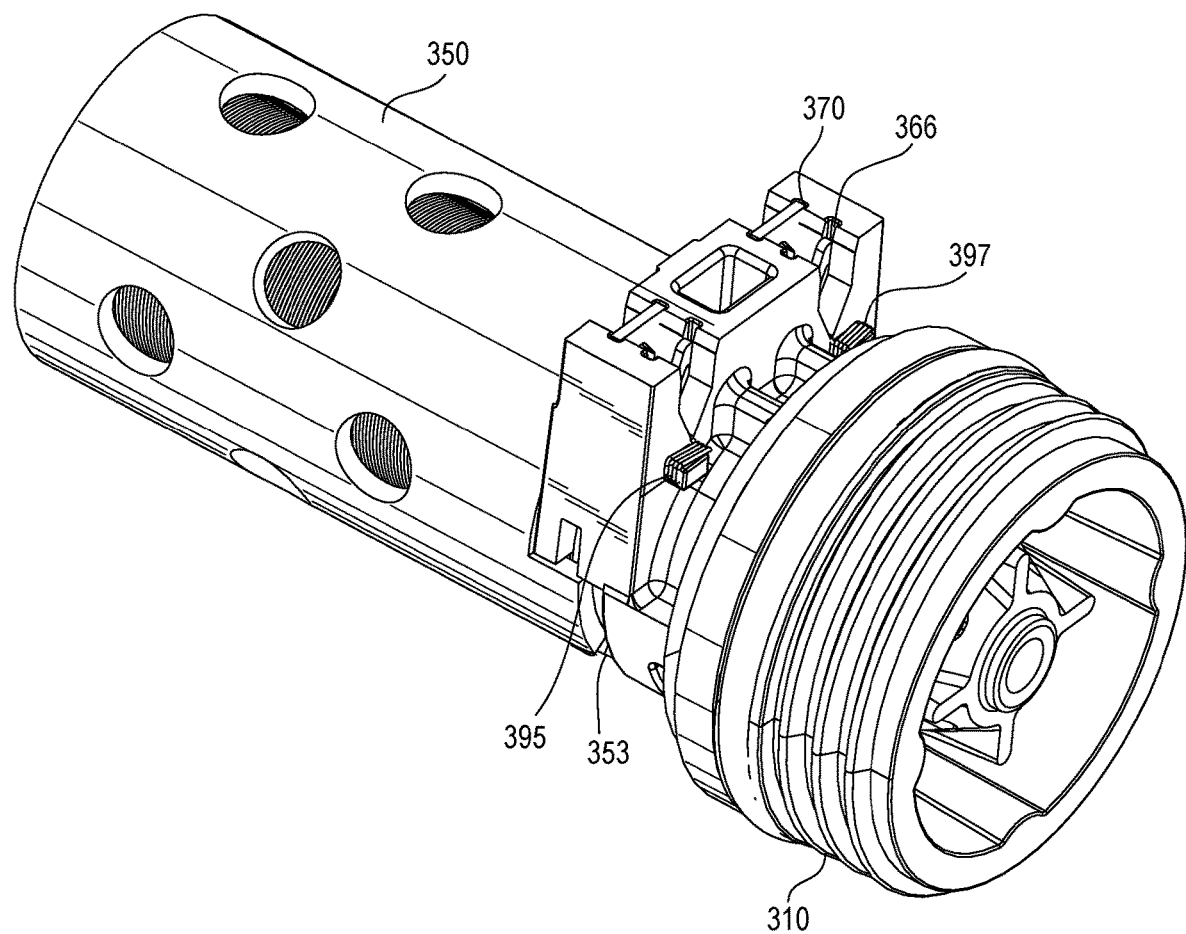
FIG. 21 is a perspective view of a solenoid with an outer housing and wires removed.

The cavity 312 may take a variety of forms, including different shapes, sizes, depths, and the like to accommodate different electrical components. For example, FIGS. 20B-D illustrate different forms of housings 422, 522, 622 having different shaped cavities 412, 512, 612. As shown in FIG. 20B, cavity 412 is generally rectangular. FIG. 20C illustrates cavity 512 as generally oval while FIG. 20D illustrates cavity 612 as having yet a further shape, such as to accommodate a circuit or device 620, such as an overvoltage device. Device 620 may include any of the devices, microcircuits, microchips, communication devices, sensors, and the like, as previously discussed. As noted above, the shape, size, depth, and location of the cavity may be modified to accommodate different electrical components of different sizes. In one form, the cavity may be placed between the channels for the external wires. In other forms, the cavity may be positioned adjacent a single wire. Further, the recesses, such as recesses 304, can take a variety of different shapes, sizes, and locations, as needed to communicate with the electrical component. In other forms, recesses are not needed as other ways of powering and communicating may be done, such as RFID and the like.

In one form, the electrical components in the solenoid 330 can provide data back to the controller. This data can pertain to altering the functionality of the irrigation system, such as irrigation schedules and irrigation overrides. It also can pertain to security for the irrigation system or a structure, such as a home or other building, contained within the perimeter of the solenoid. That is, the solenoid can provide information about intrusions occurring near or inside the irrigation area.

Further, a wireless solenoid mesh network can be configured to allow wireless communication between the solenoids and the controller. This circumvents the bottleneck of having to transmit data from field back through the two-wire system. Each solenoid can include a transceiver configured to wirelessly communicate directly with the controller if in range. When out of range, the solenoid can wirelessly communicate with the controller through other solenoids in the wireless solenoid mesh network.

The wireless solenoid mesh network can determine the route by which data is communicated back to the controller. For example, if a desired communication path would go through a solenoid that is busy, the data will take a different route even though it may be less direct. Further, if a solenoid is offline or defective for some reason, the wireless solenoid mesh network will self-heal by providing an alternate route around the offline or defective solenoid. Finally, the wireless solenoid mesh network may have distributed intelligence to make decisions based on the routed data.

According to one form, the wiring providing power to energize the solenoids can also supply power to generate electromagnetic wave of radio frequency to activate one or more passive sensors. This uses what is referred as radio-frequency identification (RFID) technology. In this manner, the sensors can collect electromagnetic energy to briefly turn on, collect data, and transmit data back to the solenoid without requiring a battery. This data in turn can be transmitted back to the controller through the wireless solenoid mesh network.

The sensors can be selected to provide a multitude of information and functions, including: detecting tampering of the irrigation devices, alerting of unwanted intruders, and determining flow, moisture, humidity, solar radiation, wind, temperature, and evaporation data. For instance, if a sensor detects that the soil is too dry, the controller receives this data through the wireless solenoid mesh network and sends a signal back through the network instructing the appropriate solenoid so its associated valve will open. Water can then flow through that valve.

A printed circuit board may be used having various shapes and which may contain one or more micro-electronics, including a transceiver, a sensor, a decoder, and a signal generator for generating electromagnetic waves of radio frequency. The transceiver may operate using any convention wireless communication technology, such as WiFi, Low Energy Bluetooth, Zigbee, Z-Wave, Insteon, and other technologies.

In prior cases, printed circuit boards could take up too much space so, in the present design, the printed circuit boards can have configurations that decrease size without sacrificing capabilities. In one form, the printed circuit board can take on a dumbbell-like shape (not shown) which produces a smaller footprint while retaining the same electronics and functionality as a larger printed circuit. The dumbbell shaped printed circuit board includes a flexible ribbon cable that allows for this more compact configuration permitting the two ends to be folded onto one another. Further examples are provided in U.S. Application Ser. No. 62/477,893. Additional examples may include, by are not limited to integrated circuits, circuits on a chip, and the like.

Figure 26:
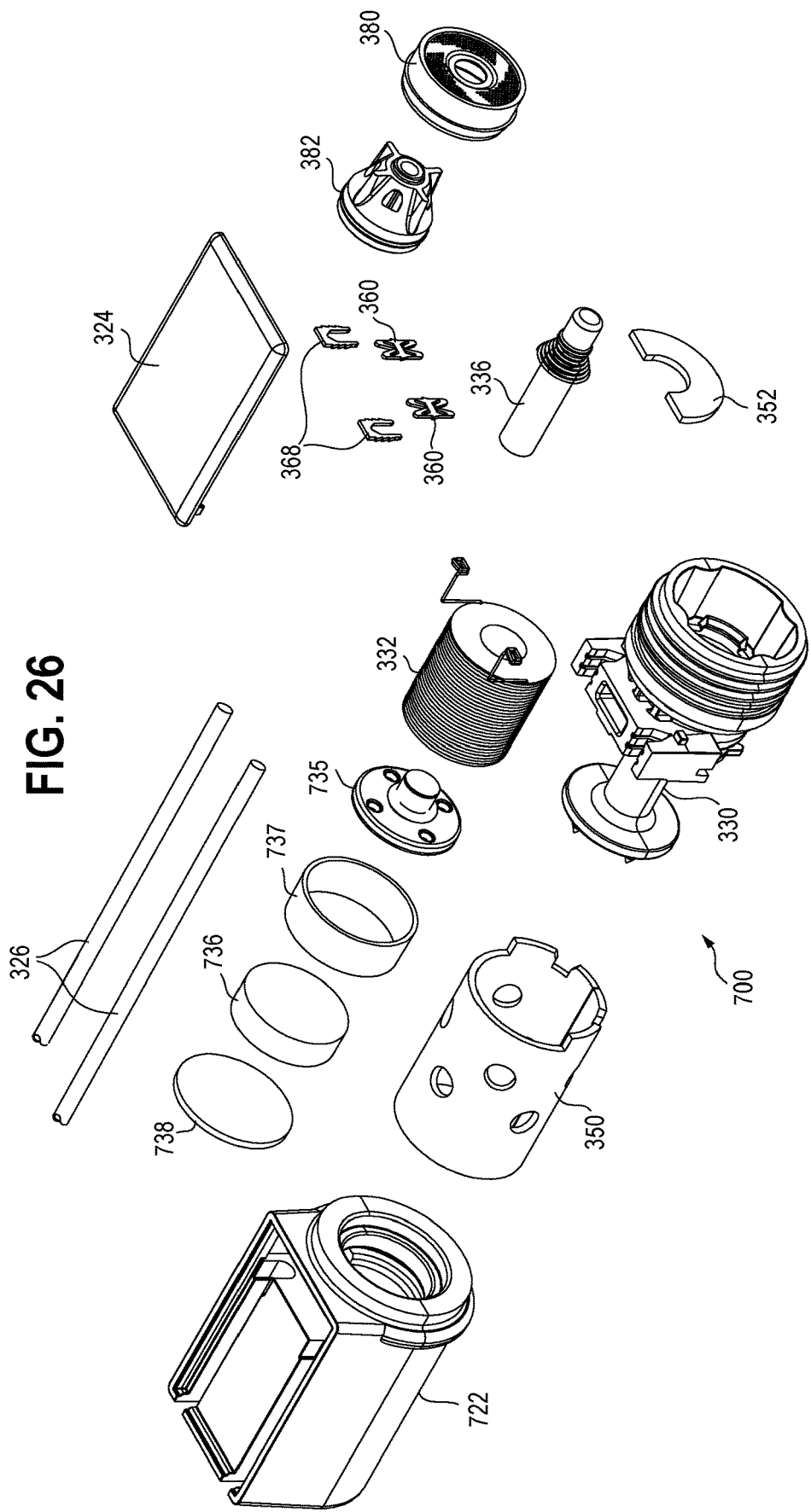
FIG. 26 is an exploded view of another form of solenoid.

Referring to FIG. 26, solenoid 700 is shown. Similar to the form shown in FIG. 16, solenoid 700 can be a DC solenoid, such as using 9 VDC. The solenoid 700 includes a different core, as shown as core 735. Further, the solenoid 700 includes a permanent magnet 736, a magnet holder 737, and a back plate 738. The magnet holder 737 can serve at least two purposes. The first is to hold the magnet 736 centered to the core during assembly. The second function is to direct the magnetic flux from the permanent magnet towards the core as the magnet holder 737 can be made from non-magnetic material. Further, the core 735 has been shortened such that the end of the core is closer to the permanent magnet 736 to improve performance of the solenoid 700. The back plate 738 is also utilized to help close the magnetic circuit. Solenoid 700 also includes a housing 722. As shown in FIG. 26, housing 722 is illustrates as not including a cavity for circuitry or other devices. However, a cavity may be included in housing 722 including, but not limited to the cavities shown in FIGS. 20A-D. Solenoid 700 functions in a similar manner as solenoid 220 and may be assembled in a similar manner.

Figure 27:
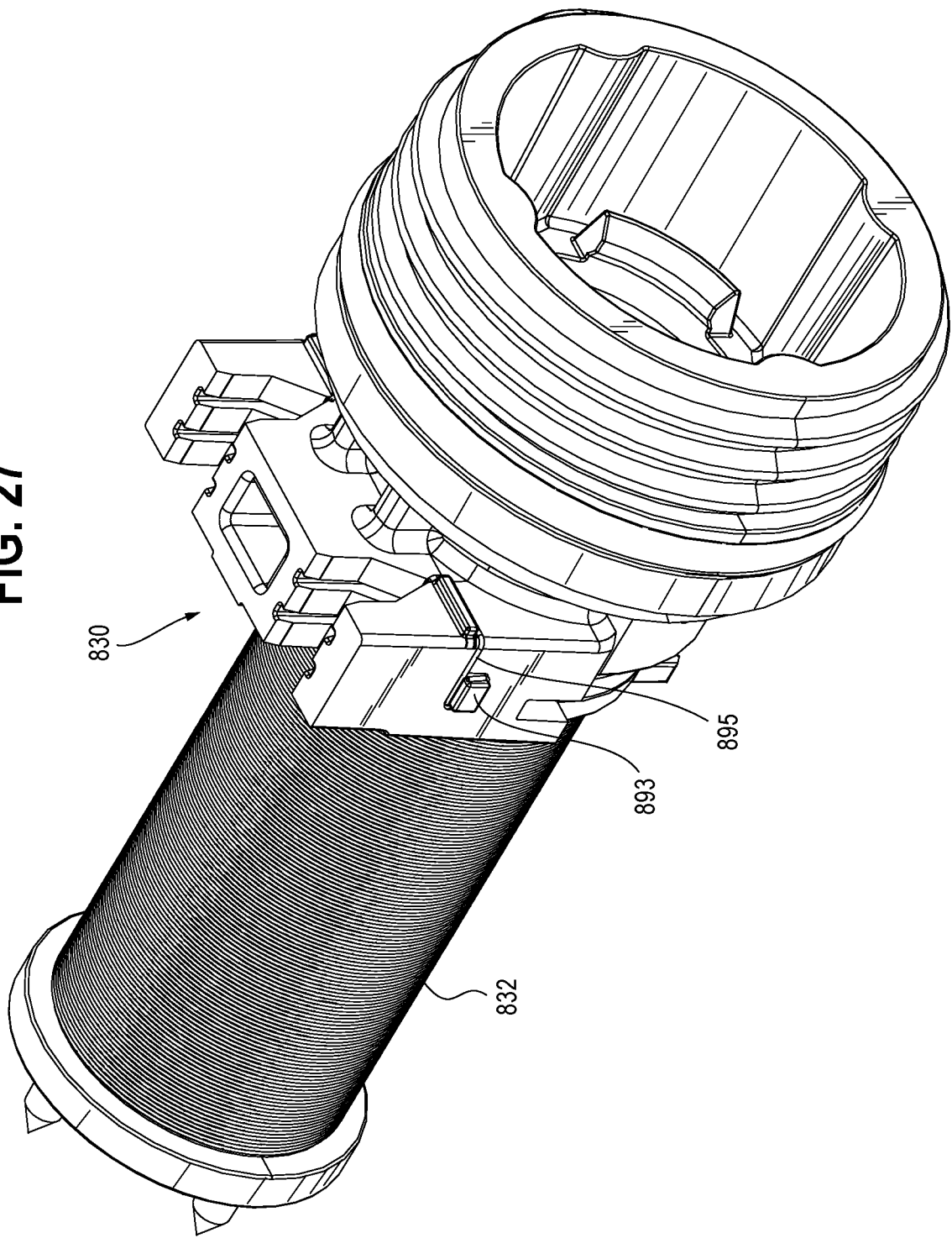
FIG. 27 is a perspective view of one form of a bobbin and coil.

FIG. 27 illustrates a further embodiment of a bobbin 830 and wire 832. As found in this form, protrusions 893 are positioned on a side of the bobbin 830, compared to the protrusions 393 shown in FIG. 23. In this form, a first end 895 of wire 832 wraps around the bobbin 830. The location of the protrusions may be moved to different areas on the bobbin as desired. Moreover, the protrusions shown on other embodiments described herein may be moved to similar locations.

Figure 28:
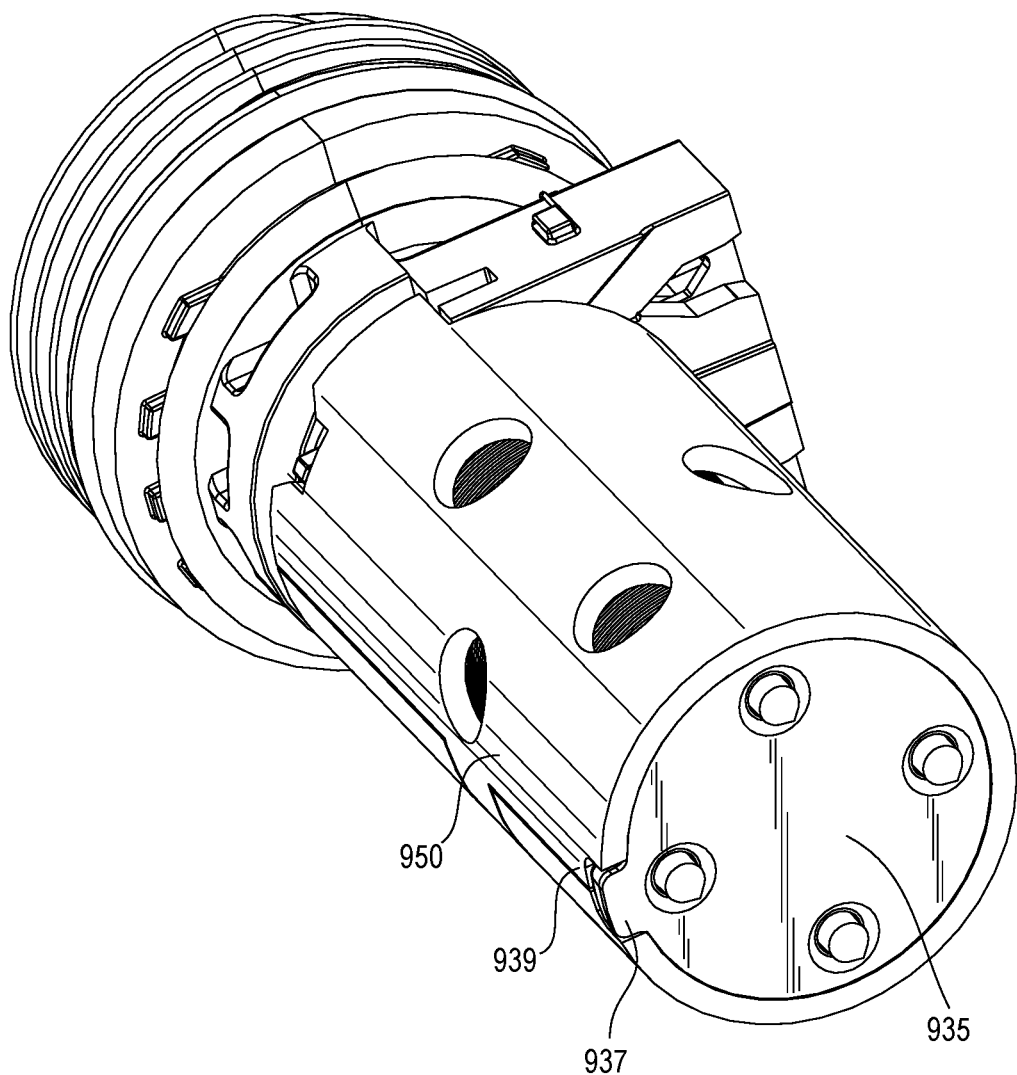
FIG. 28 is a rear perspective view of one form of a bobbin, cylinder, and core.

FIG. 28 illustrates an embodiment of a core 935 having a tab 937 that cooperates with a cylinder 950. In this form, the tab 937 can be inserted into a slot 939 to help retain the positions of the core 935 and cylinder 950 relative to one another and otherwise retain the cylinder 950 until the housing has been overmolded onto the cylinder 950. The tab 937 and slot 939 may take a variety of shapes and sizes and may be moved to different positions as desired. Further, the tab may be moved to the cylinder 950 while the slot 939 may be moved to the core 935. It should be understood that other embodiments described herein may include similar tabs and slots, as desired.

It should be appreciated that the solenoids described herein can be made in the same or similar manners. Further, some of the components used may be the same in each form of the solenoid. For example, an AC version of the solenoid may share a number of common components as the DC version of the solenoid. Further, it should be understood that the different features described herein with respect to each embodiment may be included in other embodiments such that the features should not be construed as being exclusive to a single embodiment unless specifically stated.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A solenoid comprising:
a bobbin;
a core wire positioned about at least a portion of the bobbin, the core wire forming a coil;
a housing positioned about at least a portion of the coil;
a lid coupled to the housing, the lid and housing defining an interior area;
an external wire extending from outside the housing into the interior area;
a cavity positioned on the housing in the interior area, the cavity positioned adjacent the external wire and sized to accept at least one electrical component;
a first channel and first recess on the housing in the interior area, the first channel extending longitudinally on the housing to accept the external wire and the first recess extending from the cavity to the first channel; and
a second channel and a second recess on the housing, the second channel extending substantially parallel to the first channel, the second recess extending from the second channel to the cavity, wherein the cavity is positioned between the first and second channels.

2. The solenoid of claim 1 wherein the electrical component comprises at least one sensor, microchip, microcircuit, communications device, integrated circuit, and overvoltage device.

3. The solenoid of claim 1 further comprising a wire-to-wire terminal having a first end extending at least partly into an opening in the housing providing contact with a first terminal end of the coil wire and a second end providing contact with the external wire, the wire-to-wire terminal providing an electrical connection between the first terminal end and the external wire.

4. The solenoid of claim 3, wherein the bobbin includes a flange portion extending at least partially through the opening in the housing, the flange portion including a slot for receiving the first end of the wire-to-wire terminal and the first terminal end of the core wire.

5. The solenoid of claim 1 further comprising a powdered metal core having a flange portion integral with a core portion, the core portion extending at least partially into the bobbin.

6. The solenoid of claim 1 further comprising a cylinder surrounding a least a portion of the coil, the cylinder defining at least one opening whereby a portion of the housing material extends through the cylinder and contacts the coil while still being contiguous with the housing.

7. The solenoid of claim 1 further comprising a filler material in the interior area between the housing and lid.

8. A solenoid comprising:
a bobbin;
a core wire positioned about at least a portion of the bobbin and forming a coil, the core wire having first and second terminal ends;
a housing positioned about at least a portion of the core wire, the housing defining an opening providing access from an exterior side of the housing to the first terminal end;
an external wire extending from outside the housing; and
a wire-to-wire terminal having a first end extending at least partly into the opening in the housing and having a generally V-shaped inner surface to provide contact with the first terminal end of the solenoid coil wire and a second end having a generally V-shaped inner surface to provide contact with the external wire, the wire-to-wire terminal providing an electrical connection between the first terminal end and the external wire.

9. The solenoid of claim 8 further comprising a second wire-to-wire terminal having a first end providing contact to the second terminal end of the solenoid coil wire and a second end coupled to a second external wire.

10. The solenoid of claim 8 wherein the bobbin includes a flange portion extending at least partially through the opening in the housing, the flange portion including at slot for receiving the first end of the wire-to-wire terminal and the first terminal end of the core wire.

11. The solenoid of claim 8 further comprising a powdered metal core having a flange portion integral with a core portion, the core portion extending at least partially into the bobbin.

12. The solenoid of claim 8 further comprising a cylinder surrounding a least a portion of the coil, the cylinder defining at least one opening whereby a portion of the housing material extends through the cylinder and contacts the coil while still being contiguous with the housing.

13. The solenoid of claim 8 further comprising an overvoltage device.

14. The solenoid of claim 8 further comprising a cover, the cover positioned over a channel in the housing, the channel maintaining the external wire in a desired position.

15. The solenoid of claim 8 wherein the housing includes at least two channels extending generally parallel to one another with a cavity adjacent the at least two channels.

16. The solenoid of claim 15 further comprising at least one of a sensor, a microchip, a microcircuit, a communications device, and an overvoltage device positioned in the cavity and coupled to the external wire.

* * * * *